US006845907B1

(12) United States Patent
Enright

(10) Patent No.: US 6,845,907 B1
(45) Date of Patent: Jan. 25, 2005

(54) CASH DELIVERY APPARATUS FOR MOTOR FUEL DISPENSER OR OTHER SELF SERVICE FACILITY

(75) Inventor: Jeffery M. Enright, Akron, OH (US)

(73) Assignee: Diebold, Incorporated, North Canton, OH (US)

( * ) Notice: Subject to any disclaimer, the term of this patent is extended or adjusted under 35 U.S.C. 154(b) by 0 days.

(21) Appl. No.: 09/438,602

(22) Filed: Nov. 12, 1999

Related U.S. Application Data

(60) Provisional application No. 60/108,340, filed on Nov. 13, 1998.

(51) Int. Cl.[7] .................................................. G06F 7/08

(52) U.S. Cl. ....................... 235/381; 235/380; 235/385; 235/375; 235/493; 235/478; 235/487; 902/8

(58) Field of Search ................................ 235/380, 385, 235/375, 493, 478, 487, 381, 374, 376, 378, 379; 902/8, 13, 14, 15, 16, 17, 9, 10, 11, 12

(56) References Cited

U.S. PATENT DOCUMENTS

| | | | | | |
|---|---|---|---|---|---|
| 4,166,945 | A | * | 9/1979 | Inoyama et al. | 235/379 |
| 4,199,100 | A | * | 4/1980 | Wostl et al. | 235/381 |
| 4,577,779 | A | * | 3/1986 | Atalla | 221/1 |
| 4,667,565 | A | * | 5/1987 | Anderson | 89/36.08 |
| 5,047,613 | A | * | 9/1991 | Swegen et al. | 235/379 |
| 5,450,938 | A | * | 9/1995 | Rademacher | 194/206 |
| 5,719,383 | A | * | 2/1998 | Forrest | 235/379 |
| 5,797,470 | A | * | 8/1998 | Bohnert et al. | 186/53 |
| 5,816,443 | A | * | 10/1998 | Bustos | 186/55 |
| 5,842,188 | A | * | 11/1998 | Ramsey et al. | 705/416 |
| 5,859,416 | A | | 1/1999 | Gatto | |
| 5,895,457 | A | * | 4/1999 | Kurowski et al. | 705/413 |
| 5,975,273 | A | * | 11/1999 | Zwahlen et al. | 194/206 |
| 5,982,211 | A | * | 11/1999 | Ko | 327/202 |
| 6,012,048 | A | * | 1/2000 | Gustin et al. | 705/39 |
| 6,056,194 | A | * | 5/2000 | Kolls | 235/380 |
| 6,092,629 | A | * | 7/2000 | Bohnert et al. | 186/53 |
| 6,098,879 | A | * | 8/2000 | Terranova | 235/384 |
| 6,116,505 | A | * | 9/2000 | Withrow | 235/381 |
| 6,119,934 | A | * | 9/2000 | Kolls | 235/381 |
| 6,145,741 | A | * | 11/2000 | Wisdom et al. | 235/380 |
| 6,210,768 | B1 | * | 4/2001 | Blok et al. | 428/41.8 |
| 6,308,887 | B1 | * | 10/2001 | Korman et al. | 235/379 |
| 6,317,649 | B1 | * | 11/2001 | Tedesco et al. | 235/381 |

(List continued on next page.)

FOREIGN PATENT DOCUMENTS

WO WO 9606415 A1 * 2/1996 ........... G07F/13/02

*Primary Examiner*—Karl D. Frech
*Assistant Examiner*—Daniel Walsh
(74) *Attorney, Agent, or Firm*—Ralph E. Jocke; Daniel D. Wasil; Walker & Jocke

(57) ABSTRACT

A system for providing cash to users in a self-service environment such as in dispensing motor fuel includes a self-service dispensing machine (12). A user is enabled to dispense merchandise from the self-service dispensing machine and is also enabled to selectively receive cash value by charging the amount of such value to a monetary source associated with a machine readable article (80, 82). A user may receive cash value by presenting a printed voucher or other item to a service provider located at a facility (14) at which the service provider exchanges the voucher or other item for cash. Alternatively, cash may be dispensed to the user directly from the self-service dispensing machine.

23 Claims, 37 Drawing Sheets

U.S. PATENT DOCUMENTS 6,367,696 B1 * 4/2002 Inamitsu et al. ............ 235/375
6,386,323 B1 * 5/2002 Ramachandran et al. ..... 186/36
6,401,009 B1 * 6/2002 Chandonnet ................... 221/2
6,406,016 B1 * 6/2002 Ehara et al. ................ 271/104
6,422,464 B1 * 7/2002 Terranova ................... 235/384
6,546,882 B1 * 4/2003 Gromatzky et al. .......... 109/50
6,626,357 B1 * 9/2003 Ross .......................... 235/379
6,685,089 B2 * 2/2004 Terranova et al. .......... 235/381
6,722,473 B1 * 4/2004 Ramachandran et al. ..... 186/36
2001/0045457 A1 * 11/2001 Terranova et al. .......... 235/381
2002/0053594 A1 * 5/2002 Haney et al. ............... 235/381
2002/0070271 A1 * 6/2002 Terranova et al. .......... 235/381
2002/0145039 A1 * 10/2002 Carroll ....................... 235/384
2002/0147648 A1 * 10/2002 Fadden et al. ................ 705/16
2003/0205619 A1 * 11/2003 Terranova et al. .......... 235/381
2004/0069853 A1 * 4/2004 Aharonson .................. 235/454

* cited by examiner

ACTION
- MACHINE DISPENSES CASH

ACTION
- USER TAKES CASH

*6 - Thank You*

CASH DELIVERY APPARATUS FOR MOTOR FUEL DISPENSER OR OTHER SELF SERVICE FACILITY

This application claims the benefit of U.S. Provisional Application No. 60/108,340 filed Nov. 13, 1998.

TECHNICAL FIELD

This invention relates to customer service facilities. Such facilities may include self-service facilities such as a self-service motor fuel dispensing facility. Alternatively such facilities may include an attended facility such as a fast food outlet. Particularly this invention relates to methods and systems for dispensing cash to customers at such facilities.

BACKGROUND ART

Self-service facilities at which users may make purchases are becoming increasingly popular. Allowing the customer to serve themself enables the customer to work at their own pace. It also minimizes the number of personnel that the operator of the facility must employ to service customers. One type of self-service facility that is becoming increasingly popular is a self-service fuel dispensing facility. At such facilities customers are enabled to pump their own motor fuel. Users often pay a cashier for the amount of fuel purchased. One cashier is enabled to monitor several fuel dispensing pumps and receive payment conveniently from many customers.

Many motor fuel dispensing establishments have expanded their merchandise offerings to include other items. Many such facilities instead of merely being a "gasoline station" are now a "convenience store" offering a variety of food and beverage items as well as other products. This business model has proven highly successful as motorists who must stop for fuel will often make impulse purchases of beer, cigarettes, lottery tickets, food and other items. These other purchases provide substantial additional profit for the operator. The customer is able to pick up items conveniently and to pay for such items as well as the motor fuel they have dispensed.

In recent years more service stations and other self-service facilities have enabled users to make payment using credit or debit cards. In the motor fuel dispensing environment an electronic interface is often provided through which a user may elect to pay either inside the facility or at the pump. The user interface also includes a card reader into which the user may insert their credit or debit card. If the card is verified as a valid card, the user may dispense the motor fuel into their vehicle and have the charge for the merchandise applied to the account associated with the card. Many electronic self-service motor fuel dispensing terminals also include a receipt printer which provides the customer with a printed receipt for their purchase.

While electronic motor fuel dispensing terminals are convenient they also have drawbacks. One drawback for the operator of the facility is that the customer no longer needs to go into the facility where other merchandise is available for purchase. As a result, a customer is less likely to make an impulse purchase. This can lower the overall profitability of the operation. A further drawback is that if the customer does wish to purchase merchandise from the facility, the customer is required to wait in line with other customers who are paying for fuel and merchandise. If the customer does not have cash available to pay for the merchandise the customer's credit card or other card must be verified again in a separate transaction inside the facility. This unduly delays the customer as well as other customers who are waiting to deal with the cashier or other individual service provider.

A further drawback with conventional self-service dispensing environments, including motor fuel dispensing environments, is that if the user does wish to make a purchase within the facility, the user's car remains adjacent to the dispensing station. This often delays other customers who are waiting to fuel their vehicles. Customers may choose not to wait and will simply drive to another service station rather than be delayed.

Most consumers prefer to pay cash for certain purchases. This is particularly true for low value items. Many consumers do not believe that the delays associated with card based purchases are justified when the item being purchased is of low value. Sellers also do not appreciate the fees, delay or inconvenience associated with processing card based transactions for very small amounts. To provide users with cash at convenient locations, automated teller machines (ATMs) have been installed in retail establishments. Such ATMs enable users to obtain cash by withdrawing it from their accounts through use of a debit card or by charging it against a credit card account.

A drawback of using ATMs in some self-service environments such as a motor fuel dispensing station, is that it takes time for the user to operate the ATM within the facility. This may translate into a delay. A delay can be harmful for the operator's business if a customer's car remains at the fuel dispensing pump for an extended period while the customer is within the sales facility operating the ATM. This may discourage other customers from stopping. Further, if the customer finds a line at the ATM within the facility, the customer may choose not to wait to obtain cash. As a result, the user will not make the additional purchases at the sales facility that they would have otherwise made.

Similar conditions and considerations exist in other types of customer service facilities. For example, gaming facilities, amusement facilities, ticketing and other environments may not provide optimum transaction throughput and profitability due to customers having to complete a number of time-consuming steps. Such delays exist in both self service facilities as well as facilities that are attended by a human service provider. Drive-through customer service operations such as fast food restaurants also can cause customers to suffer delays and may lose business due to slow transaction throughput. Customers in a drive-through fast food environment may limit their purchases because they have a limited amount of cash available. Customers in such drive-through facilities may be discouraged from using credit or debit cards because it may slow down activities at the payment and delivery stations. The operators of such fast food facilities as well as customers, may prefer that credit or debit cards not be used to make payment as to do so will increase their wait to obtain merchandise. This additional time includes not only the time required to authorize the transaction using an electronic payment network, but also the additional steps associated with having the customer receive credit card or debit card receipts related to their purchase. Potential customers considering whether to stop to purchase food or other merchandise from a drive-through facility may also be discouraged from stopping to make the purchase if the wait appears too long or they have experienced a delay in the past.

Customers wishing to make a purchase from a customer service facility but who either prefer to use cash or are required by the seller to pay with cash, may first need to visit a bank or other facility with an ATM in order to acquire such cash. This requires the customer to make an additional stop at another location before patronizing the customer service facility. It is not uncommon for persons who might otherwise intend to make a purchase to completely forego the purchasing activity because they have to take the time to obtain additional cash first. This is particularly true in operations like drive-through food service environments where the customer may stop if they have the available cash, but can forego the purchase if they do not have the cash available. If the customer defers the purchase until they get the cash there is an increased probability that they will make the food purchase at the most convenient location after they have been able to obtain adequate cash. As a result the customer service facility that the consumer may actually prefer may lose the customer's business because the customer considers being able to pay with cash a prerequisite.

Thus there exists a need for more efficient transaction processes and cash delivery methods for use in connection with customer service facilities.

DISCLOSURE OF INVENTION

It is an object of the present invention to provide an improved method of operating a transaction facility.

It is a further object of the present invention to provide an improved method for operating a self-service facility.

It is a further object of the present invention to provide an improved cash delivery method for a customer service facility.

It is a further object of the present invention to provide an improved method for delivering cash at a motor fuel dispensing facility.

It is a further object of the present invention to provide an apparatus which achieves improved delivery of cash at a self-service facility.

It is a further object of the present invention to provide an improved method for operating an attended customer service facility.

It is a further object of the present invention to provide an improved method of delivering cash at an attended customer service facility.

It is a further object of the present invention to provide an improved method of delivering cash at a drive-through food service facility.

Further objects of the present invention will be made apparent in the following Best Modes for Carrying Out Invention and the appended claims.

The foregoing objects are accomplished in one exemplary embodiment of the invention by a system and method that are carried out at a self-service facility. In this embodiment the self-service facility is a motor fuel dispensing facility which includes self-service merchandise dispensing machines such as fuel pumps. A facility located remote from the self-service dispensing machines such as a service station or convenience store is associated with the self-service dispensing machines. The customer may make payment or purchase other merchandise at the associated facility.

In one exemplary form of the invention the self-service fuel dispensing machine includes a customer interface with an article reader for reading a credit card, debit card or other feature or article associated with a source of monetary value. When the user dispenses the merchandise which in the described embodiment is motor fuel from the self-service dispensing machine, the charge associated with the merchandise is charged to the source of value.

The user is also enabled to input through an input device on the self-service dispensing machine an input corresponding to a request for an amount of cash. The charge for the amount is also assessed against the user's credit card or other source of monetary value from which payment is being made.

In some embodiments of the invention the self-service dispensing machine includes an output device such as a printer. This printer is operative to produce an item which is a voucher or other printed document that may be redeemed by the user for an amount of cash. This can be accomplished by the user taking the item to the facility and presenting it to a service provider. Alternatively information associated with the user or their transaction such as biometric data, a code or other feature may be used to identify the user as being entitled to receive cash. The service provider provides the user with the amount of cash. If the user wishes to purchase other merchandise or services, the value of the other merchandise or services may be deducted from the cash which is provided to the user. Alternatively, the user may be provided with the cash and may then provide a portion of the cash as payment for goods or services purchased. In some embodiments of the invention an item may be dispensed from the self-service dispensing machine which includes machine readable indicia corresponding to the amount that the user is to receive. At the remote facility the service provider may read the machine readable indicia with a reading device and dispense the cash to the user. This reading may be done with a manually operable device for reading indicia or automatically with a reading device connected to a cash dispensing mechanism.

In alternative embodiments of the invention the self-service merchandise dispensing machine includes a cash value dispensing mechanism. In these circumstances the cash value is dispensed to the user directly at the dispensing machine in the form of one or more notes. In these alternative embodiments the user is enabled to receive the cash without having to enter the facility. However, if the user is interested in making a purchase of other merchandise they may now do so with cash which reduces the time that will be spent making the purchase.

In further alternative embodiments the self-service merchandise dispensing machine includes a cash value accepting device. This cash value accepting device may be integrated with the cash dispensing mechanism or may be a separate mechanism. This enables a user to provide value to the machine in the form of currency notes. Alternatively, machines may be equipped to receive cash value from stored value cards or other forms of cash value items. In these alternative forms of the invention, the self-service dispensing machine will dispense merchandise up to the amount of cash value input by the user. If the user does not use all of the cash value input, the dispensing machine may be operative to provide the user with an item such as a printed document. The printed document may be redeemed at the facility for the amount of change the user is entitled to receive. Alternative embodiments may use a biometric feature or other item or feature to identify a user as entitled to receive change. Of course, the user may choose to purchase other merchandise and apply their change against such purchases.

Alternative forms of the invention may be used in attended customer service environments. In an exemplary embodiment, such an environment may include a drive-through type fast food restaurant. In such a facility a customer may enter their order through an audio connection to a human service provider by making selections through an input device or through other suitable means. If the customer chooses to pay using a source of value such as an account associated with a credit or debit card, the card or article is presented to an appropriate reading device to identify the account. Alternatively biometric features of the user or other articles may be used to identify the user and/or their account.

Through an output device user may be presented with options to pay for their order from their account and/or to obtain an amount of cash. If the user wishes to obtain cash they do so by entering an appropriate input. The user is then provided with the capability of being identified as entitled to receive the cash and/or the merchandise they have ordered. This may be done for example by providing the user with a receipt or other paper document with indicia that can be used to indicate that they are entitled to the selected amount of cash. Alternatively items or information such as a code may be provided to or alternatively selected by, the customer which identifies them and/or the transaction. The code may then be used as a basis for providing cash. In other alternative systems biometric features of a customer or features of their clothing or vehicle may be used to identify them and/or the transaction which entitles them to receive the selected amount of cash.

In the exemplary fast food drive-through embodiment, the customer after leaving the order station travels to a cash receiving station. This may be the same as the merchandise receiving station where the customer receives their food. Alternatively it may be an intermediate station positioned between where the order is placed and where food is received. At the cash receiving station the customer and/or transaction is identified and the cash is delivered to the customer. This may be done for example by the customer presenting the article, feature or other characteristic, which indicates that the customer is the person entitled to the previously selected amount of cash. Such articles or features may include as previously discussed, a card or other article used to initiate the transaction, a document or receipt provided to the customer, a biometric feature of the customer, a code provided to or selected by the customer, a feature associated with the customer or their vehicle, or a combination thereof, which identifies the customer as entitled to receive the cash. In response to the identifying characteristic, the cash is provided to the customer at the delivery station.

The customer also receives their merchandise such as the food ordered. This may be done at the same station where the cash is delivered. Alternatively the customer may drive to another station to receive the food. The customer may identify themself as entitled to receive the merchandise using one or more of the features that were used to identify the customer as entitled to receive cash. Alternatively other or additional approaches may be used to verify that the customer is the person entitled to receive the ordered food.

In alternative forms of the invention a customer in a fast food drive-through environment or other customer service environment, may be provided with the option to receive cash at the cash delivery station and to make payment for the food or other merchandise using a portion of the cash delivered. In other alternative embodiments a customer who has initially chosen to pay cash for the merchandises delivered at the merchant delivery station may choose to obtain cash at the cash delivery station. This may be done by enabling the cash delivery station to operate in the manner similar to a drive-through type ATM, in addition to operating to dispense cash to customers who have previously made a transaction selection which includes a dispense of cash.

It should be understood that these applications of the present invention to self service and attended customer transaction environments are but examples of the present invention. Numerous variations and configurations of the invention may be made utilizing the principles discussed.

BEST MODES FOR CARRYING OUT INVENTION

Figure 1:
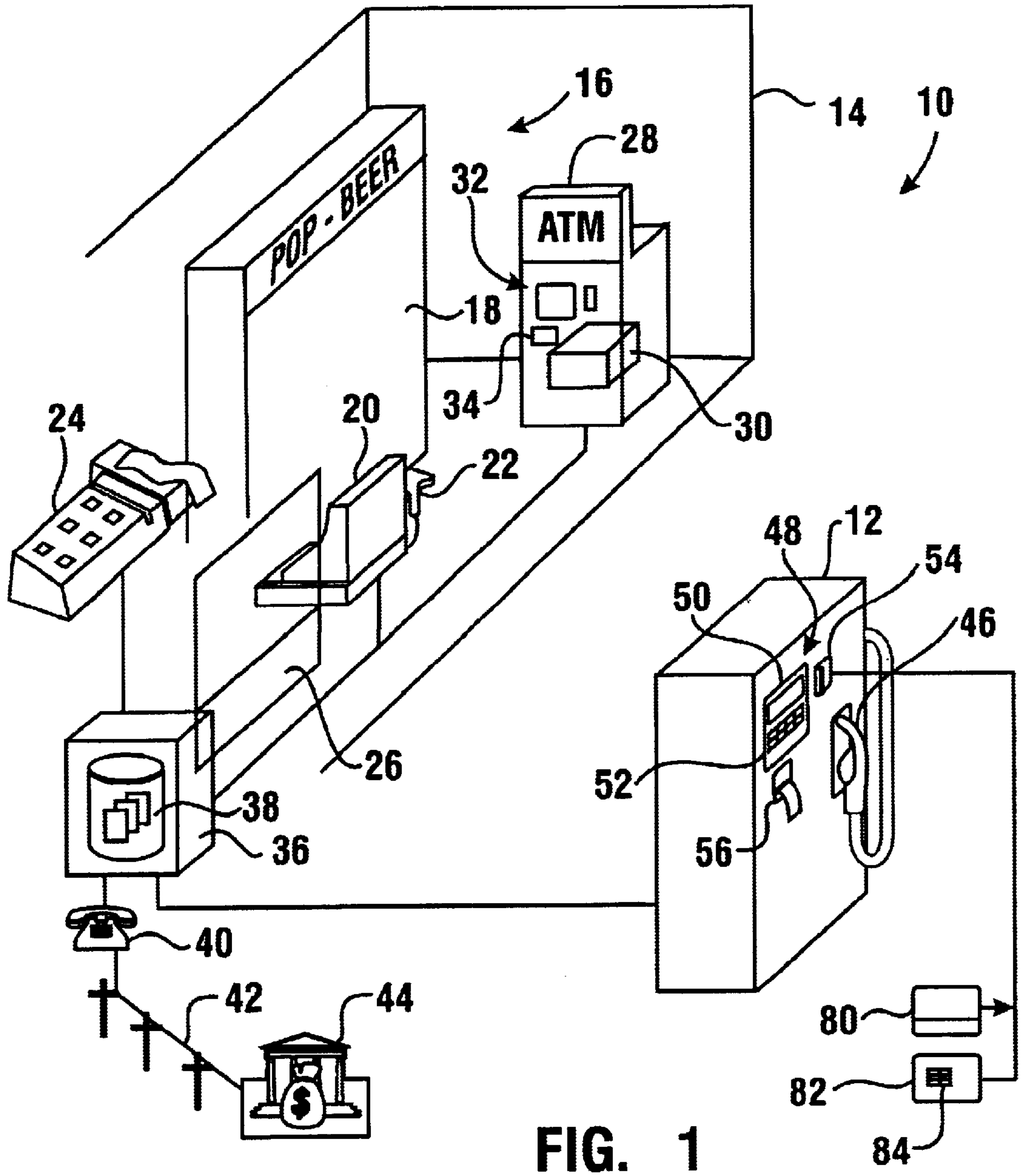
FIG. 1 is a schematic view showing a system of one exemplary embodiment of the present invention.

Referring now to the drawings and particularly to FIG. 1, there is shown therein a system for delivering cash in a self-service merchandise environment of a form of the present invention, generally indicated 10. System 10 includes a self-service dispensing machine 12. In the exemplary embodiment of the invention shown, the self-service dispensing machine 12 includes a motor fuel dispensing device which operates in an outdoor environment. It should be understood that embodiments of the invention may include a plurality of self-service dispensing machines operated as part of a single system. Systems of the invention may include other types of self-service dispensing machines.

The system further includes a facility generally indicated 14 which is remote from the self-service dispensing machines. In the embodiment shown, the remote facility 14 includes an indoor sales area generally indicated 16. The sales area 16 includes other merchandise generally indicated 18. In the embodiment of the invention shown the other merchandise 18 is in the nature of items that persons would typically buy at a convenience store, and is different from the merchandise dispensed by the self-service dispensing machine. Of course, in other embodiments of the invention other types of merchandise may be sold. It shall be understood that references to merchandise herein refers to both goods and services which may be purchased.

The remote facility shown further includes a supply of cash which includes cash housed in a cash register 20. The cash register 20 is connected to a reader 22 such as a bar code reader or other device for reading machine readable indicia. An output device 24 is included in the remote facility. The output device in the embodiment shown includes a fuel pump control console which includes a printer or other device for giving an indication of activity at the self-service dispensing machines. In the case where the output device 24 is a fuel pump control board the service provider within the facility is enabled to control or monitor operation of the fuel pumps or other self-service dispensing machines.

The remote facility of this exemplary embodiment further includes a service window 26 which extends through an exterior wall thereof. The service window 26 may be in some embodiments a walk-up window or a drive-up window. A service window 26 enables users of the system to exchange items with the service provider within the remote facility.

The sales area 16 of this exemplary embodiment includes a cash dispenser 28 therein. The cash dispenser 28 includes therein a portion of the supply of cash for the remote facility. The portion of the supply of cash housed within the cash dispenser is housed in a cash dispensing mechanism schematically indicated 30. The cash dispensing mechanism may be selectively operated to deliver currency notes to a user. The cash dispenser 28 further includes a customer interface 32. In the embodiment shown the interface 32 includes a reading device 34 for reading machine readable indicia.

The remote facility further includes at least one controller or computer schematically indicated 36. Computer 36 is in operative connection with a data store 38. The computer 36 is shown in operative connection schematically with the output device 24, the cash register 20 and the cash dispenser 28. It should be understood that in embodiments of the invention computer 36 may not be connected to all of these types of devices or may be connected to additional types of devices. Further, it should be understood that while in the embodiment shown a single computer and data store are described, in other embodiments a plurality of connected computers and data stores may be used. Therefore in the following description whenever a computer or controller is referred to, it shall be deemed to refer to a plurality of operatively connected controllers or computers as well as a single computer. Likewise herein when a data store is referred to it shall be deemed to refer to a plurality of connected data stores as well as a single data store.

As shown in FIG. 1, computer 36 is connected to a communications device schematically indicated 40. In embodiments of the invention the communications device may include any suitable type of communications interface for communicating electronic messages. This may include for example an interface to a modem, leased line, ISDN line, intranet interface, LAN interface, web interface or other device. Communications device 40 is shown schematically connected through a network 42 to a source of monetary value schematically indicated 44. In this example the source of monetary value is representative of a credit card processor, debit card processor, bank or other entity that is capable of transferring data representative of funds. It should be understood that in the operation of the invention the communications device 40 may selectively communicate with a plurality of entities which include sources of monetary value.

A self-service dispensing machine 12 in the exemplary embodiment shown includes a fuel nozzle 46. The fuel nozzle 46 may be used by a user to deliver merchandise in the form of motor fuel into a motor vehicle. The self-service dispensing machine 12 further includes a user interface 48. The user interface includes an output device 50 which can be used for outputting messages to a user of the machine. In the embodiment shown output device 50 includes a display screen. The user interface further includes an input device 52. In the embodiment shown the input device 52 includes a plurality of keys which may be selectively pressed by a user to provide inputs.

The user interface further includes an article reading device schematically indicated 54. The article reading device 54 in the embodiment shown includes a card reader which may be used for reading credit cards, debit cards as well as stored value type cards. Of course, in other embodiments other types of article reading devices may be used.

The user interface further includes an item delivering device 56. The item delivering device 56 in the embodiment shown includes a printer which can be used to provide a printed document type item to a user. Of course, in other embodiments other types of items may be selectively output to a user operating the self-service dispensing machine 12.

It should be understood that the user interface also includes other controls which a user may operate to control the self-service dispensing machine. These may include for example the controls on the nozzle which dispense the motor fuel. In addition, other or additional types of output and input devices may be used.

Figure 2:
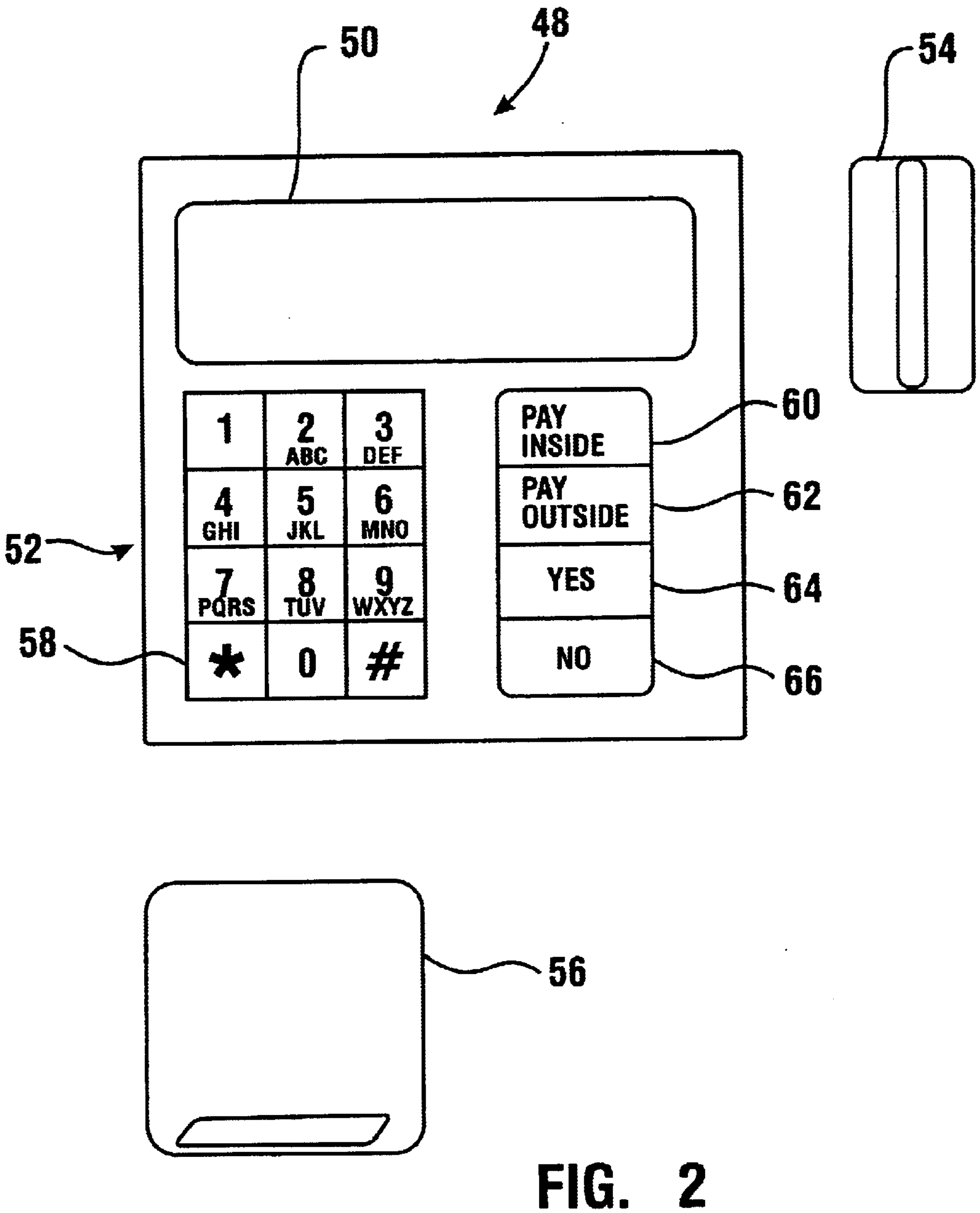
FIG. 2 is a front plan view of the user interface of a self-service dispensing machine included in the system shown in FIG. 1.

FIG. 2 shows an exemplary embodiment of components included in a user interface of the self-service dispensing terminal. In the embodiment described the input device 52 includes an alpha numeric keypad. The input device also includes four function keys 60, 62, 64 and 66. The function keys may be operated by a user in a manner later described to input instructions to the system. Of course, this arrangement of keys is exemplary and in other embodiments other arrangements and types of keys, input devices and functional inputs may be used.

The operation of the system represented in FIG. 1 will now be explained in greater detail with reference to certain typical exemplary transactions. A common exemplary transaction is a dispense of motor fuel where the user pays with cash or credit. The computer 36 has data included in its associated data store 38 which is used to produce certain outputs on the output device of the user interface of the self-service dispensing machine. These outputs which are referred to herein as "screens" may prompt a user in the operation of the system. Computer 36 is programmed to cause the interface to display the screens in response to the inputs and activities of the user and the self-service dispensing machine.

Figure 3:
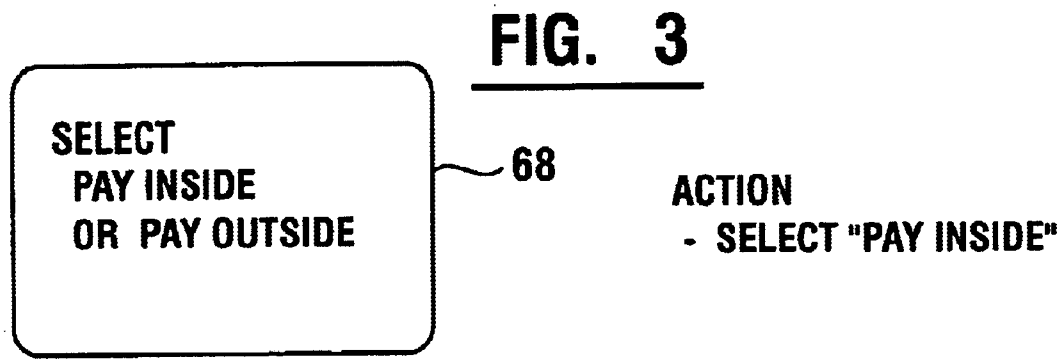
FIGS. 3 through 24 are views of exemplary prompt screens displayed on an output device of the user interface and the corresponding actions which occur in response to such screens.
Figure 4:
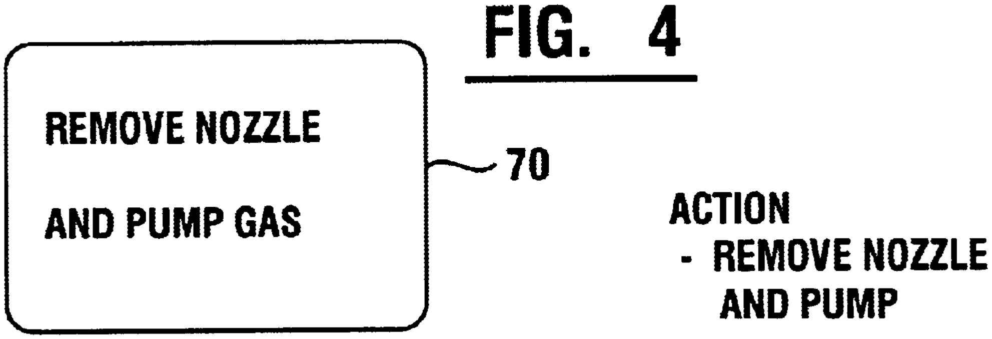

FIG. 3 shows a screen 68 which is presented to a user through the output device of the self-service dispensing machine. Screen 68 may be continuously presented until a transaction begins, or may be presented in response to sensing the presence of a user adjacent to the machine. This may be done for example with a proximity type sensing device of the infrared, optical or sonic type, for example, or in response to sensing the user touching the machine or lifting the fuel nozzle. Screen 68 prompts a user to push either function key 60 to indicate that they will pay by cash or credit inside the remote facility, or to press function key 62 which indicates that the user intends to pay with a type of card and that this will be a card based transaction. In this example the user elects to pay inside in which case screen 70 shown in FIG. 4 is presented. Screen 70 prompts a user to pick up nozzle 46 and pump the fuel into their vehicle.

Figure 5:
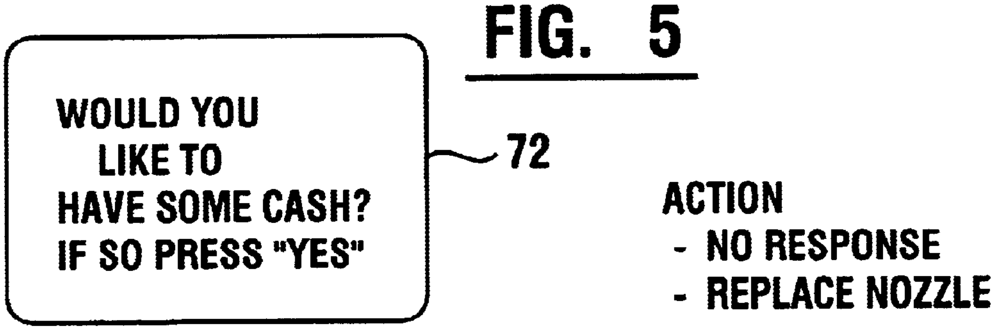
Figure 6:
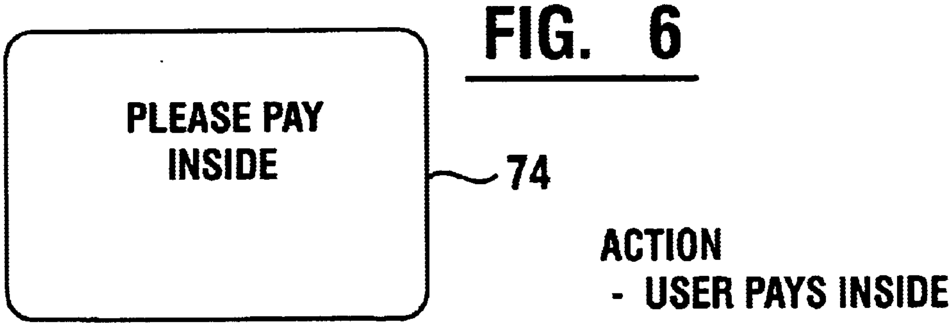

While the pumping activity is ongoing or at other times in the transaction sequence, the computer operates to cause screen 72 shown in FIG. 5 to be output through the output device. Screen 72 asks the user if they would like to receive some cash. If so, the user is prompted to press the "yes" key which is function key 64. In this example the user does not press the function key indicating they wish to have cash. When the user has stopped dispensing motor fuel, a screen 74 shown in FIG. 6 is presented. Screen 74 prompts the user to go inside the remote facility and to make payment for the charge associated with the value of dispensed merchandise.

Figure 7:
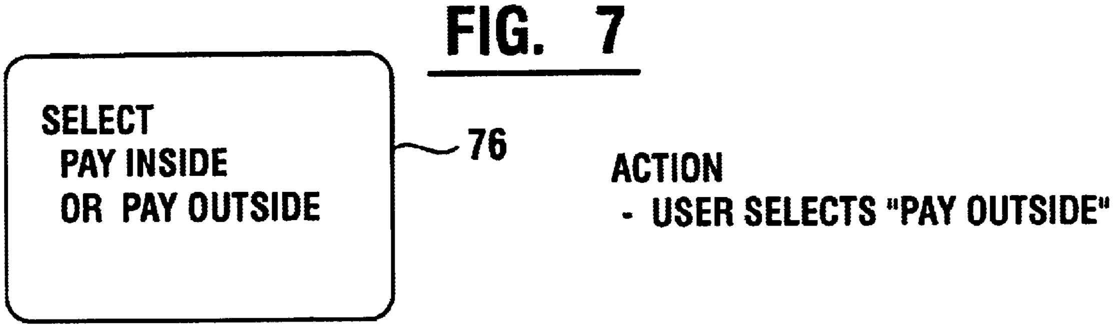

An alternative transaction in which a user chooses to pay by card is now described. FIG. 7 shows a screen 76 which is identical to screen 68. It should be understood that screen 76 and 68 are identical and are in fact the same screen. However, they are shown separately herein to facility understanding of the transaction flows carried out through operation of the computer.

Figure 8:
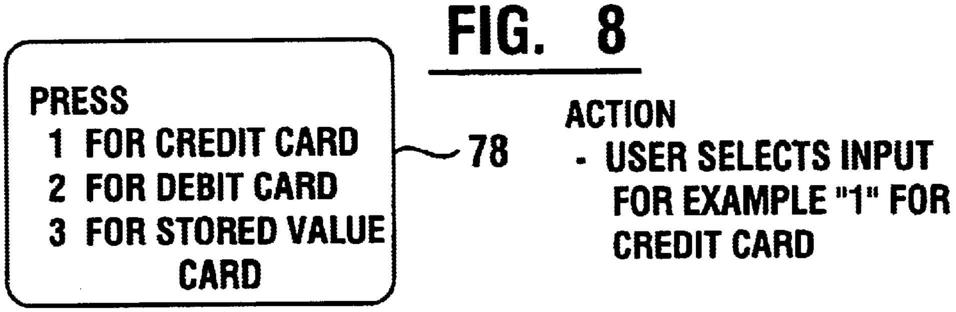

If the user selects the "pay outside" option from screen 76 by pressing function key 62, a screen 78 shown in FIG. 8 is caused to be displayed. Screen 78 prompts the user to indicate whether they intend to use a credit card, a debit card or a stored value card for purposes of paying for the transaction. FIG. 1 shows schematically the card types that may be used. Card 80 schematically represents a magnetic stripe card. The magnetic stripe card is a machine readable article with data encoded on the magnetic stripe. The data encoded on the stripe generally corresponds to the user and includes information such as the user's name, account number and other information related to charging for a transaction. The encoded information associates the card with a source of monetary value such as the Master Card®, VISA®, American Express® or Discover® programs or other programs or accounts which may be operated by a bank or institution. Debit cards are similar except that when using a debit card the user effectively withdraws funds directly from their account with a financial institution or other entity at the time of the transaction. Debit cards also require for their operation a verification input to identify the user such as the input of a personal identification number (PIN) to verify that the user is authorized to use the card. The physical structure of credit and debit cards are generally the same.

A stored value card 82 is also schematically represented in FIG. 1. Stored value card 82 may also have a magnetic stripe similar to debit and credit cards. Stored value cards have a programmable memory thereon. This programmable memory which is schematically indicated 84, generally holds data representative of value which can be used by the card holder in a manner similar to cash. The card memory may also hold programs and other information that may be used for verifying the authenticity of the user as well as to prevent tampering with the card.

Figure 9:
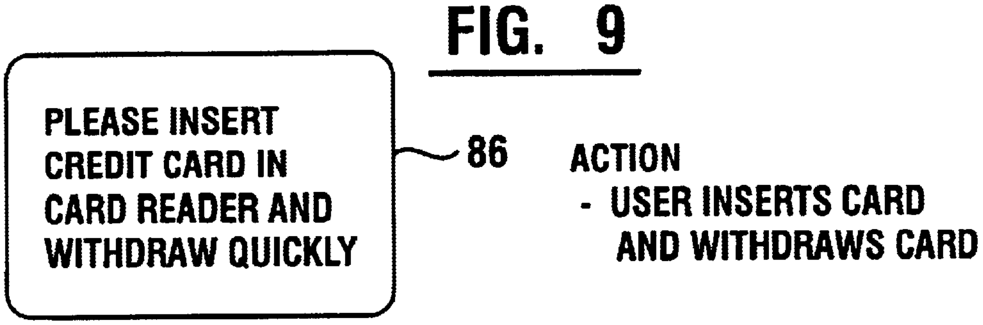
Figure 10:
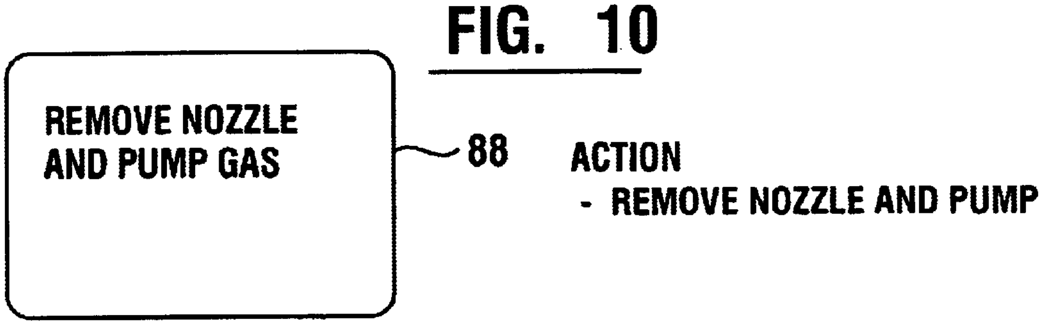

Referring now to the exemplary transaction in FIG. 8, it will be assumed for purposes of this example that the user inputs to the keypad an indication that they wish to pay with a credit card for the delivered merchandise. In response to the input by the user the computer causes a screen 86 shown in FIG. 9 to be displayed. Screen 86 prompts the user to input their card to the card reader and to withdraw it quickly so that the magnetic stripe can be read. A read head in the article reading device 54 reads the data on the magnetic stripe of the card and sends signals indicative thereof to the computer 36. The computer 36 then operates in accordance with its programming to cause the communications device 40 to contact the appropriate source of monetary value corresponding to the card to determine if the transaction is authorized. For purposes of this transaction it will be assumed that the source of monetary value responds with a message indicating that the transaction is authorized, and the user is presented with the screen 88 shown in FIG. 10. Screen 88 prompts the user to remove the nozzle 46 and begin pumping fuel.

Figure 15:
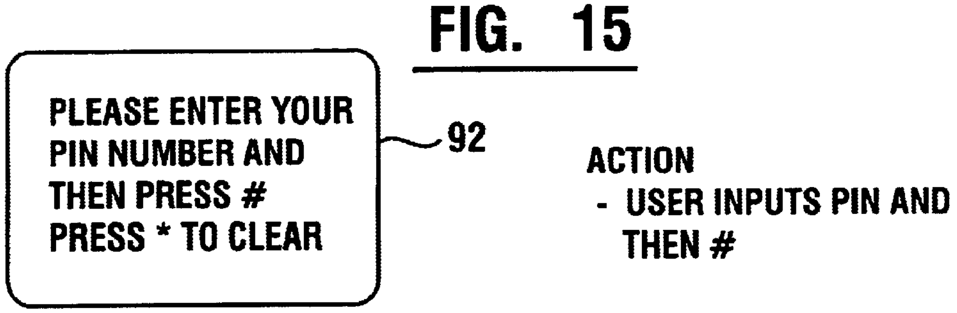
Figure 16:
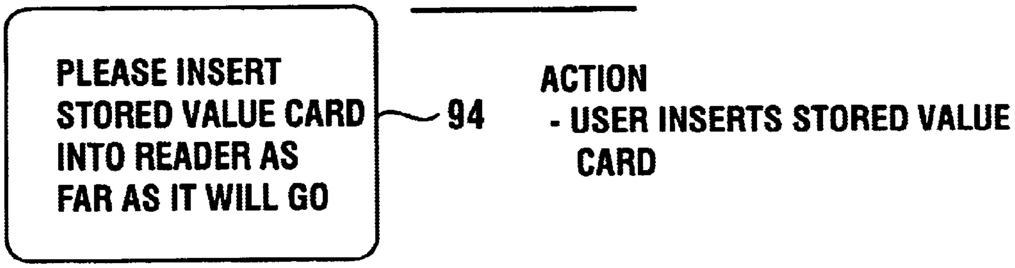

If in connection with the screen 78 the user had selected to charge the merchandise to a debit card, the user would have been presented by the computer with a slightly different set of screen prompts. For example, in this circumstance the user would have been presented screen 92 shown in FIG. 15. Screen 92 prompts the user to input their PIN number which is necessary for authorizing the use of the debit card. In response to the account number and PIN number input at the self-service dispensing machine, the computer 36 operates in accordance with its programming to check for authorization. If the card is authorized the transaction proceeds to the screen 88. In the case of a debit card where the user is being presented with options to dispense cash, the programming of the computer 36 may also check for the availability of funds at a level which is the maximum the user can reasonably be expected to be charging at the self-service dispensing machine and may actually make such a charge temporarily which can subsequently be reversed. Of course, other approaches may be used depending on the programming of the computer 36.

In the case where a user selects a stored value card from screen 78 the user is presented with a screen 94. Screen 94 prompts a user to insert their stored value card into the reader so that contact with the terminals of the memory may be made by the card reader. In the embodiment described the article reading device 54 is a reader capable of reading both magnetic stripe and stored value cards. However, in other embodiments separate readers for magnetic stripe and stored value cards may be used.

It should be understood that embodiments of the invention may not accept all the types of cards described in connection with this exemplary embodiment. For example, certain embodiments of the system may accept only credit cards. Alternatively, embodiments of the invention may accept additional types of cards or items which can be associated with a source of monetary value from which payment may eventually be obtained. This may include optically encoded or non-contact type cards. Other forms of the invention may identify a source of monetary value based on other forms of inputs. For example the system may be configured to identify a user by a biometric input such as a thumbprint, iris scan or other characteristic or combinations thereof. Other embodiments may identify a user by appearance of their face and/or voice. This may be accomplished in the manner disclosed in allowed patent application Ser. No. 09/037,559 filed Mar. 9, 1998, the disclosure of which is fully incorporated herein by reference. Other forms of the invention may identify aspects associated with a vehicle. This may include for example the ability to read an optical characteristic such as a license plate tag number and to correlate this through operation of the computer with an account of a particular user. Likewise RF signals such as from a RF backscatter device carried by a user or on the vehicle may be used to identify the user and/or an account. Alternatively the user may input information identifying a source of monetary value through a infrared emitter device or by using a cell phone or personal computer to make a connection to a number or to a network IP address and to provide inputs corresponding to an account or other source of monetary value. Additional approaches for identifying a source of monetary value to pay for the transaction will be apparent from this description.

Figure 17:
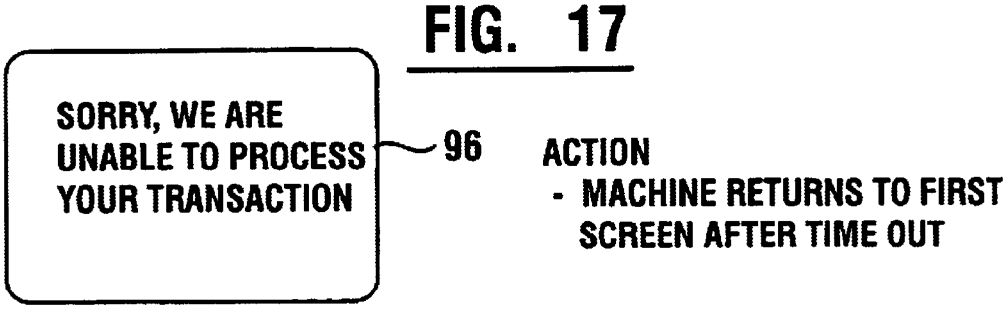

In embodiments of the invention there is provided for the contingency that a user's card or other article is not authorized. In this case the screen 96 shown in FIG. 17 is presented advising the user that the machine is unable to process the requested transaction. After a timeout or in response to another input the computer may return the output device to another point in the menu system.

Figure 11:
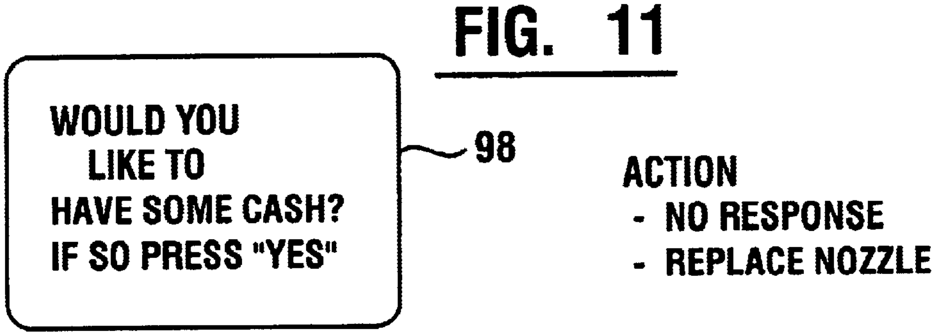
Figure 12:
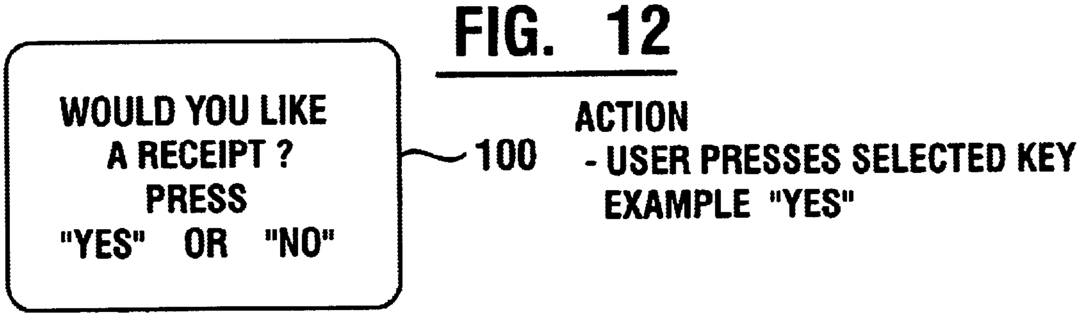

Assuming for purposes of this transaction example that a user has input a proper card and has properly accessed the system, they will be authorized to dispense the merchandise which in this case is the motor fuel from the self-service dispensing machine. At various times while the dispense is ongoing or at other times during the transaction, the output device 50 of the user interface may present the screen 98 shown in FIG. 11 which is similar to screen 72. This screen which is caused to be presented by operation of the computer 36 prompts a user concerning whether they would like to receive cash. In the example shown in connection with FIG. 11 the user does not press the input key to receive cash. When the user is done and the nozzle is replaced the computer 36 causes the output device to display the screen 100 shown in FIG. 12. Screen 100 prompts the user to press either function key 64 or 66 to either accept or decline a receipt. In this example the user presses function key 64 to indicate that they wish to receive a receipt.

Figure 13:
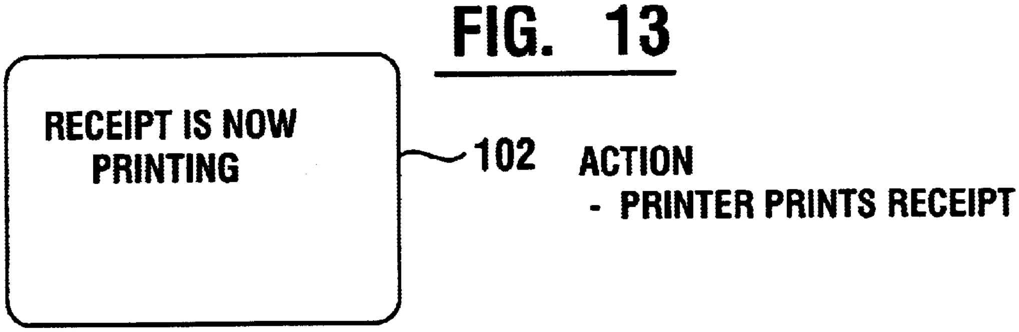
Figure 14:
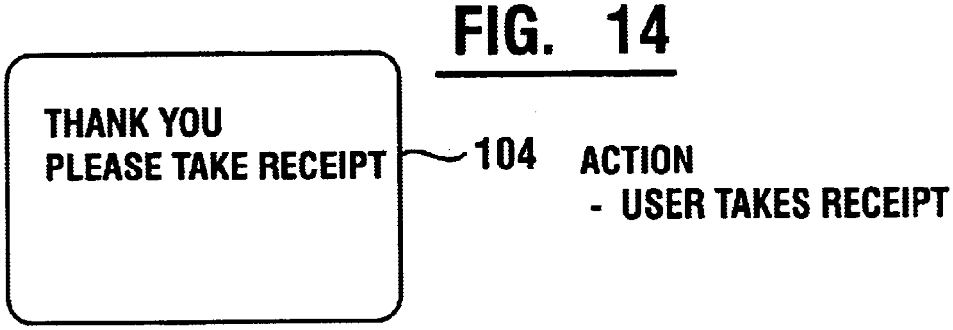

The computer causes the printer in the self-service dispensing machine to print a receipt. This is done by item delivery device 56. While the receipt is printing a screen 102 shown in FIG. 13 is output by the output device. When the receipt has been printed the item dispensing device presents the printed item to the customer by making it accessible outside the self-service dispensing machine. The computer also causes the screen 104 shown in FIG. 14 to be displayed. The user may then take the receipt which completes the transaction.

Figure 18:
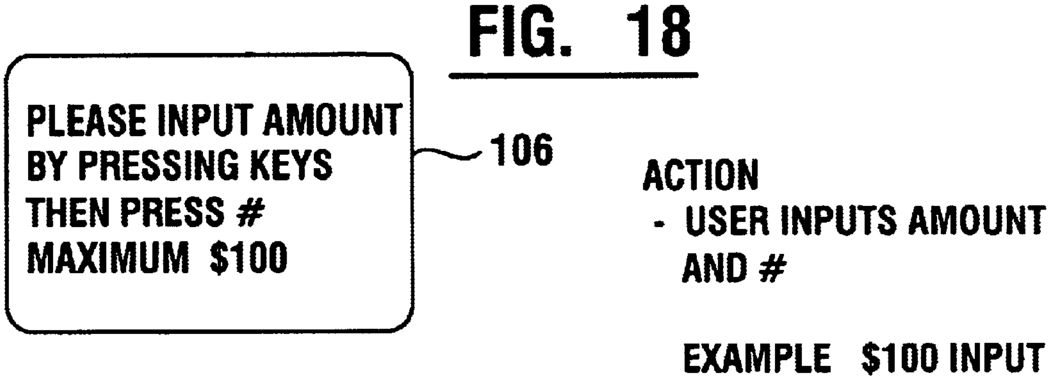

A useful aspect of this described embodiment of the invention is the ability of a user of the self-service dispensing machine to receive cash and to charge it to their indicated source of monetary value. If in response to screen 72 which is the same as screen 98, the user indicates through an input to function key 64 that they would like to receive cash, a screen 106 shown in FIG. 18 is displayed. Screen 106 prompts a user to input an amount through the keys on keypad 58. The user is also prompted to press the "pound" key when the desired amount is input. Screen 106 also indicates the maximum amount that the customer may receive. This may be set by the system operator or may be made to vary from customer to customer depending on the type of card payment and source of monetary value involved. In the case of screen 106 the maximum is set at $100.

Figure 19:
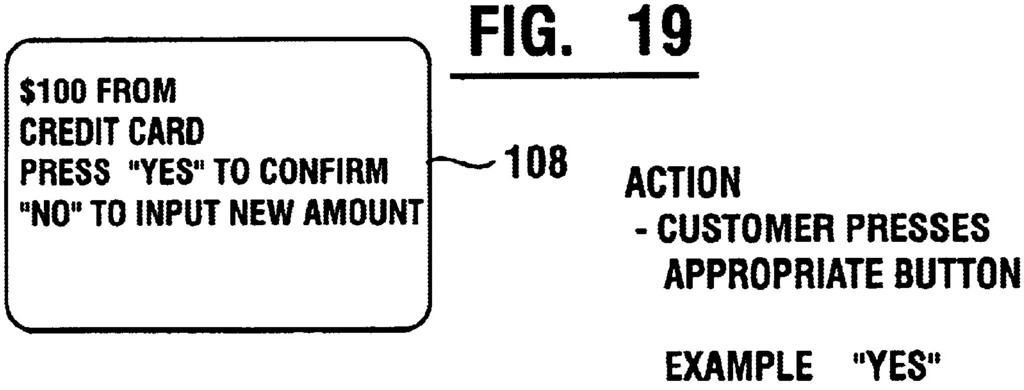

For purposes of this example it will be assumed that the user inputs $100 in response to screen 106. The computer then causes a screen 108 shown in FIG. 19 to be displayed. Screen 108 indicates the amount the user has requested and asks them to confirm their request by again pressing the "yes" key which is function key 64. The user is also provided the option of pressing the "no" which is function key 66.

Figure 20:
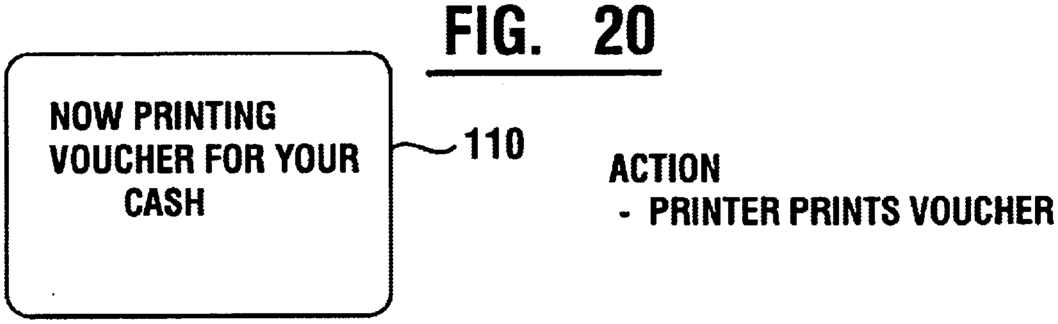

Assuming that the user chooses to proceed with the cash withdrawal, the computer then operates to cause the item delivering device 56 to print an item such as a voucher which can be redeemed for cash by the customer at the remote facility. While this voucher is printing, a screen 110 shown in FIG. 20 is output through the output device. In embodiments of the invention the voucher device may be a printed document that includes data representative of the cash value, as well as values or indicia which enable identifying the user and/or the transaction. In alternative forms of the invention the item delivered from the self-service dispensing machine may include machine readable indicia. This may include for example a bar code indicative of the amount to be provided to the customer as well as other information. Alternative forms of the invention may deliver other types of articles to the user other than a printed document. For example, a user may receive a card type article with information encoded thereon which indicates the transaction and/or the amount.

The computer 36 is also operative to provide an indication to the service provider in the remote facility that the user has requested a dispense of the amount. This is done in the described embodiment through the output device 24. This may be done for example by the printer associated with the output device printing information about the customer's card and the pump number or other identification for the self-service dispensing machine that the customer is operating. This information informs the service provider that they are going to be providing a user with a cash amount. Alternatively, in some embodiments the service provider may be advised of the user's request for the amount only by the user presenting the voucher at the facility.

Figure 21:
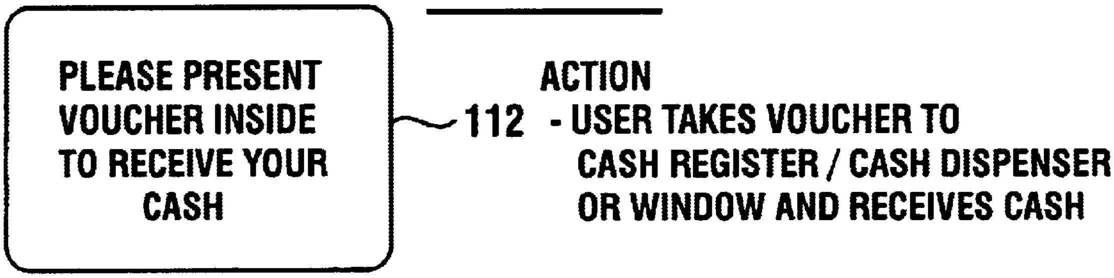

The user is provided with a screen 112 shown in FIG. 21 after the item has been presented. For purposes of this example the item will be a printed document which includes machine readable indicia thereon. Of course, as previously described other types of articles may be provided.

The user completes dispensing the motor fuel from the self-service dispensing device and returns the nozzle to its storage location. In response to this action computer 36 may cause to be displayed on the output device screen 114 shown in FIG. 22. Screen 114 reminds the user to take their voucher and to present it to the service provider.

The computer 36 in the described form of the invention is also operative to generate and store in the data store 38 a charge record. The charge record is preferably operative to hold information concerning the transaction including the charge which is the value of the merchandise that the user dispensed as well as the amount associated with the cash the user receives from the service provider. Preferably the charge record holds a total of both the charge and the amount as well as the other information necessary to assess the total amount against the source of monetary value. This may include for example the user's name, account number, the transaction type, the service provider's identifying number and other information which comprise a record for a transaction of the type that has been conducted. The transaction record or one or more separate records may include the information necessary to correlate the information on the voucher or other item presented to the customer with the transaction and the data representative of the fact that the customer is entitled to receive the monetary amount. After the customer receives the amount the record may also be updated to reflect that the amount has been delivered. In the case of a credit card transaction the charge record will typically be accumulated into a batch which is periodically sent to a credit card processor for settlement. Alternatively, if a debit card transaction is being conducted the computer 36 may operate in accordance with its programming to transfer the funds immediately from the account of the user to account of the merchant through messages communicated by the computer 36.

If a smart card has been used as the source of monetary value, the computer 36 operates the self-service dispensing machine and communicates with the stored value memory through the article reading device so as to modify the memory to indicate the reduction in the amount of value stored on the card. The computer further operates to affect the transfer of this value to the system operator's account. Of course, additional or alternative approaches may be used.

Once the user has received the item which in this case is a voucher for cash, the user may travel to the remote facility either on foot or in their vehicle. If the user travels in their vehicle or on foot they may approach the service window 26. At the service window the user presents the voucher to the service provider who may visually review it and/or may scan it with the reading device 22. If the voucher is scanned with the reading device the computer 36 may be operative to verify the genuineness of a voucher in accordance with its programming. Alternatively, the user can visually inspect the voucher and compare it to the information provided through the output device 24 to verify that it is genuine. The service provider may then obtain the cash from the supply such as the cash register and deliver it to the user through the service window.

In alternative forms of the invention the service window may be a drive-up window strategically positioned so the user passes it on his or her way from or through the facility. Using this approach the user may receive their cash from the service provider in their car which facilities speeding up the transactions. In addition, by having the user pull away from the dispensing machine, the dispensing machine becomes available for someone else to use. If the service window is a walk-up type window the user may receive their cash while not having to enter into the interior of the remote facility. This approach may be particularly helpful at certain times of the day when enhanced security is required. At such times the door to the interior of the facility may be locked, but users may still dispense motor fuel and receive cash through the service window. Under these circumstances the service window may include theft deterrent features such as bullet-resistant glass, rising shields or other types of devices.

In yet a further alternative method of using the invention the user may enter the remote facility and present their voucher. The user may also purchase other merchandise which is available for purchase within the facility. When the user presents their voucher the amount of cash the user is to receive may be reduced by the service provider by the amount of other merchandise or services that the user is purchasing.

In yet another alternative the cash dispenser 28 may have thereon or in operative connection therewith, the reading device 34 which is operative to read the machine readable indicia on the voucher or other item or information that is presented by the user to receive their cash. In this example the user may insert the voucher into the reading device and have the cash dispensed by the cash dispensing mechanism 30. This provides the user with the cash in the remote facility. Having such cash available may cause the user to make an impulse purchase of other merchandise which is available at the facility. The additional purchase may be paid for with the cash that has been dispensed from the cash dispenser.

Alternative forms of the invention may provide other types of identifying inputs that a user may present at the cash dispensing machine to receive their cash. For example instead of a voucher or other item, a user may be provided with a code through the output device of the self service dispensing machine. This code may be memorized by the user and input through a keypad on the cash dispensing machine. Alternatively the code may be printed on the voucher or receipt which a user may refer to input the code into the keypad. Alternative forms of the invention may enable the user to select their own code which is input on the keypad of the self service dispensing machine. This user selected code may then be presented by an input to the cash dispensing machine and the cash dispensed in response thereto. Alternative forms of the invention may utilize biometric features or combinations thereof including for example facial features, voice, fingerprints and iris scans as the identifying input. Alternative forms of the invention may further employ the user's card or indicia printed or encoded thereon as the identifying input to the cash dispenser which causes the appropriate amount of cash to be dispensed. Of course on dispensing of the cash the computer operates to update the information stored in the data store to indicate that the user has taken their cash and/or to include data representative of a charge to a user's account or other source of monetary value for the amount of cash received. The updating of the record also causes the computer to operate so that if the identifying input is provided again, absent initiation of another transaction, no further cash is dispensed.

An advantage of providing the cash from the cash dispensing mechanism 30 is that the service provider will generally be dealing with cash purchases. This enables serving customers more quickly. Also the operator of the facility may use cash from the cash register or other areas of the cash supply to periodically replenish the cash dispenser. This minimizes the need for the operator to have a separate cash handling company supply cash for the cash dispenser.

Various forms of the invention may require a user to present other or additional identification or verification information in order to receive cash from the service provider. Such identification indicia may include a machine readable article or user readable article which can be used to verify the identity of the user or the card transaction. This may include for example a driver's license or other identification card. Alternatively, the identification device may include a requirement for a biometric input such as a thumbprint which may be scanned and cause corresponding data to be stored electronically in correlated relation with the charge record. The identification device may be the card used to carry out the transaction, which can be read visually or with a further reading device for confirmation purposes. Such information will generally minimize the risk of unauthorized transactions. In addition, capturing such biometric inputs may facilitate identifying persons responsible if it is later determined that the transaction was not authorized. Other types of identification indicia and processes may be used for verifying that the user is entitled to receive the cash.

The system shown in FIG. 1 may also be used to provide cash value directly at the self-service dispensing machine. This may occur for example, when the user uses a stored value card. In the case of a stored value card the user may request a transfer of monetary value to the memory on the card. When this is done, appropriate prompts through the output device may be provided. The card reader or other article reading device may operate to modify the stored value memory on the card to load the further amount that the customer has requested to the smart card. During such transactions the computer 36 operates as in the case of other transactions. In addition, the computer 36 operates to control the article reading device within the self-service dispensing machine so as to load the additional value that the customer has requested. Once the additional value has been loaded on the card the customer may take the card and use the value thereon for making purchases at the remote facility or in other locations.

The useful aspect of the system described in connection with FIG. 1 is that it may be implemented using self-service dispensing machines that have been set up for carrying out card based transactions. The computer 36 may be programmed to have the printing devices within such machines print vouchers or enable the user to provide data or inputs, which may be exchanged by a user for cash. In addition, the user receives the cash in a remote facility where other merchandise is available for purchase. Under such circumstances the user is likely to make an impulse purchase which increases the profitability of the system for the operator.

In addition, the system of the described embodiment may also be configured to prompt the user to make other purchases which can be speeded up in the transaction environment. For example, prompts through the output device 50 may query a user concerning purchases such as lottery tickets, cigarettes or other articles. This information can be communicated to the service provider in the facility through the output device 24 or other suitable communication devices. These items can be set aside for the user in advance and promptly provided to the user through the service window or inside the facility promptly upon the user's arrival. This further speeds transaction throughput and allows the user to take greater advantage of their available source of monetary value. It should be understood that many variations of the invention are possible and that while this described exemplary embodiment is used in connection with a motor fuel dispensing environment, many other embodiments employing the teachings of the invention may be devised.

Figure 25:
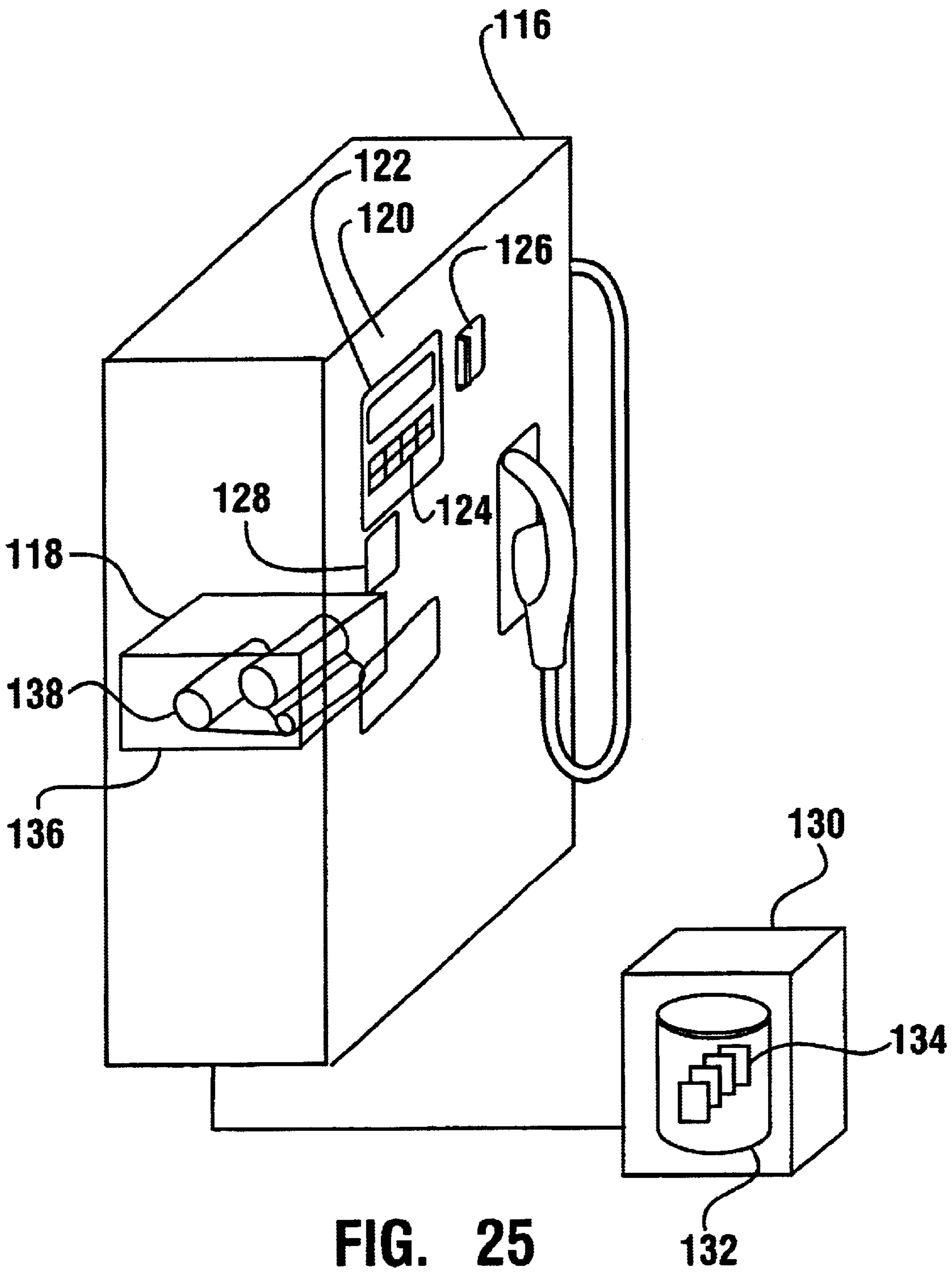
FIG. 25 is an alternative form of a self-service dispensing machine of the invention.

FIG. 25 shows an alternative form of a self-service dispensing machine generally indicated 116. Machine 116 is generally similar to machine 12 except as otherwise specifically described. Machine 116 is also a motor fuel type dispensing machine. However, it should be understood that other types of self-service dispensing machines may be used. Self-service dispensing machine 116 differs from machine 12 in that it includes a cash value dispensing mechanism generally indicated 118 housed within the interior thereof or adjacent thereto. Cash value dispensing mechanism 118 is operative to dispense notes therefrom in response to inputs by the user. Machine 116 also includes a user interface generally indicated 120. The user interface includes at least one output device 122. Output device 122 may include a display screen or other type of device for outputting prompt messages to a user.

User interface 120 also includes at least one input device 124 for accepting user inputs. The input device 124 may be similar to the keypad 58 and function keys 60 described in connection with the previous embodiment. Of course other types of input and output devices may be used.

The user interface further includes an input device which operates as an article reading device 126. The article reading device is operative to read articles associated with a source of monetary value. This may include for example credit cards, debit cards and smart cards similar to those previously discussed. The user interface further includes an item delivering device 128 which is operative to deliver items to the user. Item delivering device 128 may include a printer for delivery of printed documents or other mechanisms for delivering other types of items to a user.

Machine 116 as well as the dispensing mechanism and components of the user interface are in operative connection with a computer or controller schematically indicated 130. Controller 130 includes a database schematically indicated 132 in operative connection therewith. As previously discussed in connection with computer 36, controller 130 may be a single computer or a plurality of connected computers, and data store 132 may be a single data store or a plurality of data stores. Controller 130 generally operates in a manner similar to computer 36 previously described. This includes responding to stored data to generate display screens on the output device of the self-service terminal. The controller 130 further operates to generate messages and charge records schematically indicated 134. The charge records are stored in the data store and provide records of transactions so that among other things, amounts can be settled and/or transactions verified between the operator of the system and the system users.

The cash value dispensing mechanism includes a cash supply component schematically indicated 136 in FIG. 25. The cash supply component preferably is removably mounted within the machine 116. The cash supply component 136 preferably includes a supply of currency notes 138 which in the described embodiments are a roll of notes from which notes may be dispensed. The cash supply component is preferably held in position on the machine 116 with a locking mechanism or other securing device which serves to hold it in the operative position. When it is desired to remove the supply of notes from the machine such as to secure the machine when the facility is closed or at other times, the cash supply component can be released and removed from the machine. This enables the supply of notes to be stored in a more secure place. The exemplary form of the invention also enables the machine 116 to continue operating to dispense merchandise even when no supply of cash is present. This is accomplished through appropriate programming of the controller 130 to enable the merchandise dispensing activity even though the cash supply component is removed or depleted. Alternatively, the system can be programmed to provide vouchers that can be redeemed for cash at the facility when cash dispensing capability is not available or enabled at the machine.

Figure 32:
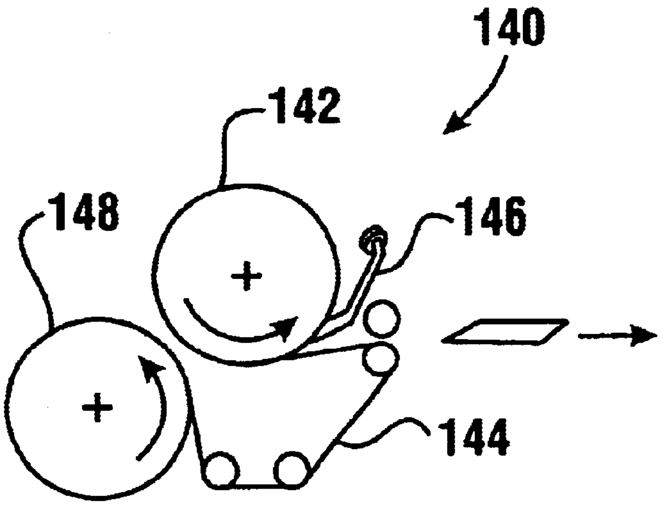
FIG. 32 is a schematic view of a first form of a cash value dispensing mechanism used in connection with the machine shown in FIG. 25.

Examples of the operation of the cash value dispensing mechanism are shown with reference to FIGS. 32 through 37. FIG. 32 shows a cash value dispensing mechanism generally indicated 140. Notes are preferably wound onto a roll 142 and are held therein by a flexible web 144. In the embodiment shown the notes are held to the web only by the physical wrapping action of the notes within the layers of the web.

Rotation of roll 142 in the counterclockwise direction shown causes notes to be exposed as the web 144 is unwound. A note/web separating mechanism 146 serves to separate the notes from the web. The notes may be then moved outward therefrom in the direction of the arrow as shown, to a user. The portion of the web from which the notes have been separated is rewound onto a roll 148.

Figure 33:
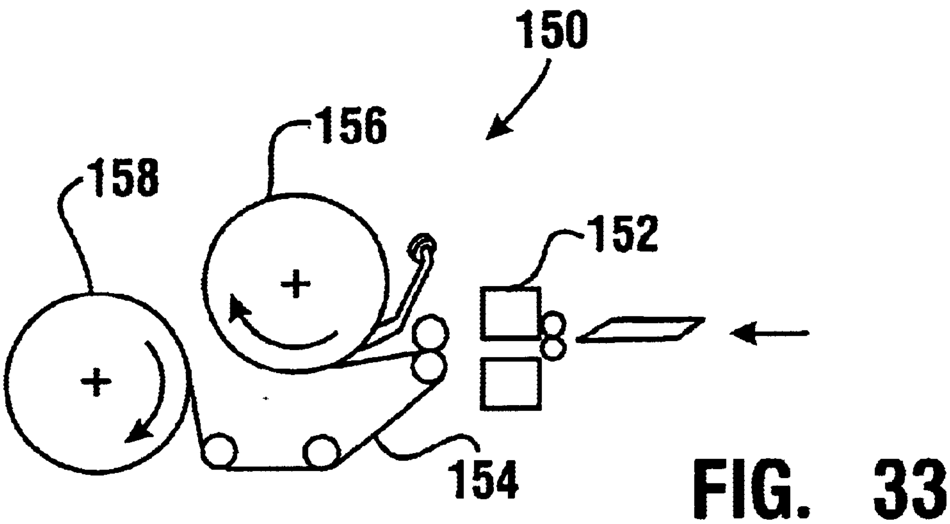
FIG. 33 is a schematic view of a cash value dispensing mechanism similar to that shown in FIG. 32 combined with a cash value accepting device.

FIG. 33 shows a cash value dispensing mechanism 150. Dispensing mechanism 150 operates in a manner similar to dispensing mechanism 140 when dispensing notes therefrom. Mechanism 150 however is operatively connected to a cash value accepting device schematically indicated 152. The cash value accepting device is operative to identify genuine and acceptable denomination notes and to pass such notes inwardly in the direction of the arrow such that a genuine note may engage the web 154. Notes which are not genuine, the proper denomination, are suspect or are otherwise not acceptable to the cash accepting device, are rejected by the device 152 and are prevented from passing into engagement with the web.

Rotation of the rolls 156 and 158 in the clockwise direction shown is operative to engage an inserted note with the web and to roll such notes onto roll 156. This enables accepting cash value articles such as notes into the self-service dispensing machine. The dispenser 150 may also operate to dispense notes selectively by rotating the rolls in the counterclockwise direction so as to dispense notes therefrom in a manner similar to dispensing mechanism 140.

Figure 34:
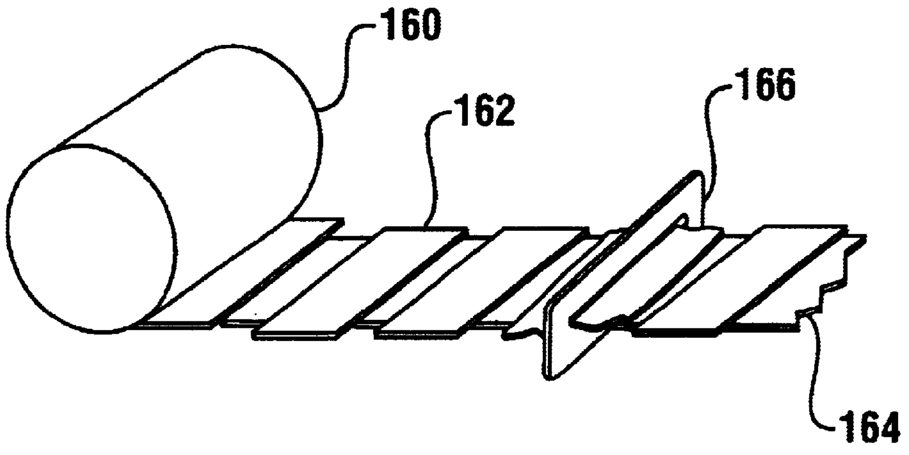
FIG. 34 is an isometric view of a roll of currency notes releasibly attached to a web used in connection with a cash value dispenser mechanism.

FIG. 34 shows an alternative roll of notes schematically indicated 160. In roll 160 notes 162 are releasibly attached to a web 164. Notes 162 are preferably attached to the web 164 with a releasible adhering component such as a releasible adhesive, static charge or other device or material which enables holding the notes in connection with the web for handling within the machine, but which enables the notes to be readily released therefrom once they have passed through an opening of the machine 116 schematically indicated 166.

Figure 35:
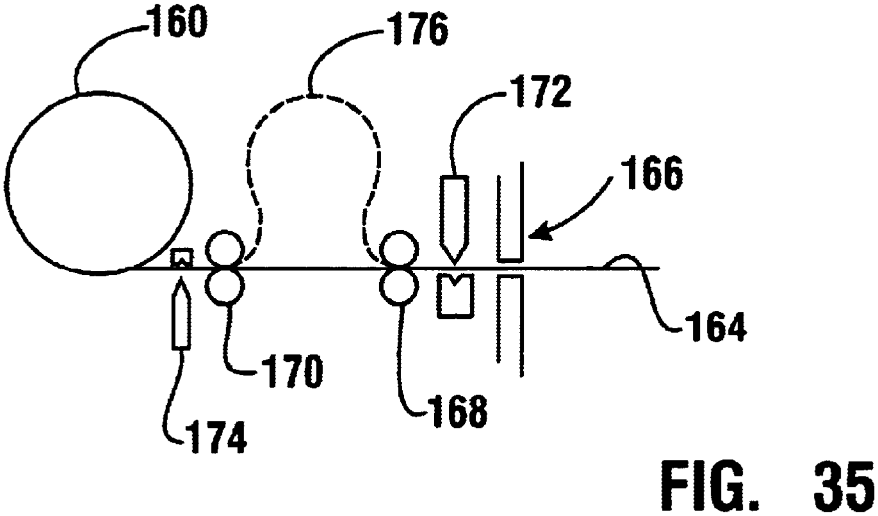
FIG. 35 is a schematic view of a mechanism used in connection with the roll of notes

FIG. 35 shows a mechanism within the machine for handling a roll of notes such as roll 160. The web 164 with the notes attached is engaged and moved by a first engaging device 168 and second engaging device 170. The first and second engaging devices are operatively connected to motors or other moving devices which are operated under the control of the controller. The first and second engaging devices independently move the web 164 and generally operate to move the web outward through the opening 166. A first releasible holding device 172 is positioned adjacent to the opening 166. A second holding device 174 is positioned adjacent to the roll. A releasible holding device is operated under the control of the controller in response to sensors which are positioned adjacent to the web.

The dispensing mechanism shown in FIG. 35 is particularly adapted to prevent unscrupulous persons from extracting more than the intended amount of notes by pulling on the web. Such unintended dispensing is reduced by operating the first and second engaging devices 168 and 170 to produce a loop schematically indicated 176 in the web. The loop is sized to include the notes which are to be dispensed within a particular transaction. While the loop is being accumulated the controller operates the first holding device 172 to hold the web in fixed relation. Once the loop has been created the holding device 172 enables the web to move while the computer operates the second holding device 174 to hold the web stationary. The engaging device 168 then operates to move the notes in the loop outward through the opening to the user. If the user receiving the web attempts to pull the web 164 further outward such attempts will be prevented by the engagement of the web with the second engaging device 170 and the second holding device 174. As a result, the user will not receive more notes than they were intended to receive. In addition, sensors provided within the machine may sound alarms and may also initiate other actions to prevent unauthorized compromise of the mechanism for dispensing of notes from the machine.

Figure 36:
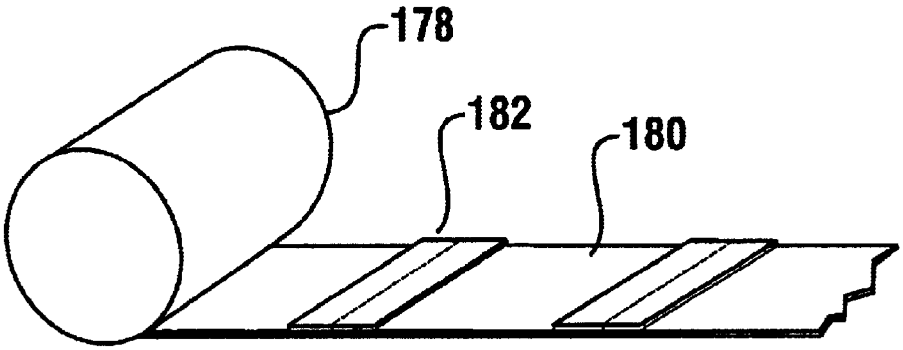
FIG. 36 is an isometric view of an alternative form of a roll of notes in which the notes are connected at the edges by releasible connecting members.

FIG. 36 shows an alternative roll of notes 178. Roll 178 includes notes 180 which are generally arranged closely or contiguously with other notes at opposed edges. A releasible connector 182 spans the adjacent edges of the notes and connects areas of the notes near the edges together. The releasible connectors 182 are preferably flexible members which can conform to the contour of the notes when held within the roll. In this exemplary form of the invention the releasible connectors include a releasible adhesive which holds the notes in generally engaged relation but which enables the notes to be readily separated upon application of a transverse force.

Figure 37:
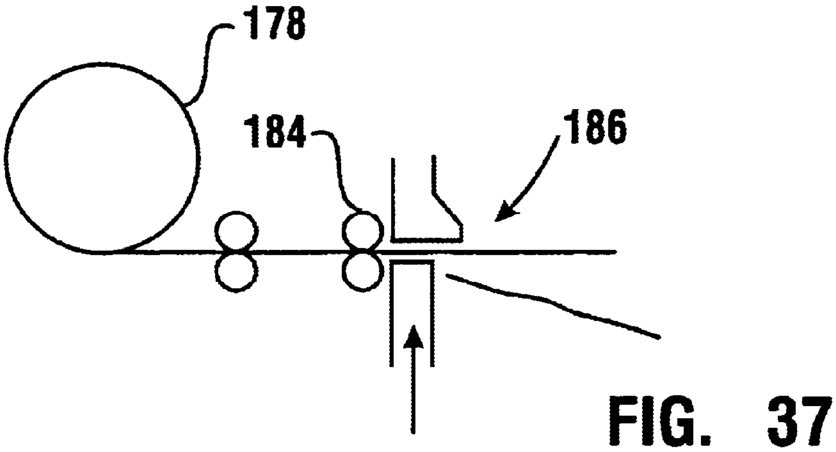
FIG. 37 is a schematic view of an alternative dispenser used for dispensing notes from the roll of notes shown in FIG. 36.

FIG. 37 shows an exemplary mechanism for dispensing notes in a roll such as roll 178. The notes in the roll may be moved by moving devices 184 outward through an opening 186. Opening 186 is configured to have a wider face on one side as shown. The wider face generally enables readily separating notes from the connecting members by moving a note transversely downward whereas upward movement will not tend to separate the note. As a result, notes may be moved outward through the opening 186 and the note adjacent to the opening 186 separated by the user by pressing downward. Of course, additional mechanisms and sensors may be provided as discussed in connection with the embodiment shown in FIG. 35 for preventing the unauthorized removal of notes from the supply. However in this exemplary form of the invention the nature of the connecting members is such that unauthorized attempts to remove notes will result in breakage or separation of the notes from the connectors and minimize the risk of unauthorized removal.

It should be understood that the note supplies discussed are used in connection with exemplary embodiments of the invention. Other embodiments of the invention may use other types of note supplies and dispensing mechanisms for selectively providing notes to users.

The alternative self-service dispensing machine 116 may be operated by the controller 130 in a manner similar to machine 12 previously discussed. This is true for cash dispensing transactions and merchandise dispensing transactions. The difference with machine 116 compared to machine 12 is that instead of printing a voucher or delivering a code or another type item or input that can be redeemed for cash, machine 116 actually delivers notes directly to the user.

Figure 22:
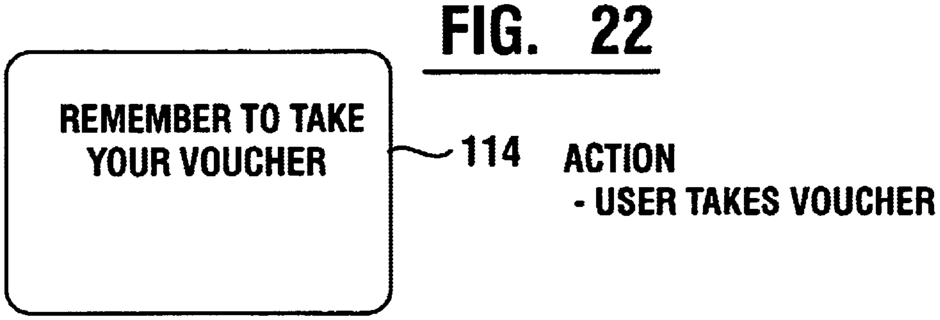
Figure 23:
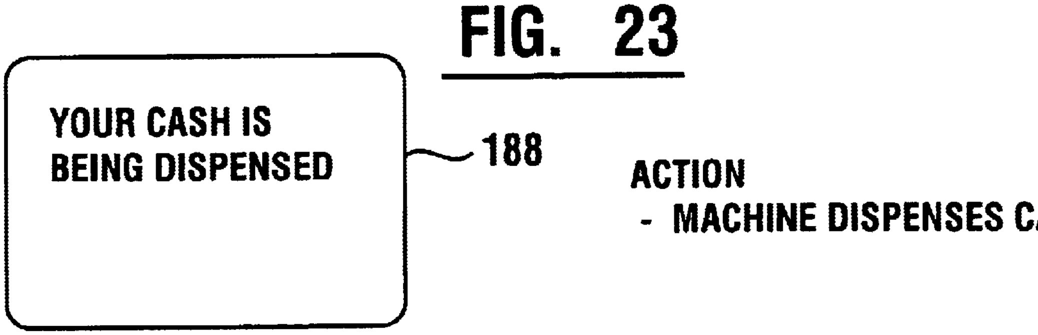
Figure 24:
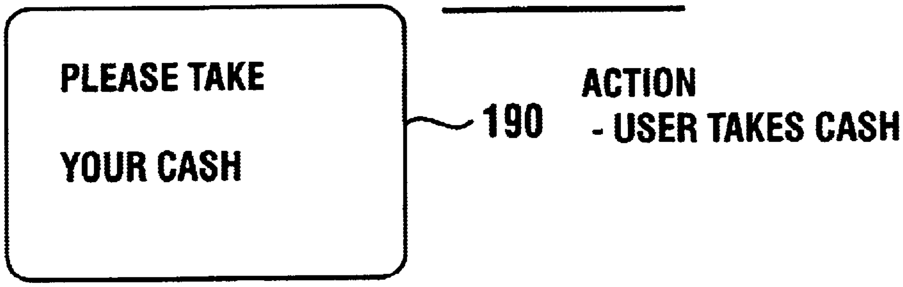

For example, in the transaction flow used in connection with machine 116 (assuming the cash dispensing mechanism is in place and is operational) screens 110, 112 and 114 shown in FIGS. 20, 21 and 22, respectively, would not be used. Rather, the controller 130 would operate the cash value dispensing mechanism 118 to deliver notes directly to the customer. Thus, instead of screen 110 being presented, machine 116 would preferably display in its place the screen 188 shown in FIG. 23 to indicate to the user that their cash is being dispensed. Thereafter a screen 190 shown in FIG. 24 will be presented on the output device reminding the user to take their cash.

The use of the cash value accepting device in connection with machine 116 also provides the user with the option to make payment for merchandise to be delivered with cash value items being input into the machine. These cash value items may be currency notes for acceptance by the cash value accepting device. Alternatively, cash value may be supplied by a user through a stored value card in the manner that has been previously discussed. Alternatively, machine readable vouchers or checks may be accepted.

Figure 26:
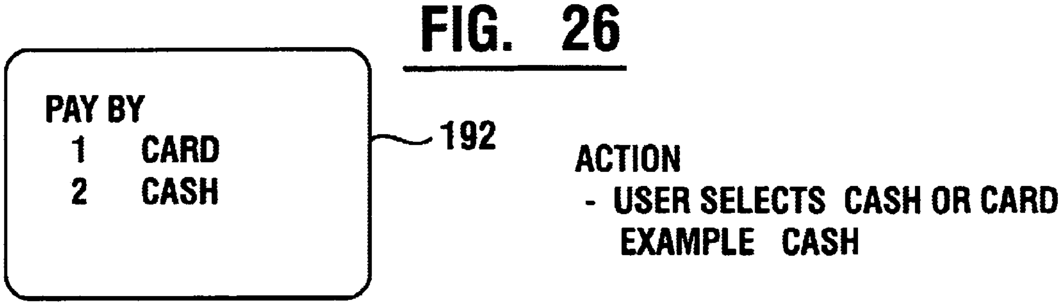
FIGS. 26 through 31 are exemplary screens displayed on the output device of the alternative self-service dispensing machine shown in FIG. 25.

In the programming of controller 130 additional screens are provided to present the user with the option of paying at the self-service dispensing machine with cash or other valuable items. This is accomplished through a screen 192 shown in FIG. 26. Screen 192 would generally be presented in advance of a screen similar to screen 78 shown in FIG. 8. Screen 192 prompts a user to indicate whether they will pay for merchandise with a card or cash. For purposes of an example it will be presumed that the user selects cash. Of course, if the user selects a card based transaction the screens will be as previously described.

Figure 27:
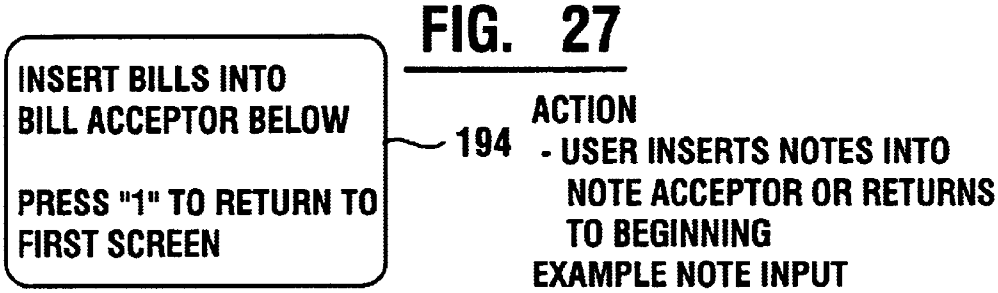

In response to a user selection of a cash input from screen 192 the computer causes a screen 194 shown in FIG. 27 to be displayed. Screen 194 prompts the user to input notes into the cash value accepting device. As previously discussed in connection with FIG. 33, a cash value accepting device 152 determines if an inserted note is genuine and acceptable, and if so includes the note in the roll of notes. If the cash value accepting device is unable to verify the genuineness or acceptability of the inserted note, the note is rejected and no credit is given.

Figure 28:
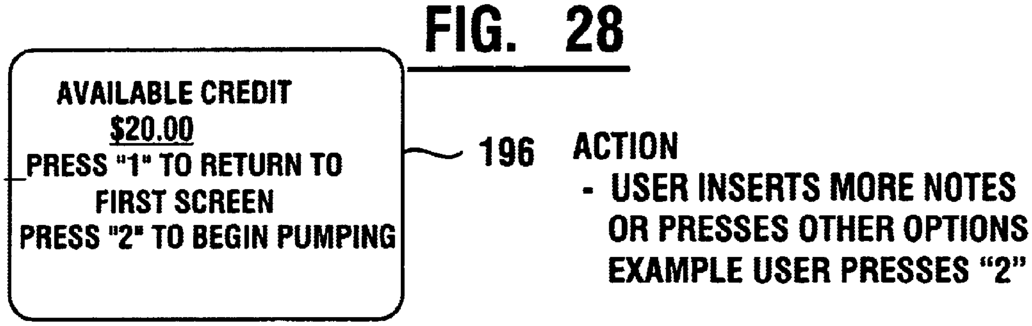
Figure 29:
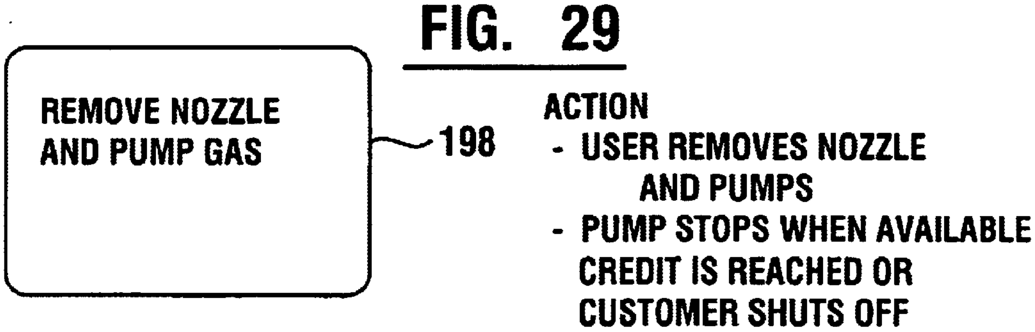

Assuming that a user has inserted an acceptable valid note the computer operates to display screen 196 shown in FIG. 28. Screen 196 shows the user's available credit and gives the user the option to either stop, begin pumping fuel or continue inputting notes to the machine. Assuming that the user begins pumping fuel the computer operates to display the screen 198 on the output device. The user then pumps fuel into the motor vehicle until completed. The programming of the controller 130 is set in the preferred embodiment to stop the pumping action by the self-service dispensing terminal when the amount of the available credit is reached.

Figure 30:
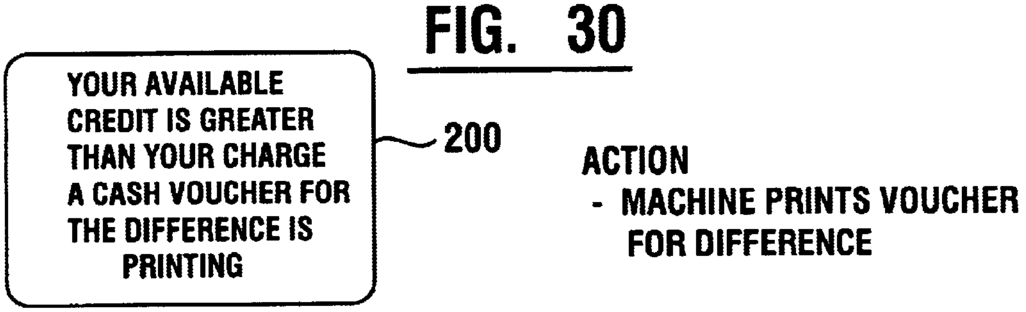
Figure 31:
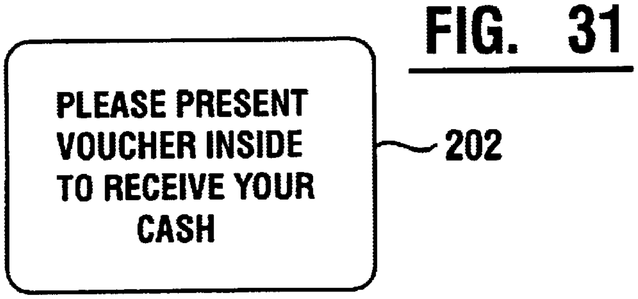

In some circumstances pumping will be stopped before the available credit is used up. In these circumstances the computer is programmed to present a screen 200 shown in FIG. 30. Screen 200 advises the user that their available credit is greater than the charge for the merchandise delivered. In response the computer operates the item delivering device 128 to produce a voucher or other item which is redeemable for the difference between the user's available credit and the charge for the merchandise dispensed. Alternatively the user may be provided with a code or other input designated as usable to obtain change. This could include a biometric feature such as the appearance of the user's face. In the exemplary system screen 200 indicates to the customer that a voucher is being printed for them by the item delivering device. A screen 202 showing FIG. 31 is presented advising the user to present their voucher at the remote facility to receive their change. A useful aspect of the described alternative embodiment is that users are enabled to receive cash without having to travel to the service facility. This speeds the operations when the user is not purchasing additional merchandise. If however a user wishes to make additional purchases they may do so with cash within the facility which further speeds the transactions.

A further useful aspect of the described embodiment is that it enables a user to make payment with cash should they wish to do so. It also provides for the user to receive change in uneven amounts that cannot be readily dispensed by a machine that only dispenses notes in certain denominations. As the user may travel to the remote facility to receive their change this increases the likelihood that they will purchase other merchandise and apply their available credit to such purchases. A further useful aspect of the described embodiments of the invention is that it enables the implementation of the note dispensing and note receiving functions in an economical manner. It further provides security by enabling removal of the cash supply component from the self-service dispensing machines when desired. Such removal also enables reloading of such components with cash under more secure conditions than would normally be available at a fuel dispensing station. Further useful advantages and novel aspects of the invention will be apparent to those skilled in the art.

Alternative forms of the invention may include one or more change dispensing devices either within or outside of the facility. Such change dispensing machines may include an automated teller machine which has the capability of dispensing a range of bill denominations and/or coin so as to provide the user with the exact amount of change to which they are entitled. Such multi denomination coin and note dispensing ATMs are manufactured by Diebold, Incorporated, the assignee of the present invention.

In such a system the change dispensing ATM may operate in response to printed articles which include indicia corresponding to the transaction for the amount of change the customer is to receive. Alternatively systems of the invention may operate to provide the user with a code number after they have completed the self service dispensing transaction. Such a code number may be input on the keypad of the ATM or input through a speech recognition type input so as to provide the user with the appropriate amount of change. Forms of the invention may provide the code to the user on a printed receipt. Alternatively embodiments of the system may have the self service dispensing machine programmed such that the user may select a code of their choice for purposes of receiving their change. Information concerning the code input by the user is stored in response to operation of the controller. The user is then enabled to receive their change in response to inputting their selected code to the change dispensing ATM.

Alternative forms of the invention may include an image capture device at or adjacent to the self service dispensing machine. The image capture device may be used to capture facial or other visual features of the user who is entitled to receive change. A similar image capture device is located at the change dispensing ATM. The controller then operates using software such as FACE-IT™ software available from Lemout & Hauspie or face recognition software available from Miros™ software to identify the user by the appearance of their face. The user may then receive their change after they have approached the machine. Likewise voice recognition or other biometric inputs can be used as an identifying input which correlates the transaction at the self service dispensing machine with the transaction and change providing operation.

Alternative forms of the invention may also include having the change dispensing machine located adjacent to a drive-through lane or similar path through which the customer is required to pass as they leave the facility. In this way the user is moved away from the self service dispensing machine as quickly as possible to make room for another customer to operate the machine. In such embodiments the system may operate to identify features of the vehicle rather than or in addition to features of the user so as to identify the person who is to receive the change. For example an image recognition system may be used to identify the license tags on the vehicle using a camera or other image capture device adjacent to the self service dispensing station. The computer may then operate using image analysis type software to provide the appropriate amount of change when the vehicle bearing the identified license plate tag moves adjacent to a change dispensing ATM. Likewise an RF type emitter or RF backscatter device may be used to identify the particular vehicle of the user who is entitled to change. The distinctive RF signal may then be used as the basis for delivering the change as the vehicle moves adjacent to the change dispensing ATM.

In an alternative form of the invention, the self-service dispensing machine 116 is further operative to accept an input representative of the code corresponding to the amount of change from a previous transaction. For example if the user does not have time or does not wish to use the change dispensing ATM, the user can save the code or the voucher with indica representative of the code for use later. The next time the user operates the same or another self-service dispensing machine, the user can input the code into the input device 124 for example and receive a credit against the purchase of merchandise or services equal to the amount of change that corresponds to the code.

A transaction record that includes that code may also be saved in a data store such as database 132. When the data store is connected to a network which is accessed by a plurality of self-service dispensing machines, the user may return to any of these self-service dispensing machines at a future time and be able to input the code. These self-service dispensing machines are operative to access the database over the network to verify that the code is valid. If the code is valid the self-service dispensing machine is operative to credit the amount of change corresponding to the code against the new purchase at the self-service dispensing machine. Once the code is used to receive credit for the new purchase, the record that corresponds to the code in the data store is updated with a status that all or a portion of the change has been redeemed.

For example, in the described embodiment of motor fuel dispensing facilities, the user is given a code or a voucher for an amount of change after purchasing fuel from a motor fuel dispensing machine. The next time the user requires fuel, the user can input the code or voucher into a second fuel dispensing machine to receive a credit against a second fuel purchase at the original or a different fuel dispensing facility.

The input device of the self-service dispensing machine may include a keypad for entering the code. In other embodiments other identification methods described previously such as speech recognition or face recognition may be used to facilitate crediting the correct user for the amount of change. In other embodiments the self-service dispensing machine my include an input device that is operative to read indicia or other features from the voucher that are representative of the code. For example the input device may include a bar code scanner that is operative to read bar code indicia representative of the code printed on the voucher. In other embodiments the input device may include a magnetic stripe reader for example that is operative to read the code stored in a magnetic stripe on the voucher. In further other embodiments the input device of the self-service dispensing machine may be operative to interpret physical features on the voucher such as holes punched through the voucher that are representative of the code.

In another alternative form of this described invention, the code may be used to receive credit for the purchase of merchandise or services from a self-service dispensing machine of a different type than the machine that originally issued the code. For example a code issued after a purchase of fuel could be inputted into a vending machine type self-service dispensing machine to pay for a beverage or food item. The code may also for example be applied to the purchase of a service such as a car wash from a cash wash type self-service dispensing machine.

In situations where the purchase price is less than the amount of value that corresponds to the code, the self-service dispensing machine could either issue a new code or update the record corresponding to the original code in the networked data store with a new amount. This new amount of change and or the new code may be written by the self-service dispenser to a new voucher that is presented to the customer. In other embodiments the new amount of change and or new code may be writ ten to the original voucher and returned to the customer.

Although the described embodiments of the invention have the user interface located on the self-service dispensing machine, in other embodiments other arrangements may be used. Specifically, the user interface may be positioned in a separate terminal adjacent to the self-service dispensing machine. Such an arrangement may facilitate retrofitting existing dispensing machines with equipment to provide the capabilities of the invention. Similarly, while in the described embodiment the invention discloses a cash dispensing mechanism in the self-service dispensing machine, other embodiments of the invention may provide the cash dispensing mechanism in an adjacent device. While the exemplary embodiment of the invention describes a dispensing machine that is outside and a remote facility that is indoors disposed from the machine, other embodiments may have the dispensing machine and remote facility where cash is provided within a single building, campus area or complex.

Alternative forms of the invention may be used in other types of self service or attended service dispensing activities. For example a few service stations now have robotic filling devices which are capable of removing the gas cap from the filler neck of the vehicle, inserting a fuel fill nozzle and then reinstalling the gas cap upon completion of the operation. In such environments an optical RF, IR or other transmission and reading devices may be used to identify the customer or their vehicle. Such signals may be used to charge the user's source of monetary value for the value of their fuel dispensed. Such systems may enable a user to fill their fuel tank without having to leave their vehicle. This may be valuable for handicapped individuals or in areas where persons are afraid to be outside of their vehicle.

In such systems a speech recognition system or other suitable device which is capable of receiving inputs adjacent to the fuel filling station may receive inputs from a user indicating that they wish to receive cash. In response to such inputs the user may receive the cash directly from the self service machine in the manner previously described. Alternatively a suitable mechanism such as the robot arm used for filling the fuel tank may be operated to move the dispensed cash from the outlet of the cash dispenser and into proximity of the vehicle window or the user.

Alternative forms of the invention may enable the user to receive requested cash by passing through a drive-through lane. As the user moves adjacent to an ATM or other cash dispensing device adjacent to the drive-through lane, the user, their vehicle, their transaction and/or source of monetary value is identified in one of the manners previously discussed. The amount of requested cash is then delivered to the user and the value of the dispensed cash is charged against the source of monetary value.

Alternative forms of the present invention may be operated in different types of transaction environments. As previously discussed, the user operating the self service dispensing device may be presented with messages on the output device of the dispensing machine. These outputs may encourage a user to order particular types of merchandise that are provided by the establishment. The user is enabled to select the items of merchandise they wish to purchase through inputs at the self service dispensing machine. In establishments where fast food items are offered, a user may be enabled to select fast food items through inputs to the input device. Such fast food items can be charged to the user's source of monetary value along with fuel as well as cash to be dispensed. Such sources of monetary value may include accounts associated with debit or credit cards as previously discussed. Likewise as previously discussed, the source of monetary value may be a smart card, check or money order. In situations where the self service dispensing machine includes a cash accepting device, the source of monetary value may also be the cash that the user has input to the self service dispensing machine.

In such a system upon completion of the fuel dispensing operation the user may travel either in their car or on foot to a merchandise delivery location where the customer receives the merchandise which is ordered. This may include for example a fast food delivery window through which the user may receive the food items ordered. In such a system if the user has requested a dispense of cash, the cash may be provided to the user from a cash dispenser located at or in proximity to the merchandise delivery location. Alternatively the cash dispenser may be positioned between the self service dispensing machine and the merchandise delivery location. In this way the user may receive any cash requested from the cash dispenser. The cash the user receives may also include change that is due them if the user placed cash in a cash accepting device at the self service dispensing machine. Alternatively the system may be configured such that the user receives a portion such as any bills that are due to them as change and/or any additional cash requested, at the cash dispenser machine, while coin or types of bills not stored in the cash dispenser, which are due as change are provided at a separate station or with the merchandise which is provided to the user. In the case of a fast food establishment change due a user may be placed in an envelope or other container and placed in or attached to the bags or other containers holding the merchandise for the customer. Appropriate identifying techniques are used for correlating the identity of the user with the transaction. In this way it is assured that the appropriate user receives the requested cash, merchandise and/or change to which they are entitled.

Alternative forms of the invention may integrate these principles with remote order capability for merchandise. For example a user may place an order for merchandise over the phone with the establishment where they or another person may intend to later pick it up or purchase additional merchandise. This may include for example a carry out restaurant associated with a motor fuel dispensing facility. The order may be placed with a person or electronically through an interactive voice recognition device in operative connection with a phone system and a computer. In placing the order the user provides a credit card number, name or other information that can be read or otherwise used by a computer to recognize the person placing the order or the transaction when the customer arrives at the facility. Alternatively embodiments of the system may enable a user to place their merchandise orders through a computer network such as the Internet. Again in placing such orders the customer provides such information as will enable the customer or the associated transaction to be identified when they arrive at the facility. Most often this will include a credit card number which identifies a user or an account which serves as a source of monetary value which is charged for the merchandise that the user wishes to receive.

The facility at which the merchandise is ordered may prepare the merchandise requested by the customer placing the remote order, and hold it pending the customer's arrival. Alternatively if the merchandise is fast food which is generally quickly made available, the order may not be processed or the merchandise assembled until it is known that the customer has reached the facility.

After placing the order remotely, the customer or a person related to the person who placed the order, travels to the facility to which they have placed the order. The customer identifies themself or their transaction to a terminal by providing an identifying input which can be correlated to the order which has been previously placed. Often this identifying input may be an input of a credit card to a terminal at the facility. In the case of the motor fuel dispensing facility the user may identify themselves by inputting the same credit card that was used in connection with placing the order to the fuel pump. Upon receipt of this information the computer at the facility may check the indicia read from the card against records of open orders and advise the customer that their order has been received and will be available for them to pick up in the facility or at a drive-through window. Such notice can be given through the output devices adjacent the pump.

In circumstances where the customer's order has already been assembled prior to the customer's arrival, the merchandise may be moved to a location more suitable for delivery to the customer. This might be appropriate for merchandise like a pizza which takes considerable preparation time. Alternatively if the customer's order involves fast food items, the order may be assembled from food items which are available from within the facility and gathered together in accordance with the customer's order.

Of course some orders may have long lead time and short lead time items which are assembled for delivery when the customer arrives at the facility. The computer may operate the output device adjacent to where the customer provides the identifying input to request that the customer confirm the order as recorded in a data store associated with the computer. The customer may provide such confirmation by inputs to the input devices. In addition the customer may be presented with the opportunity to purchase additional items which are available within the facility. These may include for example ready to eat side dishes, beverages or other items that may be complimentary to the customer's order. Such offers may be presented at the self service dispensing machine or other customer request station through an appropriate output device. Alternatively persons within the facility may communicate with the customer via intercom so as to take any changes or additions to the order as well as to advise the customer of how to receive the ordered merchandise. It should be understood that the computer may also operate the self service dispensing machine or other devices as part of the system in the manner previously described to enable the customer to obtain cash in addition to the merchandise that may have been ordered in advance or at the customer terminal. Alternatively in circumstances where the customer station includes cash accepting capability, provisions may be made for the customer to pay for merchandise with cash and receive change. This can be done in the manner previously discussed and may include for example a change dispensing machine which the customer travels to for the delivery of change. Change may be received either separately or with the customer's merchandise. In addition if a customer has remotely ordered merchandise using a credit or debit card but provides payment with cash at the merchandise delivery facility, the computer is caused to operate in accordance with its programming to avoid charging the customer's account or to carry out steps to reverse any charges previously applied to the customer's account.

Merchandise that the customer has ordered may be provided to the customer who has identified themself at the station by physical delivery to the customer while they are dispensing motor fuel or otherwise positioned adjacent to an identifiable customer station. Alternatively the customer may travel into a facility in the manner previously described and may receive their order within the facility along with cash and/or change. Alternatively the customer may be requested to move either on foot or in their vehicle along a path. As the customer traverses this path, they may be provided with the cash and the merchandise.

In such systems provision is made as previously discussed, to correlate through operation of the computer at least one identifying input associated with the customer or the particular transaction, with the amount of cash (and/or including change) or merchandise they are to receive. This identifying input may include as previously discussed, an input of an item such as the customer's card and the indicia written thereon. This card may be read by an appropriate card reader at a cash/change dispenser and/or at the merchandise delivery location.

Alternatively the customer may use a code to identify themselves or their transaction for purposes of obtaining cash and/or merchandise. This code may be a unique code assigned through operation of the computer and output to the customer at the self service dispensing machine or other customer request station. This code may be output on a screen or other output device or alternatively printed on a receipt voucher or other item. The code or other item may then later be input to obtain the cash, change or merchandise. Alternatively the computer operating the system may enable the customer to select their own code. The customer may then input their customer selected code at the selected station to obtain the appropriate amount of cash, change and/or merchandise.

In alternative embodiments the identifying input correlated with the right to receive an amount of cash for merchandise may be a biometric input. This may include for example the appearance of the user such as their face, fingerprint, iris or retina. It may also include a voiceprint of the user's voice. Alternatively as previously discussed identifying aspects of the customer's vehicle may be used in a drive-through environment. Of course it should be understood that combinations of two or more types of identifying inputs may be used as the basis for delivering cash (including change) and merchandise to the customer. Various approaches will be apparent to those skilled in the art from the foregoing description.

As can be appreciated the systems of the type described provide added convenience for the customer and may provide a substantial time savings. This enables the customer to select the merchandise that they wish to have in advance and through an interface that generally will provide more options concerning available merchandise than might be possible through output devices available on a self service dispensing machine or a customer request station terminal. The customer can also be assured that they can obtain the merchandise they want prior to traveling to the facility. The customer can also avoid the time that would normally be spent waiting for an order to be processed, cooked or assembled. Further when a food vending environment is combined with a motor fuel dispensing environment as in the exemplary embodiment, the customer is enabled to make additions and changes through the interface on the self service dispensing terminal or through other communications systems with the persons in the facility. The operators of such systems also offer added convenience, faster customer service and increased throughput so that their fuel dispensing and food service facilities may serve more people.

As can be appreciated the principles of the present invention including the ability of the customer to obtain cash, can be implemented in transaction environments that do not include self service dispensing. Such transaction environments may enable a user to obtain cash using a source of monetary vale. Such sources of monetary value may include for example accounts associated with credit or debit cards. Such sources also include amounts associated with checks, gift certificates or vouchers that can be redeemed for cash and/or merchandise. In systems which include the ability to accept cash, the source of monetary value may include an amount that a customer has input in the form of cash, at least a portion of which may be returned to the customer as change, the amount having been reduced by the cost of merchandise and/or transaction fees.

Figure 38:
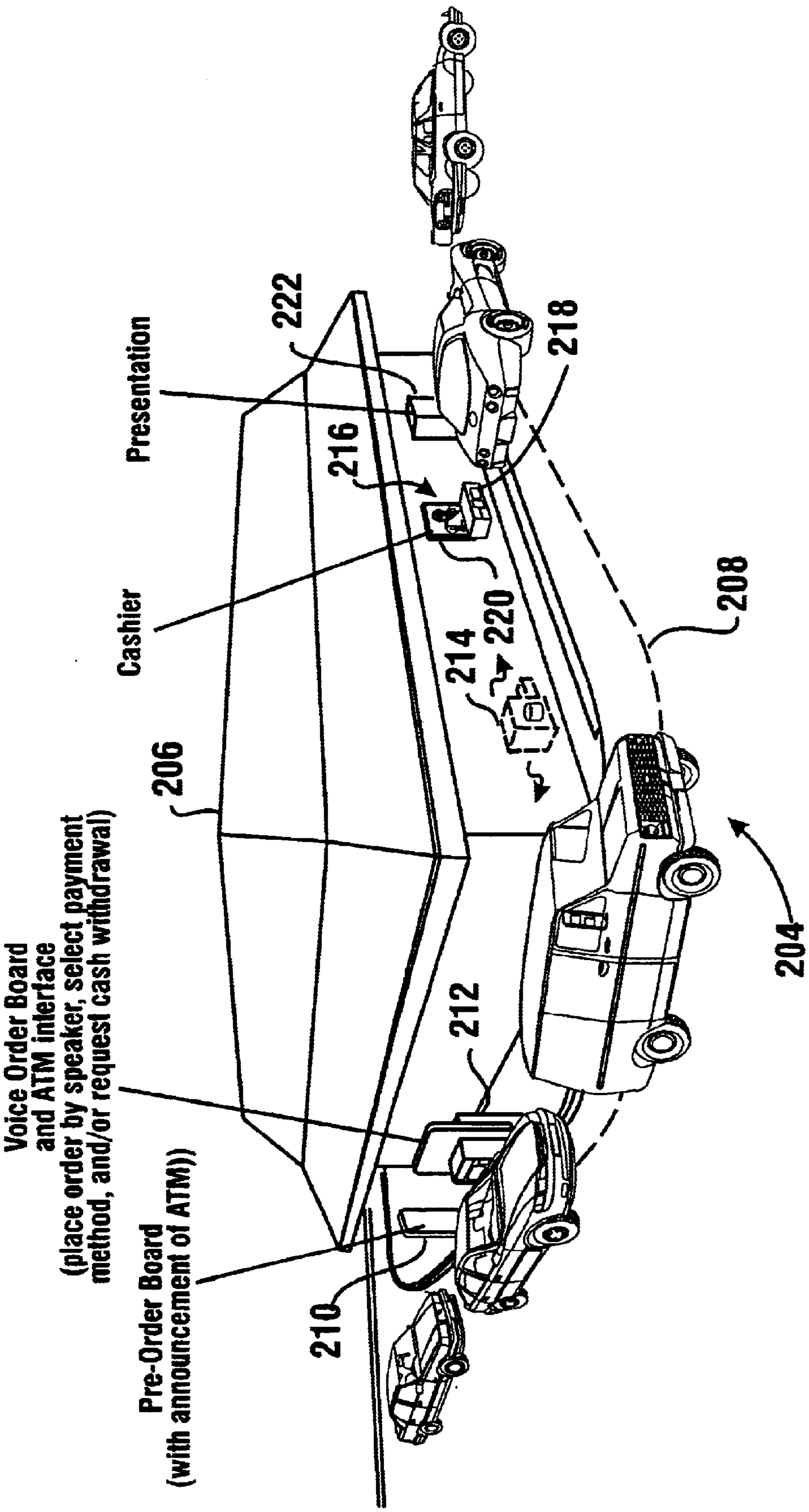
FIG. 38 is an isometric view of an alternative form of the transaction system of the present invention.

FIG. 38 is a schematic representation of a system 204 in which the principles of the invention are applied in an attended vending environment. In the exemplary system 204 a facility 206 is provided. The facility 206 may be a fast food restaurant or other facility for providing merchandise requested by users. It should be understood that in the exemplary embodiment facility 206 includes a kitchen and other suitable food preparation and merchandise preparation and packaging activities necessary to serve the customers who use the system.

System 204 includes a path 208 along which customers pass to obtain merchandise from the facility. In the exemplary embodiment path 208 includes a drive-through lane along which customers travel in their vehicles. In the exemplary embodiment a preorder board 210 is positioned adjacent to the beginning of the drive-through lane. The preorder board includes information about how the customer may use the system. It may also include a listing of menu items and prices for items that the customers may purchase. In the exemplary embodiment the preorder board 210 also includes information which alerts a customer that they have the option to pay for their merchandise using the sources of monetary value that the system accepts, which in the case of this exemplary system is debit cards and cash. The preorder board 210 also preferably includes information that advises customers that they may obtain cash from their accounts as they pass through the drive-through.

System 204 further includes customer request station 212. In the exemplary embodiment customer request station 212 includes a voice interface through which a customer may communicate with a customer service person in the facility 206 for purposes of taking their order. The customer request station also may be operated in a manner later discussed in detail to enable the customer to charge their order to an account associated with their debit card as well as to obtain additional cash. The customer request station is in operative connection with a computer schematically indicated 214 within the facility. Computer 214 operates to carry out the transaction by communicating with devices both internal and external to the facility. The computer 214 also keeps appropriate records related to operating the system as well as transactions which occur. Computer 214 is also in communication with the necessary communications interfaces so that the funds to carry out the transaction may be deducted from the source of monetary value which in this case is the user's debit card account.

In exemplary system 204 there is also a cash delivery station 216. The cash delivery station includes a cash dispenser 218 which is used to deliver currency notes which a user has requested. In this embodiment the cash delivery station 216 is incorporated into a cashier's window 220. The cashier's window is operated by a cashier to manually accept cash payments from customers and to provide change.

System 204 also includes a merchandise delivery station 222. The merchandise delivery station is a location at which users of the system receive their merchandise such as the fast food that they have ordered. It should be understood that while in system 204 the cash delivery station and merchandise delivery station are disposed from one another, in embodiments of the invention. Functions of both stations may be combined or placed in sufficient proximity to one another that both functions are conducted while a user remains stationary.

Figure 39:
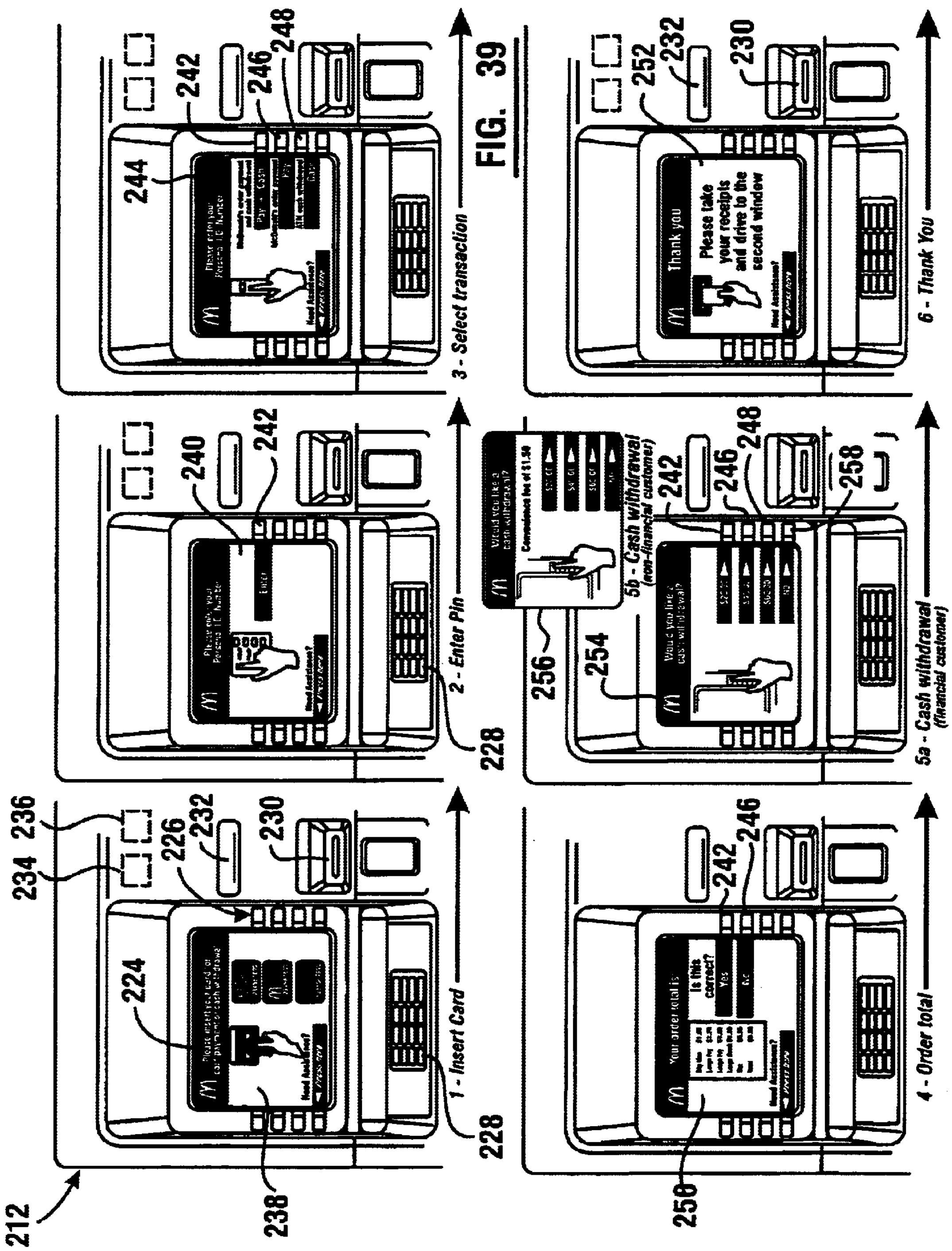
FIG. 39 are exemplary screens displayed at a customer request station in the system of FIG. 38.

FIG. 39 shows the user interface of the customer request station 212. The user interface of the customer request station includes in this exemplary embodiment, a terminal with an output device including a display 224. The customer interface also includes input devices including a plurality of function buttons 226. The interface further includes keys of a keypad 228. The exemplary embodiment of the customer request station 212 also includes a card reader 230. Card reader 230 in the exemplary embodiment serves as an input device and is capable of reading magnetic stripe type cards. The customer request station 212 also includes a printer which is selectively operative to provide printed receipts or other documents through a printer outlet 232. It should be understood that devices which comprise the customer request station of the exemplary embodiment are operated under the control of one or more computers. Customer request station 212 also includes or has adjacent thereto, an audio input device schematically indicated 234 and an audio output device schematically indicated 236. Such devices enable a user at the customer request station to communicate with a human service provider within the facility. The service provider also provides inputs through input devices which are operative to control functioning of devices at the customer request station. It should be understood that the input and output devices in customer request station 212 are exemplary and in other embodiments different types of input and output devices may be used.

In the exemplary embodiment a customer is enabled to communicate with an order taking service provider in the fast food restaurant through the audio input and output devices 234, 236 respectively. In system 204 if the customer is paying with cash they need not take any steps to operate the customer request station other than to verbally communicate their requests for merchandise to the customer service provider. In such circumstances the customer places their order and then travels to the cashier window 220 to make payment in cash and receive any change due from the human cashier. Having made payment the customer may then proceed to the merchandise delivery station 222 to receive their merchandise.

Figure 40:
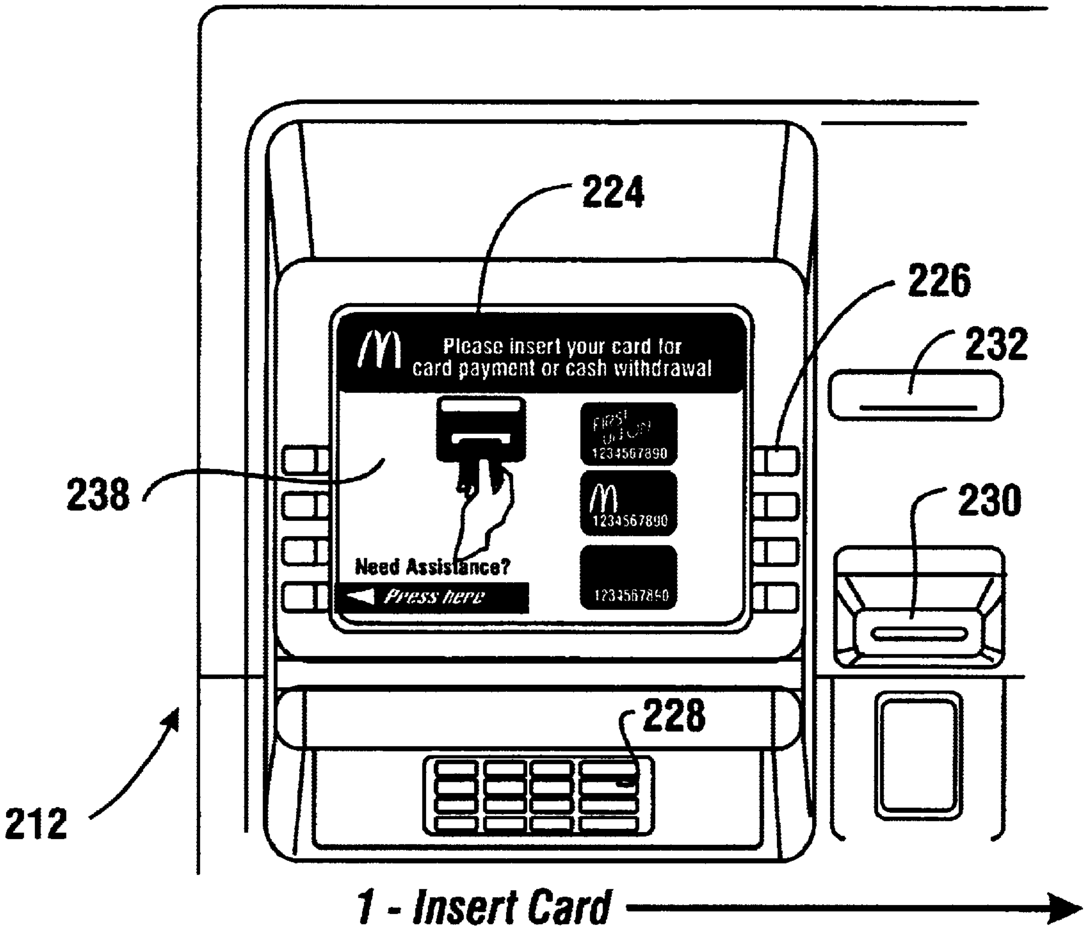
FIGS. 40–45 are enlarged views of the screens shown in FIG. 39.

If the customer operating system 204 wishes to pay for their merchandise with a debit card or receive cash, the system operates in the manner now described. The customer inputs their order verbally to the customer service provider. To indicate that the customer wishes to either pay or receive cash using their card, they input the card into the customer request station so that it can be read by the card reader 230. This is done when the computer operating the customer request station is causing display of an output screen 238. Screen 238 shown in more detail in FIG. 40, advises the customer to insert their card to make a card payment or a cash withdrawal.

Figure 41:
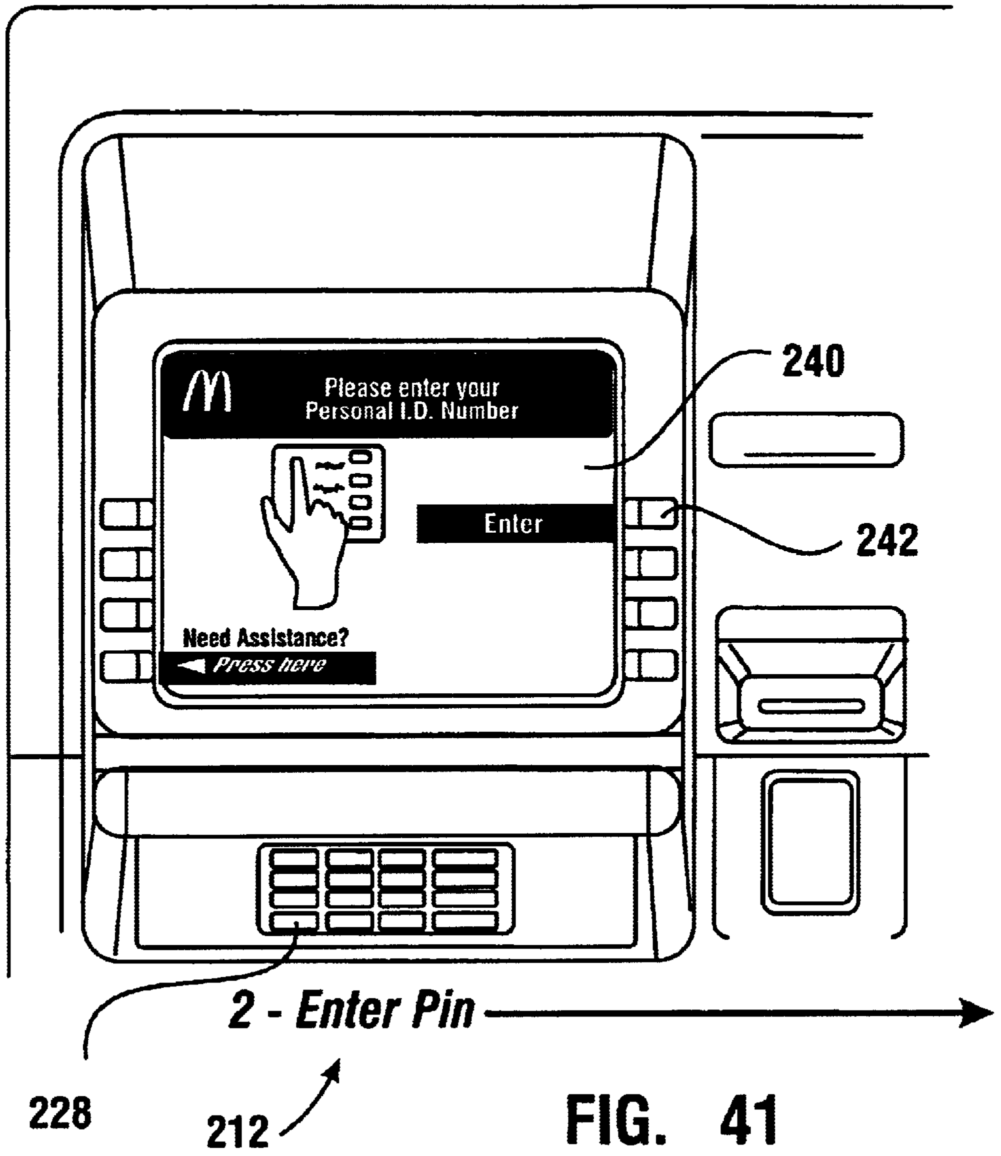

In response to the customer inserting their card into the card reader the computer operates to cause a screen 240 to be displayed. Screen 240 which is shown in more detail in FIG. 41 instructs a customer to input their personal ID number or PIN using the keys on keypad 228. Screen 240 prompts a customer to input their PIN and then to provide an input by touching the function key 242 when finished.

Figure 42:
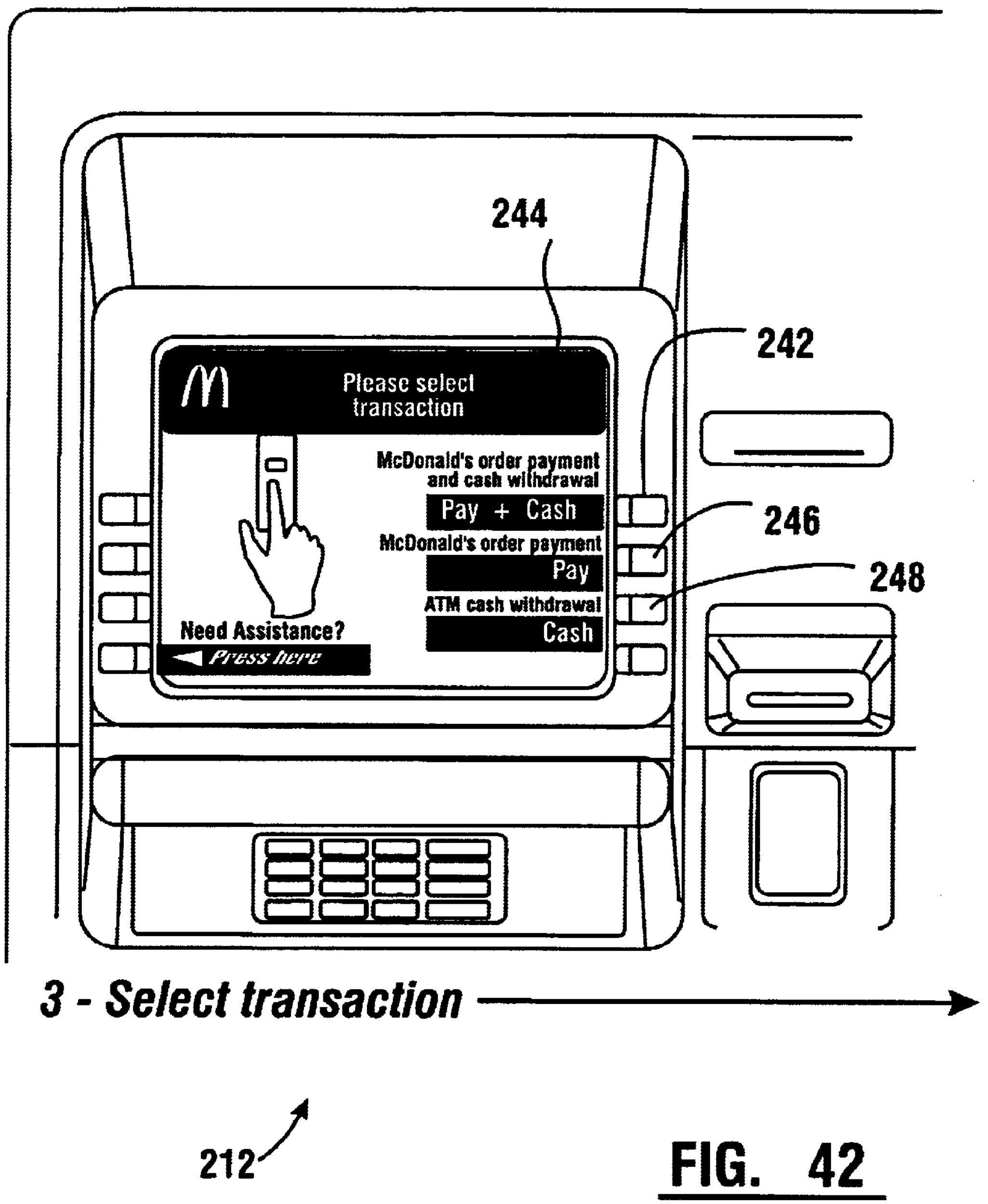

In response to the customer indicating that they have input their PIN the computer operates the customer request station to display a screen 244. Screen 244 which is shown in greater detail in FIG. 42 prompts the customer to select a transaction. The customer selects the transaction by touching either function key 242 or one of function keys 246 or 248.

Figure 43:
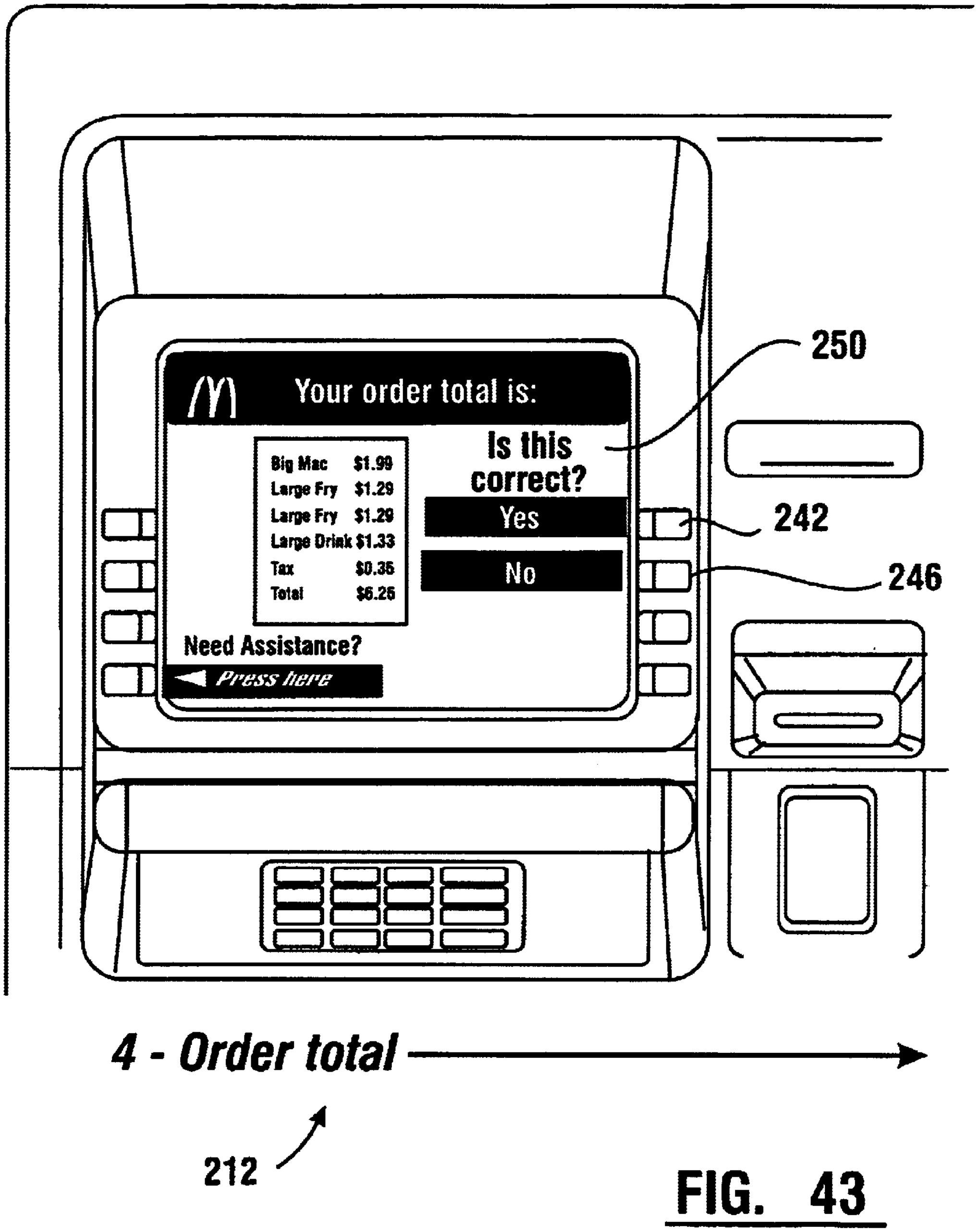

In response to the customer selecting one of the options presented in screen 244 the computer operates to cause screen 250 to be displayed. Screen 250 is shown in greater detail in FIG. 43. Screen 250 displays the customer's order as it has been input by the service provider. Screen 250 lists the items requested by the customer along with the total. The customer is requested to confirm that the order is correct by touching function key 242. The customer may indicate a discrepancy and correct the order process by touching function key 246. If the customer touches function key 246 the service provider is notified so that the customer's order can be reentered through communication using the audio input device 234 and audio output device 236.

Figure 45:
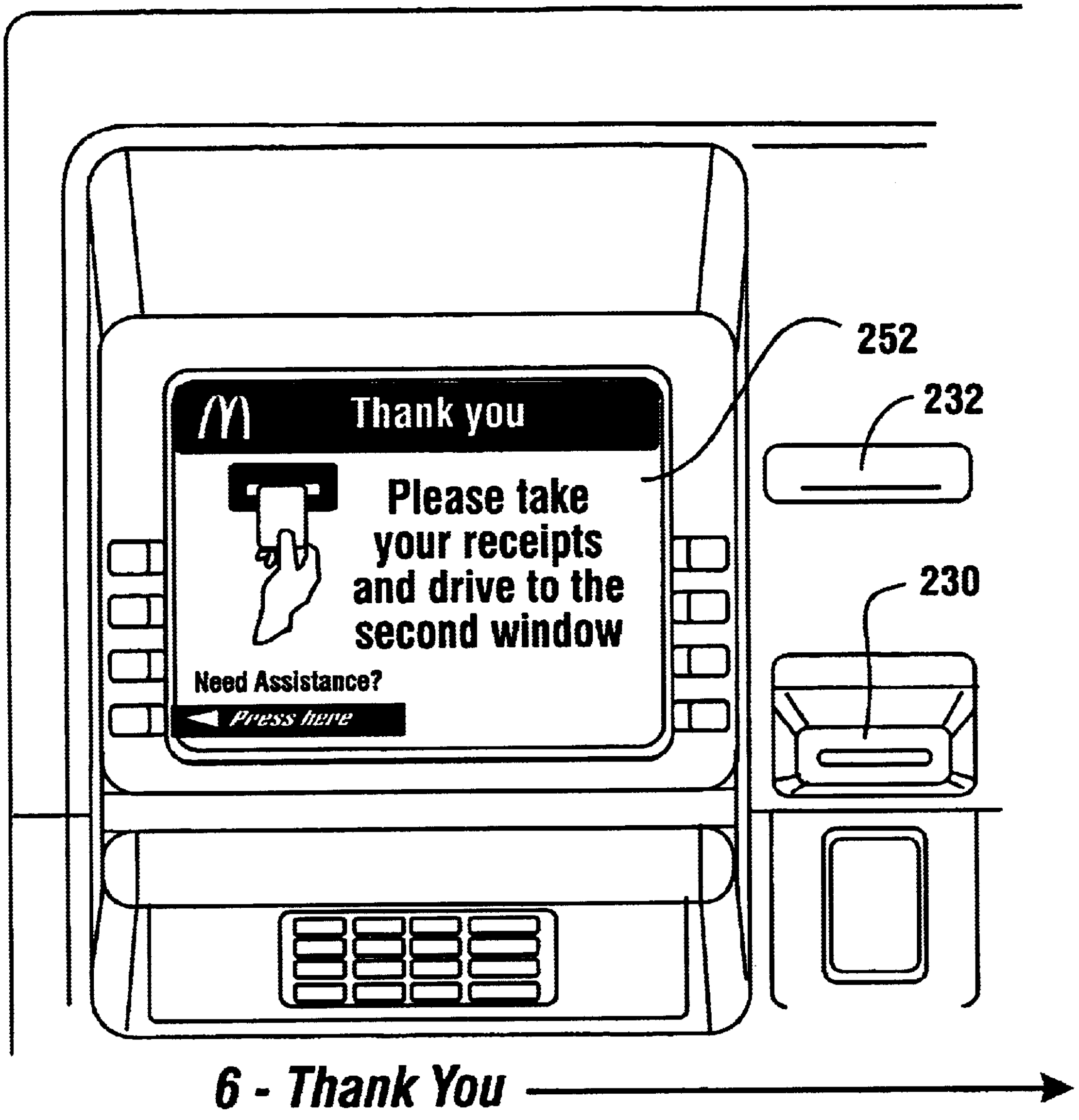

Assuming that the customer has indicated that the order is correct, the computer operates the customer request station depending on the transaction selected by the customer in response to screen 244. If in response to screen 244 the customer has indicated that they only wish to pay for their merchandise and not receive cash, the computer operates to cause a screen 252 to be displayed. The computer also operates the printer in the customer request station to deliver receipts to the customer in the printer outlet 232. Screen 252 is shown in greater detail in FIG. 45. Screen 252 instructs the customer to take the receipts that have been printed for them and to drive to the second window. In system 204 shown in FIG. 38 the second window is the merchandise delivery location 222. This is appropriate as the customer has already paid for their food and does not need to make payment to a cashier. In addition the computer operates to deliver the customer's card back through the card reader 230. An appropriate screen is presented reminding the user to take their card.

In the exemplary embodiment the customer is provided with two printed receipts which may be correlated with their particular transaction or order. These receipts may include for example a transaction number or order number. Alternatively or in addition, the receipts may include a listing of the particular items ordered. The receipts may also generally include the amount that the user has charged to the source of monetary value for the particular order. In the case where two receipts are provided to the customer, the customer may be requested to turn in one receipt at the customer delivery station to receive their merchandise. Delivering one of the receipts also serves as a check to be sure that the proper customer receives the proper merchandise. A service provider may also use the receipt or information or indicia printed thereon, to indicate to the system that the order has been prepared or fulfilled. This may be done for example by scanning machine readable indicia included on the receipt with a reading device such as a bar code reader. This information input can be used by the computer to indicate in associated records that the order has been fulfilled. Alternatively a code or other information on the receipt may be input to a keypad or other type of input device by a customer service provider so that a record stored in the computer 214 can be updated. Various approaches may be used to documenting order completion and updating the records stored in the data store associated with the computer, depending on the operation of the particular system.

Figure 44:
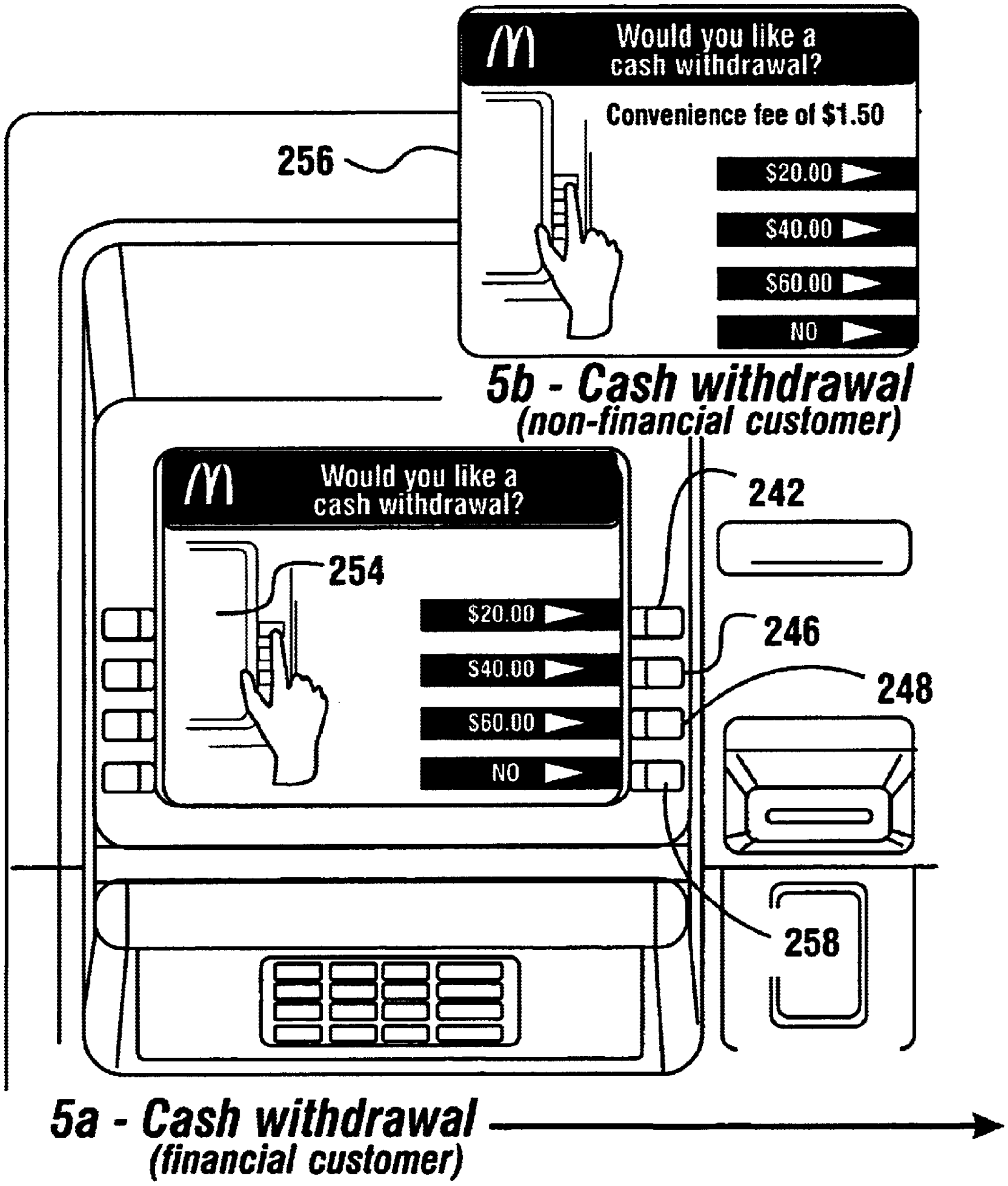

The computer operates the customer request station differently from that already described when the customer has made a selection indicating that they wish to receive cash in response to presentation of screen 244. This is done by the customer selecting either of function keys 242 or 248. When the customer has made such a selection the customer is presented with either a screen 254 or 256. These screens are shown in greater detail in FIG. 44. Screen 256 is shown to users whose source of monetary value is not one of those associated with the facility, and because of this are to be charged a transaction fee in addition to the amount of the cash and/or the value of merchandise selected. Screen 254 is presented to a user who is not charged a transaction fee because their source of monetary value is associated or otherwise has an arrangement with the facility from which the cash or merchandise is to be provided.

The customer presented with either screen 254 or 256 is enabled to select the amount of cash they desire by selecting function keys 242, 246 or 248. Alternatively if the customer determines that they do not wish to withdraw cash because they prefer not to pay the convenience fee, they may stop the cash withdrawal transaction by pressing a function key 258. If the function key 258 is pressed when either screen 254 or screen 256 is being displayed, the computer operates to continue the cash withdrawal transaction. If the customer has selected to pay for the order with their debit card in response to screen 244, screen 252 previously described will be presented. Alternatively if the customer had already indicated that they wish to obtain cash but not pay for the order using their card, the computer will operate to cause an alternative screen to be displayed advising the customer to travel to the cashier's window 220 to make payment for the order.

Figure 46:
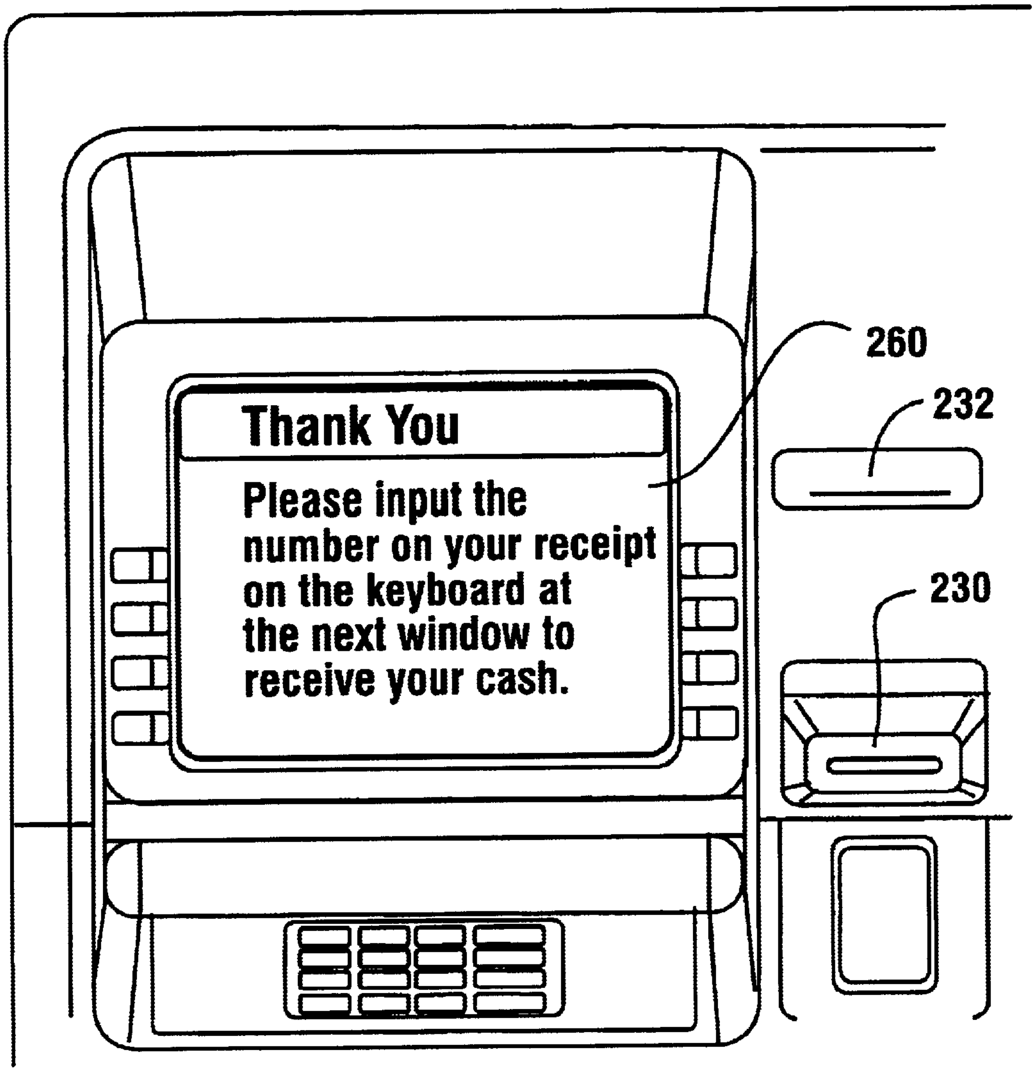
FIG. 46 is an alternative screen shown at the customer request station of FIG. 38 in response to certain customer inputs.

If the customer selects an amount of cash to withdraw in response to either screen 254 or 256, the computer operates the customer request station to instruct the customer to obtain their cash at the cash dispenser 218 located at the cash delivery station 216. In an exemplary embodiment this is accomplished by displaying a screen 260 shown in FIG. 46. In the operation of this exemplary embodiment the computer operates to assign a code number to the customer's transaction. This code number is caused to be printed on a receipt which is delivered to a customer. The receipt is delivered to the customer through printer outlet 232. The customer's card is also returned from the card reader 230. The computer 214 operating the system operates to correlate the identifying input which is the number caused to be printed by the computer on the customer's receipt, with data corresponding to the request to receive the amount of cash that the customer has indicated that they desire. Of course the computer may also operate to communicate through appropriate communication devices with a remote host computer system which corresponds to the customer source of monetary value so as to withdraw the appropriate amount from the customer's account. This may include the amount of the cash requested by the customer as well as the value of the merchandise, plus transactions fees, depending on the nature of the transaction the customer has selected and the nature of the customer's account.

The customer then travels to the cash delivery station 216. The cash delivery station includes the cash dispenser 218. The cash dispenser 218 may include a mechanism of one of the types previously described which is operative to selectively deliver cash to the customer. In the exemplary embodiment of the system the cash dispenser is a Provisor™ cash dispenser of the type commercially available from Diebold, Incorporated. This cash dispenser may be reloaded with cash from the interior of facility 206 without having to gain access to a bulk cash supply housed within the interior of the cash dispenser. Of course in other embodiments other types of cash dispensers may be used.

The cash dispensing station 218 includes at least one input device. In this exemplary embodiment the cash dispensing station includes a user interface with a keypad. The customer inputs the identifying code provided on their receipt through the keypad. The computer then operates in response to the identifying input to cause the cash dispenser to operate to dispense the desired amount of cash to the user.

If the user has selected to both pay for their order and obtain cash with their card in response to screen 244, the user may then proceed to the merchandise delivery location 222 and receive their merchandise by delivering their receipt. Alternatively if the user has only indicated that they wish to have a cash withdrawal, they pay cash for the ordered merchandise through the cashier window 222. It should be understood that while it is preferable for users of the system 204 to order merchandise from the facility 206, the system may operate for some customers purely to dispense cash and without the necessity of the customer purchasing merchandise. Further the cash dispensing activity may be carried out even when the facility is not operating to provide merchandise. This provides additional opportunities for the facility operators to generate revenue during the hours when they are normally closed from transaction fees that are imposed on certain cash dispensing transactions.

It should further be understood that the use of a code printed on a receipt or other item delivered to the customer, is but one of several forms of identifying input that may be correlated with the customer's request for an amount of cash and which may be used by the system to operate the cash dispenser. For example as previously discussed, the system may operate by utilizing a number or other indicia on the customer's card that is used to pay for the transaction as the identifying input. In such circumstances the cash delivery station may include a card reader which is capable of reading the customer's card and causing cash to be dispensed in response thereto. Alternatively the computer which operates the system may be programmed to enable the customer to select their own identifying code. The customer selected identifying code may be used by the customer as an input at the cash dispensing station to receive cash. This may be input through a keypad, touch screen or other manual input device, or audibly through a speech recognition system. Alternative forms of the invention may use biometric inputs including face recognition to identify the customer who is entitled to receive cash at the cash dispensing station. Alternatively or in addition, features of the customer's vehicle including visual indicators such as license plates, physical configuration, vehicle color or RF or IR inputs from a token or other item in or on the vehicle may be used as identifying inputs for the delivery of cash. In addition other types or combinations of inputs which can be used to uniquely identify the particular person or vehicle in the path 208 that is entitled to receive the dispense of cash may be used.

System 204 may also employ aspects of the feature previously discussed which enables a customer to preorder the merchandise they wish to receive away from the facility. The computer may be operated to identify the order upon entry of the customer's card into the card reader 230 of the customer request station 212. The customer may be presented with the same or similar transaction options at the terminal. However the customer's order would appear at the terminal without the need for communication with the service provider through the audio input and output devices. This further speeds the customer's order processing and helps the drive-through lane move more quickly.

Figure 47:
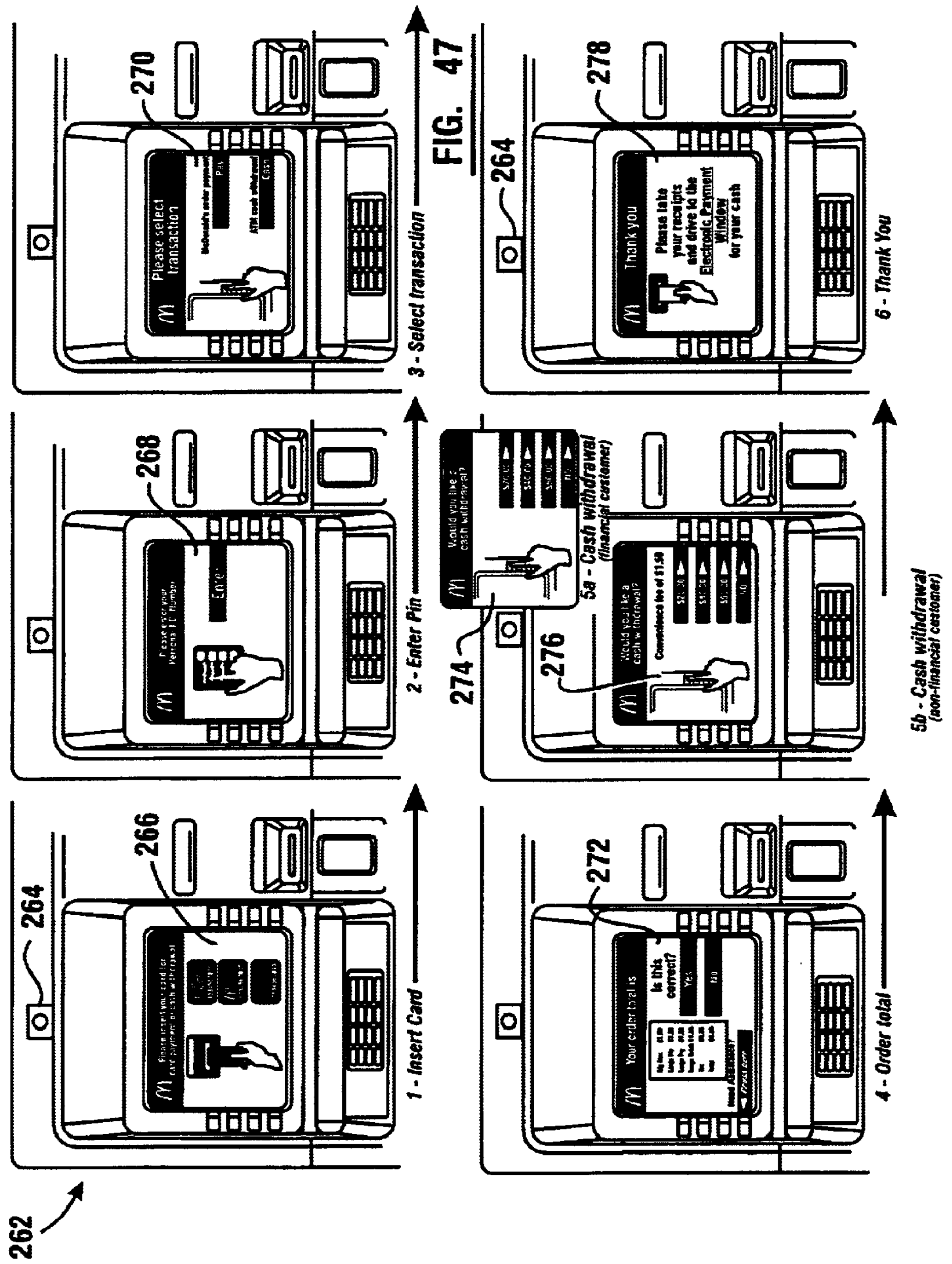
FIG. 47 shows a series of alternative exemplary screens displayed at a customer request station in the system of FIG. 38.

FIG. 47 shows an alternative set of screens that may be displayed at an alternative customer request station 262. Customer request station 262 is similar in all respects to customer request station 212 except as otherwise specifically indicated. Customer request station 262 may be used in the system that is similar to system 204. Customer request station 262 in addition to the input and output devices of the types previously discussed, includes an image capture device 264. Image capture device 264 is aimed to have a field of view which captures the facial features of the customer at the customer request station. The images captured by the image capture device 264 are used by the computer 214 as an identifying input identifying (either alone or in combination with other inputs) the particular customer as being entitled to the amount of cash selected.

In the operation of customer request station 262 operation of the terminal may begin with a screen 266 which is similar to screen 224 and which prompts a user to input a card associated with a source of monetary value. This screen 268 is then caused to be presented which is similar to screen 240. Screen 268 prompts a user to input a personal identification number or PIN so as to authenticate them as an authorized user of the debit card input.

The computer then operates to output a screen 270. Screen 270 presents the user with two options rather than the three options which were presented in screen 244. In screen 270 the user is presented with the option of either paying for their order or receiving a cash withdrawal. The user responds to screen 270 by selecting an appropriate function key. In response to the input from screen 270 the computer causes a screen 272 to be output. Screen 272 is similar to screen 250 in that it prompts a user to confirm the contents of their order.

In response to an input indicating that the order presented in screen 272 is correct, the computer operates to cause the terminal at the customer request station to output either screen 274 or 276. Screen 274 is output when the user has input a card corresponding to a source of monetary value that does not require payment of a transaction fee when used in the system. Screen 276 is output by the computer when the source of monetary value requires the payment of a transaction fee to operate the system.

In response to the user's selection of an amount in response to screens 274 or 276, the computer causes a screen 278 to be output. The computer also operates in response to the input to capture one or more images from the image capture device 264 or other image data that can be processed by the computer and used to correlate the particular user who is entitled to receive the amount of funds with the request for such funds. Of course the computer may also operate to communicate appropriate messages with a remote host computer or other source of monetary value to verify that the user's card is authorized and that the funds requested are available.

In response to screen 278 the customer then may move to a cash delivery station similar to a cash delivery station 16. In this embodiment however the cash delivery station includes an image capture device. The image capture device operates to capture an image of the user adjacent to the cash deliver station. The computer then processes data from this image and operates to determine if the data from this captured image correlates with the image of a user who is entitled to receive funds based on the image captured at the customer request station. In response to the computer determining that the user is authorized to receive the funds, the computer operates the cash dispenser to provide the requested amount of cash to the user. This may be accomplished using techniques and equipment discussed in the incorporated disclosure of the allowed patent application or through other suitable means.

Of course if in response to screen 270 the user has only requested to pay for their order using their debit card, then the computer operates so as to avoid dispensing any cash when the user passes adjacent to the cash delivery station. It should be understood however that in some embodiments an image capture device may be placed adjacent to the merchandise delivery station. An image of the user may then be used to generate data which is correlated with the order information or other data so as to assure that the merchandise which the particular user has ordered is properly delivered to them. Of course other approaches and additional techniques may be used which are within the scope of the present invention.

Figure 48:
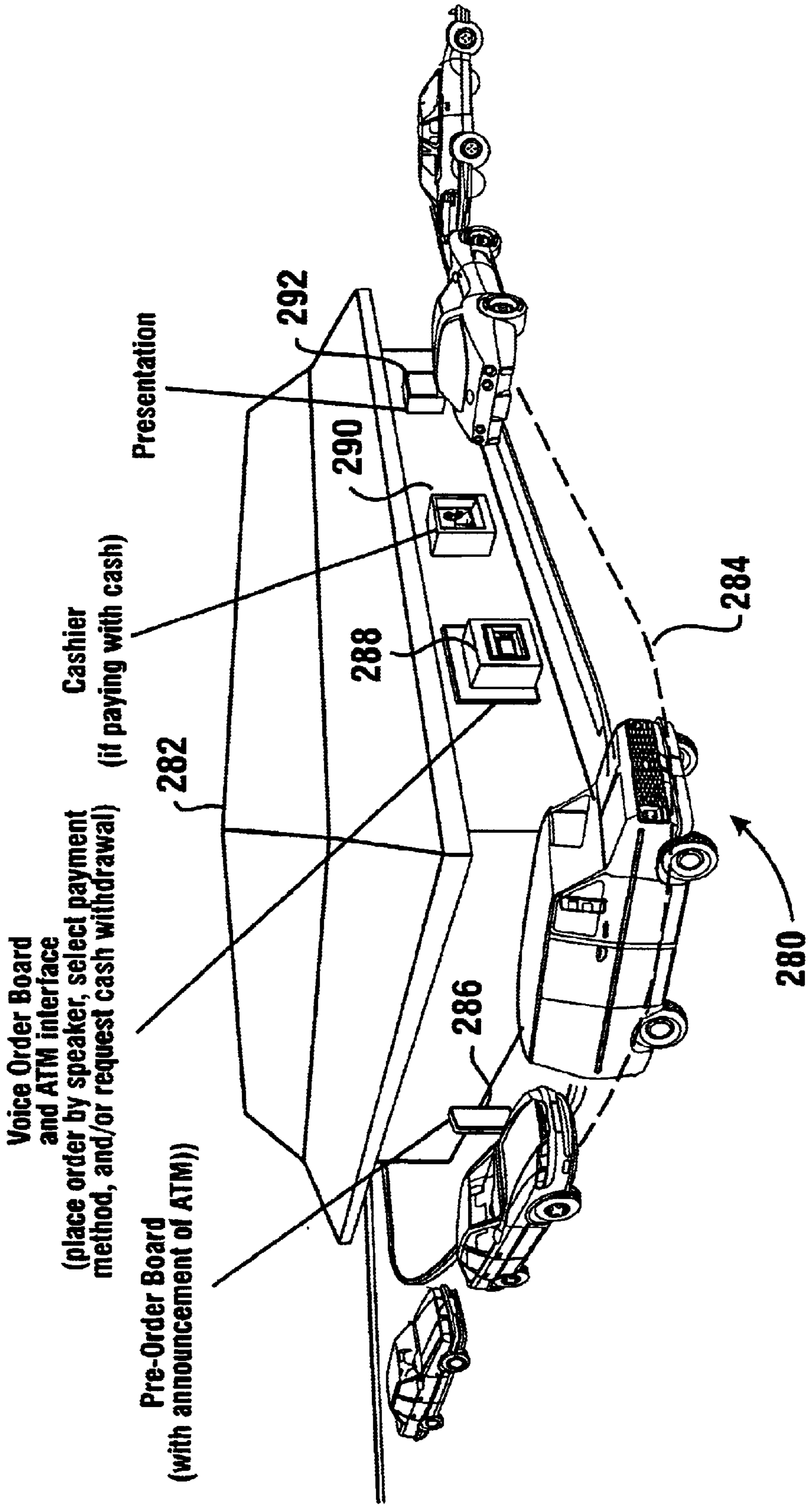
FIG. 48 shows an alternative configuration of a system like that shown in FIG. 38.

FIG. 48 shows an alternative system 280. System 280 is similar to system 204 in that a merchandise providing facility 282 provides merchandise to customers to travel along a path 284 adjacent to the facility which includes a drive-through lane. System 280 operates generally in a manner similar to system 204 except as expressly discussed. System 280 includes a preorder board 286. Preorder board 286 serves a function similar to preorder board 210 previously discussed. In system 280 a customer request station 288 is provided. Customer request station 288 operates in the manner similar to customer request station 212 previously discussed. However customer request station 288 also incorporates a cash dispensing function. As a result if a user uses a proper card or other source of monetary value and requests a dispense of an amount of cash at customer request station 288, the cash is delivered from a cash dispenser which is an integral part of the customer request station. The installation of the customer request station through the wall of the facility 282 enables this exemplary embodiment like the cash dispenser 218 in system 204, to be stocked with cash from the interior of the facility. In addition customer request station 288 also has the capability of operating independently as a cash dispenser when the facility 282 is otherwise closed.

As in system 204, system 280 also includes a cashier window 290. Cashier window 290 may be used to manually receive cash and provide change to customers who do not pay for their merchandise using a card. System 280 also includes a merchandise delivery location 292. Merchandise delivery location 292 in this embodiment is a delivery station through which fast food items which have been ordered by the customer are delivered to the customer in their vehicle.

Figure 49:
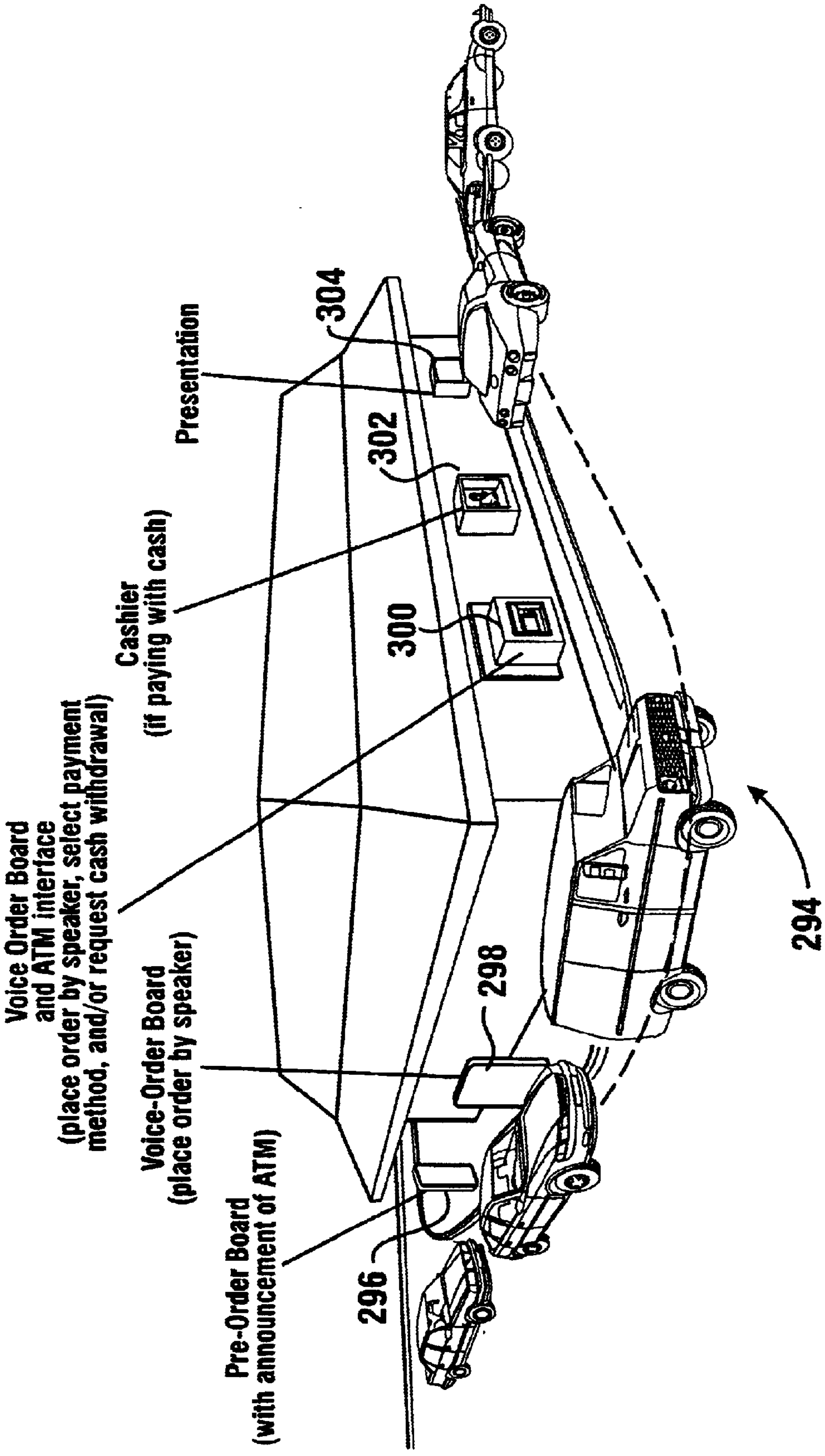
FIG. 49 shows a further alternative configuration of a system like that shown in FIG. 38.

FIG. 49 shows an alternative system 294. System 294 is similar to system 280 except as otherwise expressly described. System 294 includes two separate locations for customers to order, one of which is suitable for customers who wish to pay using a card or similar source of monetary value. System 294 includes a preorder board 296. The preorder board 296 provides the information to the customer in the manner previously described. In addition preorder board 296 may advise the customer to move to the customer request station with the ATM interface if they wish to pay by credit an/or debit card.

System 294 includes a voice order board 298. Voice order board 298 includes audio output and input devices so that a customer who is paying with cash can communicate verbally with a customer service provider within the facility. A customer request station 300 is also provided. Customer request station 300 is similar to customer request station 288. Customer request station 300 may be used by a customer to place an order and to pay with a card as well as to receive an amount of cash. System 294 also includes a cashier window 302 and a merchandise delivery station 304 that may be operated in the manner previously discussed.

Figure 50:
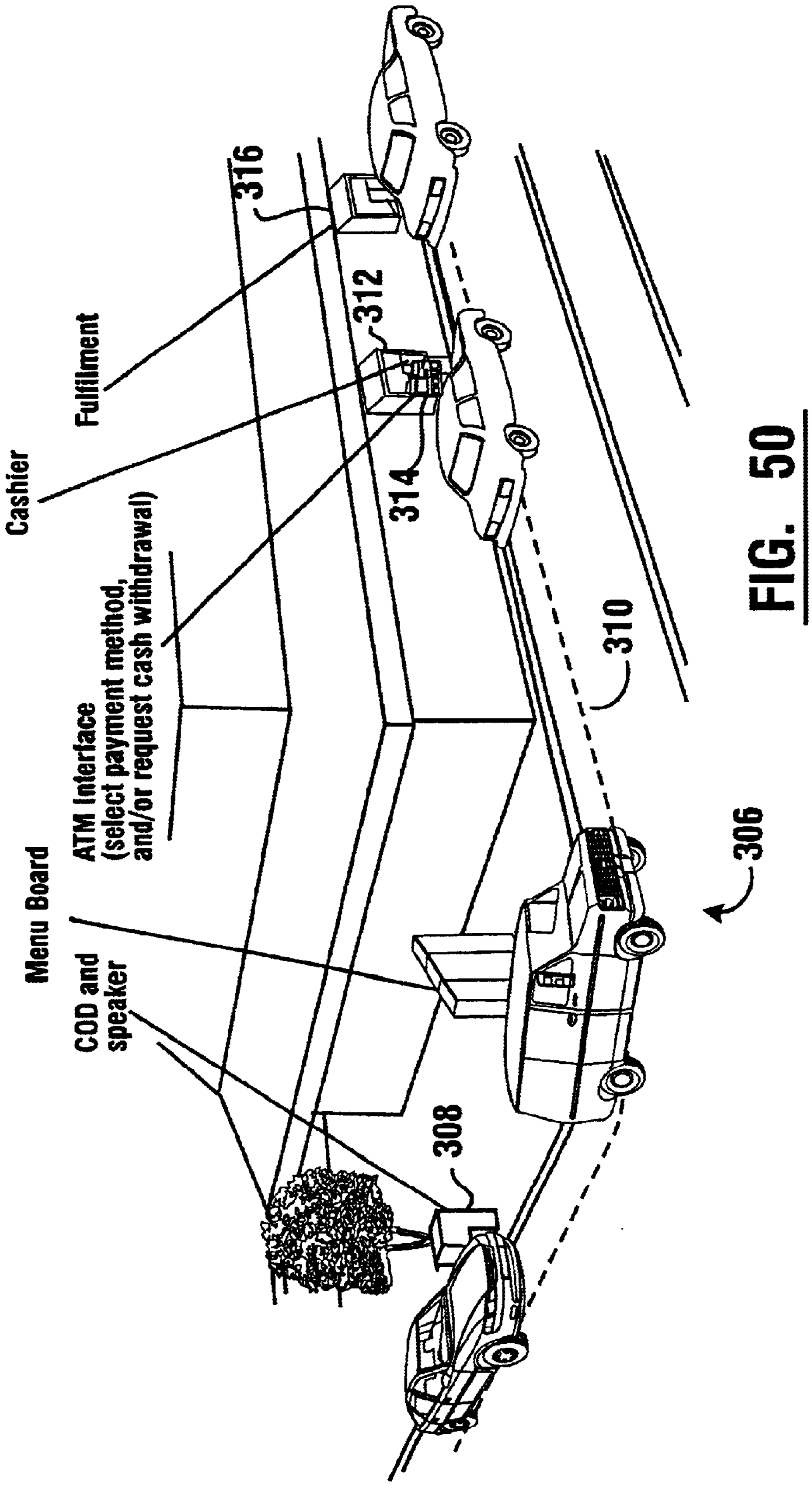
FIG. 50 shows a further alternative configuration of a system like that shown in FIG. 38.

FIG. 50 shows yet a further alternative system generally indicated 306 employing the principles of the invention. System 306 is generally similar to system 204 except as specifically described. In system 306 customers communicate verbally with a service provider to place their order. Customers place their orders at a customer order station 308. After placing their orders customers travel along a path 310 which includes a drive-through lane, to a payment window 312. Payment window 312 in this embodiment includes a cashier window through which a human cashier may receive cash and provide change. In addition payment window 312 includes a cash dispenser including a user interface indicated 314. As in the case of the customer request stations previously described, the service provider provides inputs which enables the system to indicate through the screen of the user interface on the cash dispenser the amount of the customer's order. The customer is then enabled to make payment for such order using a credit or debit card or other item corresponding to a source of monetary value. In addition to paying for their order the customer may also request and receive a dispense of cash from the cash dispenser 314. In the exemplary form of system 306 the user is enabled to receive a dispense of cash using a source of monetary value even if they choose to pay cash for their order. Once the user has made payment at the payment window 312 the customer's merchandise is presented to them at a merchandise delivery station 316.

Figure 51:
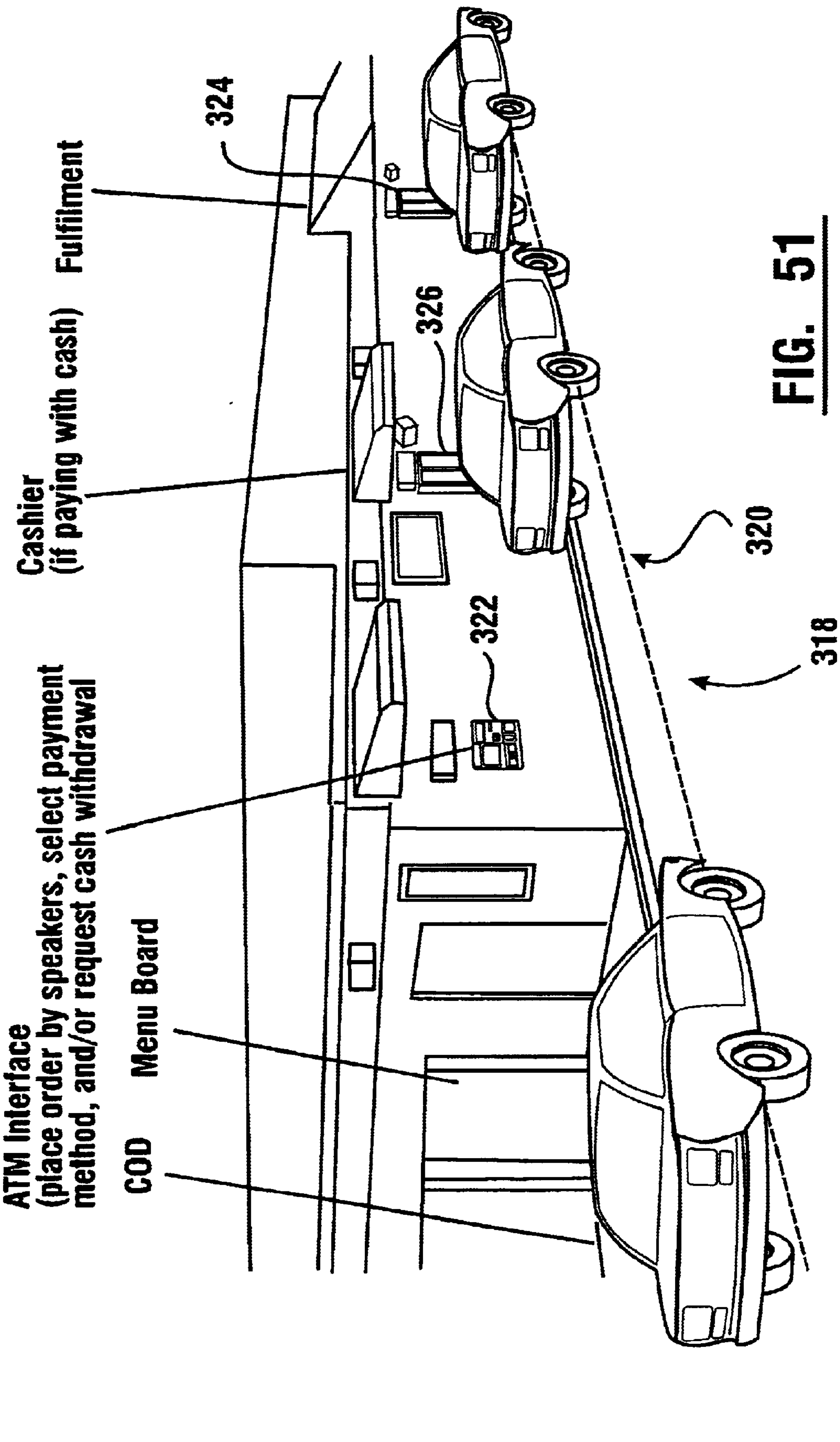
FIG. 51 shows a further alternative configuration of a system like that shown in FIG. 38.

FIG. 51 shows yet a further alternative system 318. System 318 is similar to systems previously described except as otherwise indicated. System 308 includes an order terminal (not shown) which is similar to order terminal 308 of system 306. The order terminal is located along a path 320 which includes a drive-through lane along which vehicles travel to order and receive their merchandise. In addition to the order terminal, system 318 includes the customer request station 322. Customer request station 322 operates like customer request station 288 of FIG. 48. The user is enabled to enter their order or otherwise identify items they have previously ordered offsite through inputs to the customer request station. In addition the customer is enabled to input a card or other item associated with a source of monetary value. The customer is also enabled to input a request for cash as well as an amount thereof. The cash is then dispensed to the customer at the customer request station 322. A customer who is paying for their merchandise using a card or other source of monetary value at the customer request station 322 is then enabled to proceed to a merchandise delivery station 324. Customers who are paying with cash make payment at a cashier window 326.

Figure 52:
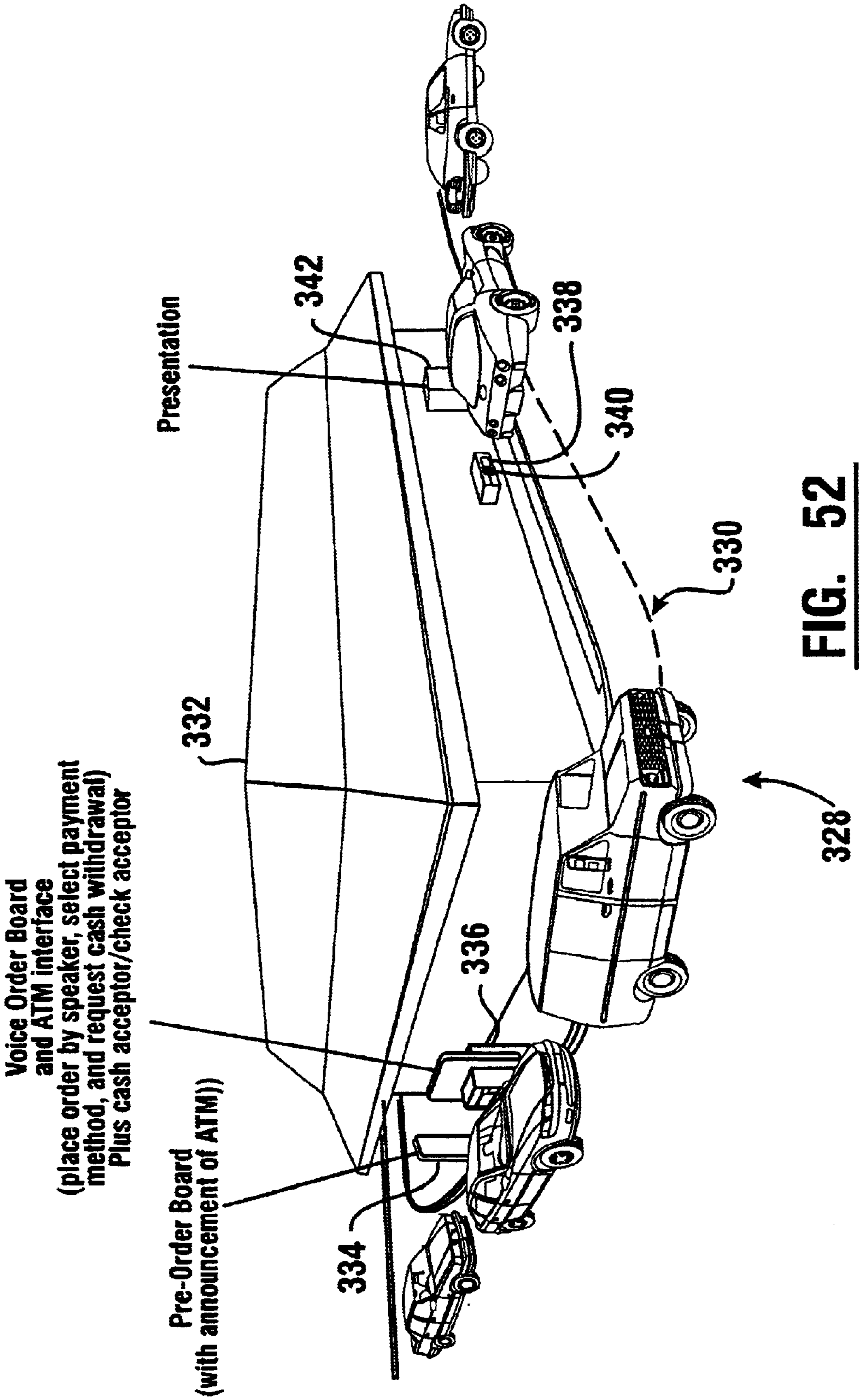
FIG. 52 shows a further alternative configuration for a system like that shown in FIG. 38 and which is adapted to receive alternative sources of monetary value.

A further alternative system of the invention generally indicated 328 is shown in FIG. 52. System 328 is generally similar to system 204 except that it is designed to carry out additional functions and to reduce the amount of labor necessary to operate the merchandise providing facility. In system 328 customers travel along a path 330 using drive-through lane adjacent to the facility 332. Facility 332 in the exemplary embodiment is a fast food restaurant but it should be understood that other facilities providing merchandise may also employ the principles of the present invention.

System 328 includes a preorder board 334. Preorder board 334 may be similar to preorder boards previously discussed which advise users concerning the operation of the system. A customer request station 336 is also provided in the system. Customer request station 336 is generally similar to customer request station 212 previously described except as specifically discussed herein. In the exemplary embodiment customer request station 336 includes a cash acceptor or cash accepting device which can be used to identify currency notes which are acceptable to use for payment for merchandise. In addition in this exemplary embodiment the customer request station 336 includes a check reading device which is capable of reading information on and verifying authenticity of checks which are inserted into the device. In the exemplary embodiment the check acceptor may be an IDM™ type check reading device which is commercially available from Diebold, Incorporated, the assignee of the present invention. Of course in other embodiments other types of check readers or check acceptors may be used. It should be understood that although customer request terminal 336 is described as having both a cash acceptor and a check acceptor, other embodiments of the invention may include one or the other of these types of devices or additional types of devices.

System 328 further includes a cash dispensing station 338. Cash dispensing station 338 includes a cash dispenser 340 which is operative to dispense currency bills in response to identifying inputs. It should be understood that the customer request station 336 and cash dispensing station 338 are operated responsive to a computer located within the facility 332. System 328 also includes a merchandise delivery location 342 through which merchandise is delivered to customers.

Figure 53:
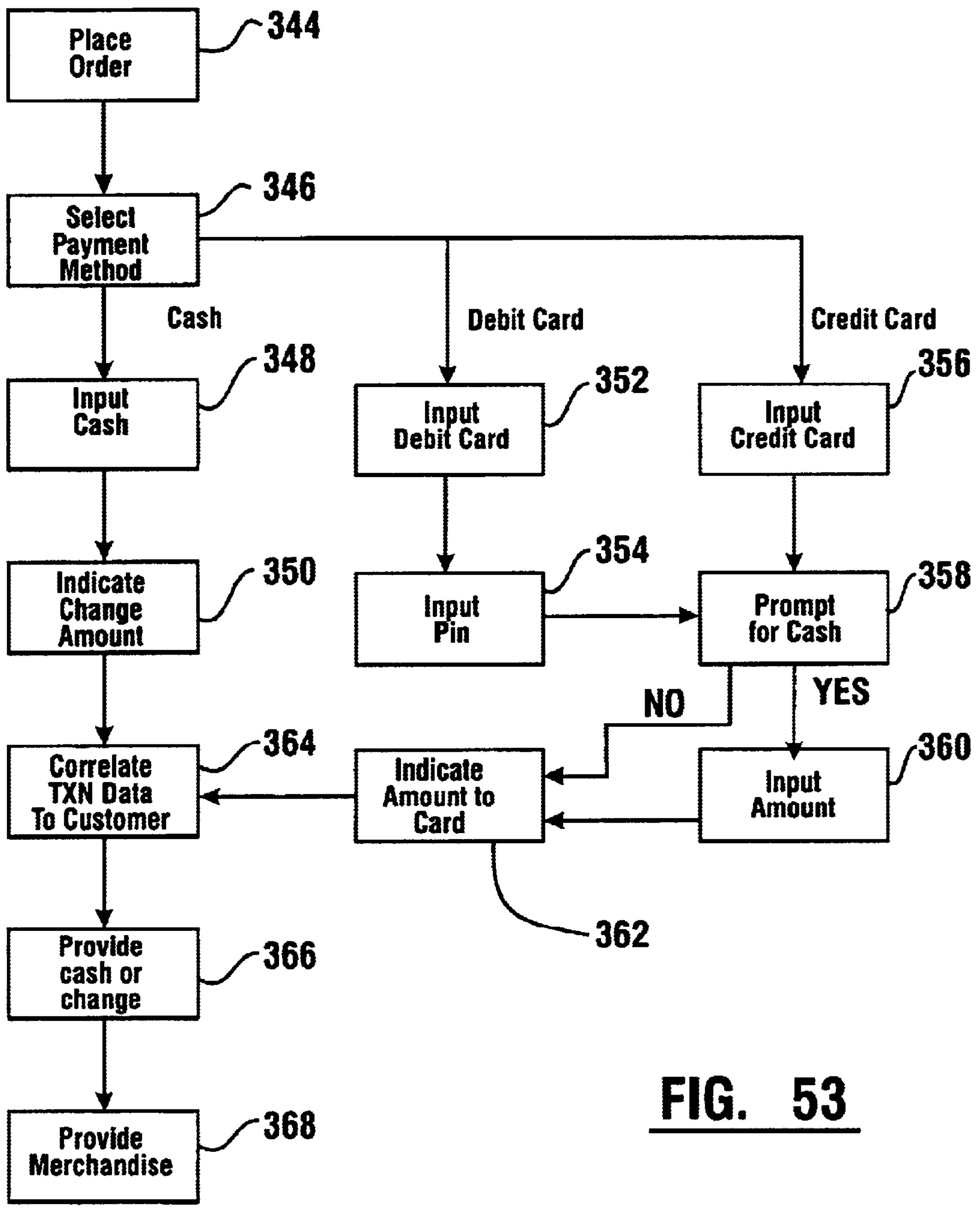
FIG. 53 is a schematic representation of steps carried out in an exemplary form of the system shown in FIG. 52.

FIG. 53 is a schematic view of the logic flow carried out by the computer operating the devices associated with system 328. In a step 344 a customer places an order at the customer request station 336. Step 344 may be carried out responsive to inputs from a customer service provider within the facility while communicating through audio input and output devices with the customer at the customer request station. The service provider provides inputs through an input device operatively connected to the computer which correspond to what the customer has ordered. In an exemplary embodiment, as the data corresponding to each ordered item is input the amount associated with each is output through an output device such as the screen at the customer request station. In addition the computer is operative responsive to the inputs to provide the user with an output which represents a running total of the amount of the customer's order. The computer preferably is operative to include in the running total all taxes and other charges so that the customer knows how much money the items ordered will cost. In this way if the customer has a set amount to spend they can avoid exceeding the set amount.

Alternatively step 344 may be carried out by the computer using speech recognition software. In such embodiments the customer speaks the items that they wish to receive. The computer interprets the customer's voice input and outputs indicia corresponding to each recognized item of merchandise on the screen. The computer may also provide outputs through the screen or otherwise, to indicate to the customer that it has been unable to recognize a particular ordered item. The computer may output a request that the customer restate their order when appropriate. Alternatively or in addition, step 344 may involve recovering from memory information concerning an order placed by the customer remotely either by telephone or through an Internet connection. Additional items which the customer may wish to order may be added to the prior order when the customer arrives at the facility. In either event step 344 is operative to cause the computer to produce a total for the order that the customer wishes to place.

After the order has been taken, the system is operated to execute the function of having the customer select a payment method. This is represented by a step 346. This can be accomplished through the computer operating an output device at the customer request station to prompt the user to provide an input. In response to the prompt, the customer in this exemplary embodiment is enabled to provide inputs indicating that they wish to pay using cash, a debit card or credit card. Each of these options represent a source of monetary value that the customer may use to make payment for merchandise purchased.

The computer operates in response to the input provided by the customer concerning how they wish to pay for their merchandise in accordance with its programming to provide appropriate instructions to the customer. For example in the case where the customer has requested to pay with cash, the computer operates the output device at the customer request station to prompt the customer to input to a cash acceptor the cash to pay for the transaction. This is represented in FIG. 53 by a step 348. Once the steps associated with having the customer input the cash in the machine are completed, the computer operates to execute a function to indicate to the customer the amount of cash they are entitled to receive as change. This is represented by a step 350. Alternatively if the customer has indicated that they wish to pay with a debit card, the computer operates in a manner similar to that previously described to output a prompt for the customer to insert a debit card into the card reader of the customer request station. This is represented by a step 352. The computer also operates the output device to prompt the customer to input their personal identification number or PIN as represented at a step 354. Alternatively if the customer has indicated that they wish to pay using a credit card, the computer operates to prompt the user to input the credit card into the card reader of the customer request station. This is represented by a step 356.

In each case where a customer is using a source of monetary value corresponding to a card, the computer operates to provide an output to an output device at the customer request station prompting the customer to indicate whether they wish to also receive cash to be charged to their account. This is represented by a step 358. If the user responds that they wish to obtain cash the computer operates to cause the customer request station to output messages similar to those previously described which prompt a user to input an amount. This is represented by a step 360. The user then indicates through an input device the amount of cash that they wish to receive. This is represented in FIG. 53 by a step 360. Regardless of whether the user is choosing to receive additional cash the computer operates the customer request station to indicate to the customer the amount to be charged to their source of monetary value. This may include amounts for the merchandise as well as additional cash to be dispensed. It may also include additional charges such as taxes, transaction fees or service fees. This activity is represented by a step 362.

Regardless of the source of monetary value being used by the customer, the computer then operates to correlate the transaction data associated with the transaction that the user is conducting with identifying data which can be used to identify the particular customer who is carrying out the transaction. This may include selecting particular identifying inputs that can be used to identify the particular user. These may include for example as previously discussed providing the user with a code. Alternatively biometric inputs or inputs associated with the user's vehicle, or signals which can be generated by an item in the vehicle or in proximity to the user may be used as the identifying input. The computer operates by storing data in the data store to correlate the identifying input with the particular transaction activity carried out by the customer.

Once the customer has completed their activity at the customer request station 236 the customer moves to the cash dispensing station 338. At the cash dispensing station the customer provides the identifying input associated with their transaction. In response to the receipt of the identifying input, the computer operates the cash dispenser to dispense all or a portion of the cash that is due the customer. Whether all or a portion of the amount due the customer is returned at the cash dispensing station may depend on whether the cash dispensing station includes a device which is capable of dispensing denominations of bills and coin to fully provide the customer with change. If the cash dispensing station only provides certain denominations of bills which are larger than required to provide the customer with the amount due, other denominations needed or coin may be provided by another machine or a cashier. In some embodiments of the invention any coin which is due to customer may be provided in an envelope or other container with the merchandise at the merchandise presentation location 342. Alternatively coin may be dispensed into a container from which it may be taken by the customer at the cash dispensing station, merchandise presentation station or other location.

In the case of a customer who has used cash as their source of monetary value, the cash dispensing station 338 operates to dispense the bills that they are entitled to receive as change. In addition the cash dispensing station may also dispense coin if it has that capability. If the customer is conducting a card based transaction, the cash dispensing station operates in response to the identifying input to dispense to the customer the amount of cash they have requested. This is represented in FIG. 53 by a step 366.

As previously discussed the merchandise for the customer is delivered from the merchandise delivery location to the customer in their vehicle. In embodiments of the invention providing the merchandise may also be accompanied by providing coin or other change that is due the customer. Inputs to the computer provided by a service provider are operative to indicate that the merchandise has been delivered to the customer. This is schematically represented by a step 368.

As can be appreciated these functional steps are exemplary and in other embodiments different, other or additional steps may be used.

Figure 54:
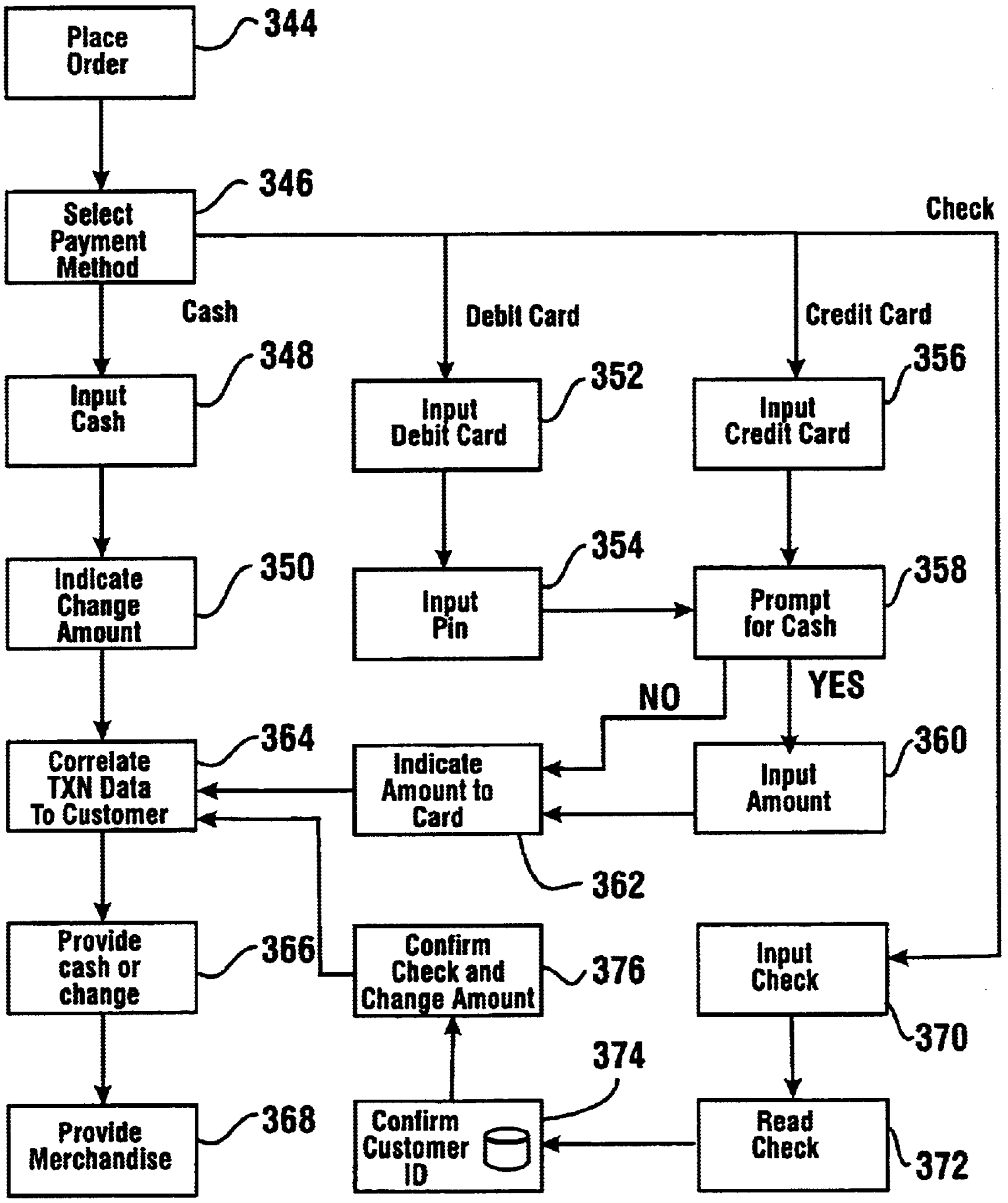
FIG. 54 is a schematic view of steps carried out in an alternative system like that shown in FIG. 52.

FIG. 52 is a schematic view of a logic flow executed by the system 328 when in addition to cash, a credit card or debit card, a user of the system is also enabled to cash a check and use the check as a source of monetary value. FIG. 54 is identical to FIG. 53 except as specifically discussed herein. When checks may be used in the system as a source of monetary value, the computer operates in step 346 to also provide the user with the option to indicate that they wish to pay by check. In response to a user selecting this option the computer operates the customer request station so that it can accept a check and the user is prompted to input the check. This is represented schematically by step 370.

The input check is then read by a check reading device such as the IDM™ device produced by Diebold, Incorporated or other device reads the information on the check. In the exemplary embodiment the check may also be subject to certain tests which verify that the check is genuine. These tests are carried out by the computer operating in connection with the check reading device and is schematically represented by step 372. Such tests may include for example, checking indicia on the check for a proper format, sensing for proper inks or other indicia, or analyzing the indicia or signature on the check.

Step 372 results in the computer having an output which indicates the amount of the check and information about the particular account it is drawn on. The scanning process may also produce data representative of the name of the payor of the check. The computer then operates as represented by a step 374 to confirm the identity of the user presenting the check. This can be done in a number of ways. The user may hold an identifying card which includes data thereon indicative of the user's identity. The user may input this card into the customer request station and the computer may operate to determine if the card presented has indicia which corresponds to the name on the check. Alternatively biometric inputs may be received from the person wishing to cash the check. These biometric inputs may be compared to information stored on an identification card presented by the user. Alternatively the biometric inputs may be compared through operation of the computer with biometric data stored in a local or remote database which serve to identify the user as a person authorized to cash checks. Other approaches may be used for confirming the identity of the customer or for obtaining inputs to establish that this customer is one who is authorized to cash a check.

Upon determining that the customer is authorized to cash a check, the computer operates as represented in a step 376 to have the customer confirm the amount read from the check and the amount that they will expect to receive as change in the transaction. In the exemplary embodiment in response to outputs generated by the computer the user is enabled to confirm that the check has been read correctly or alternatively cancel the transaction and receive return of the check.

Assuming that the check has been read correctly and the user provides an input to that effect, the computer then operates in one of the ways previously discussed to correlate an identifying input which can be received from the customer with data corresponding to the particular transaction. The user may then proceed along the path through the drive-through lane to receive their change which in this case represents the balance which corresponds to the amount of the check not charged against the amount for the merchandise and any taxes and service charges. At least a portion of the cash the user is entitled to receive is delivered at the cash dispensing station 338. The user then receives their merchandise (and in some embodiments the reminder of their change such as coin) at the merchandise delivery station 342.

Figure 55:
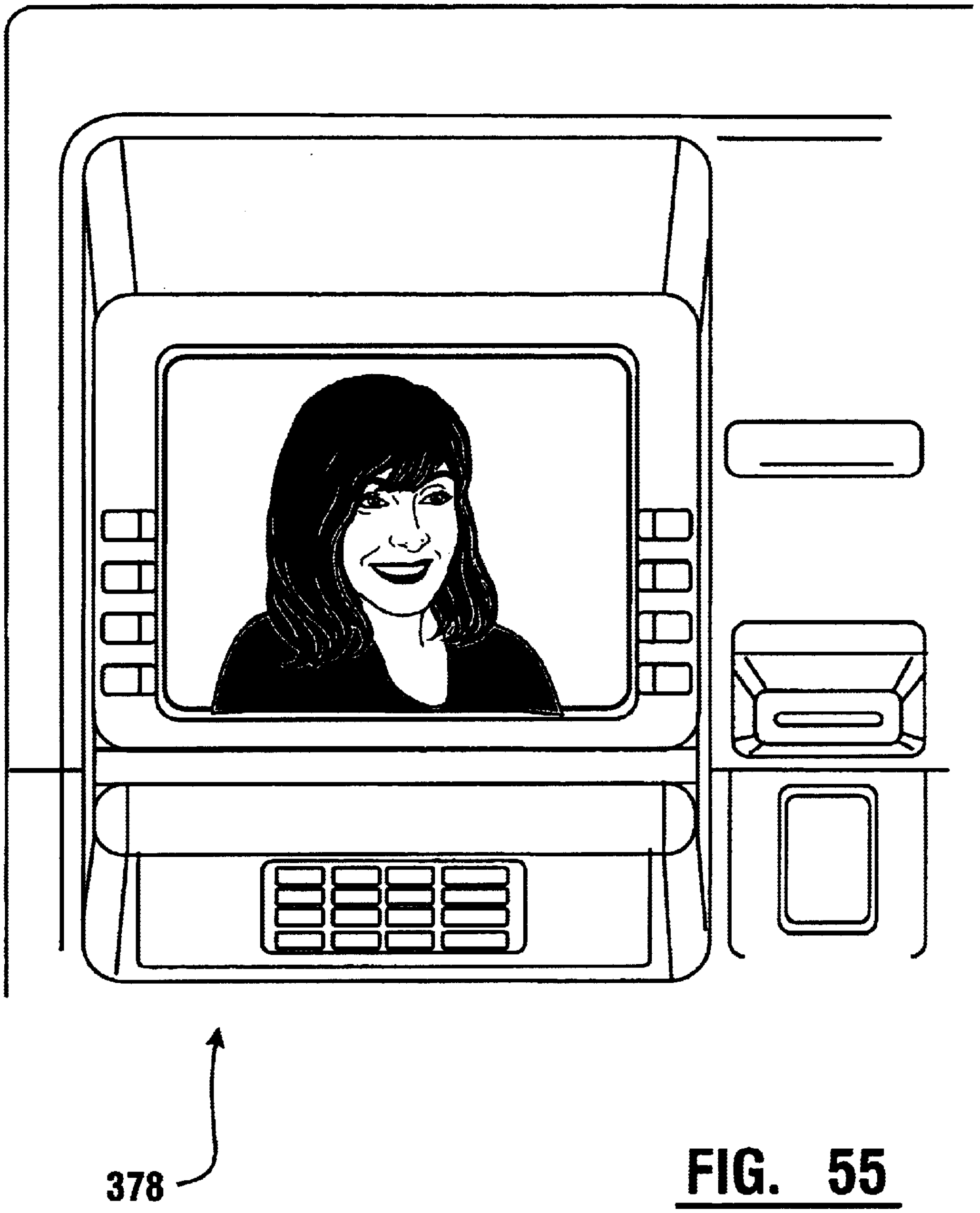
FIG. 55 shows an exemplary computer generated screen output at the customer request terminal of the system shown in FIG. 52.
Figure 56:
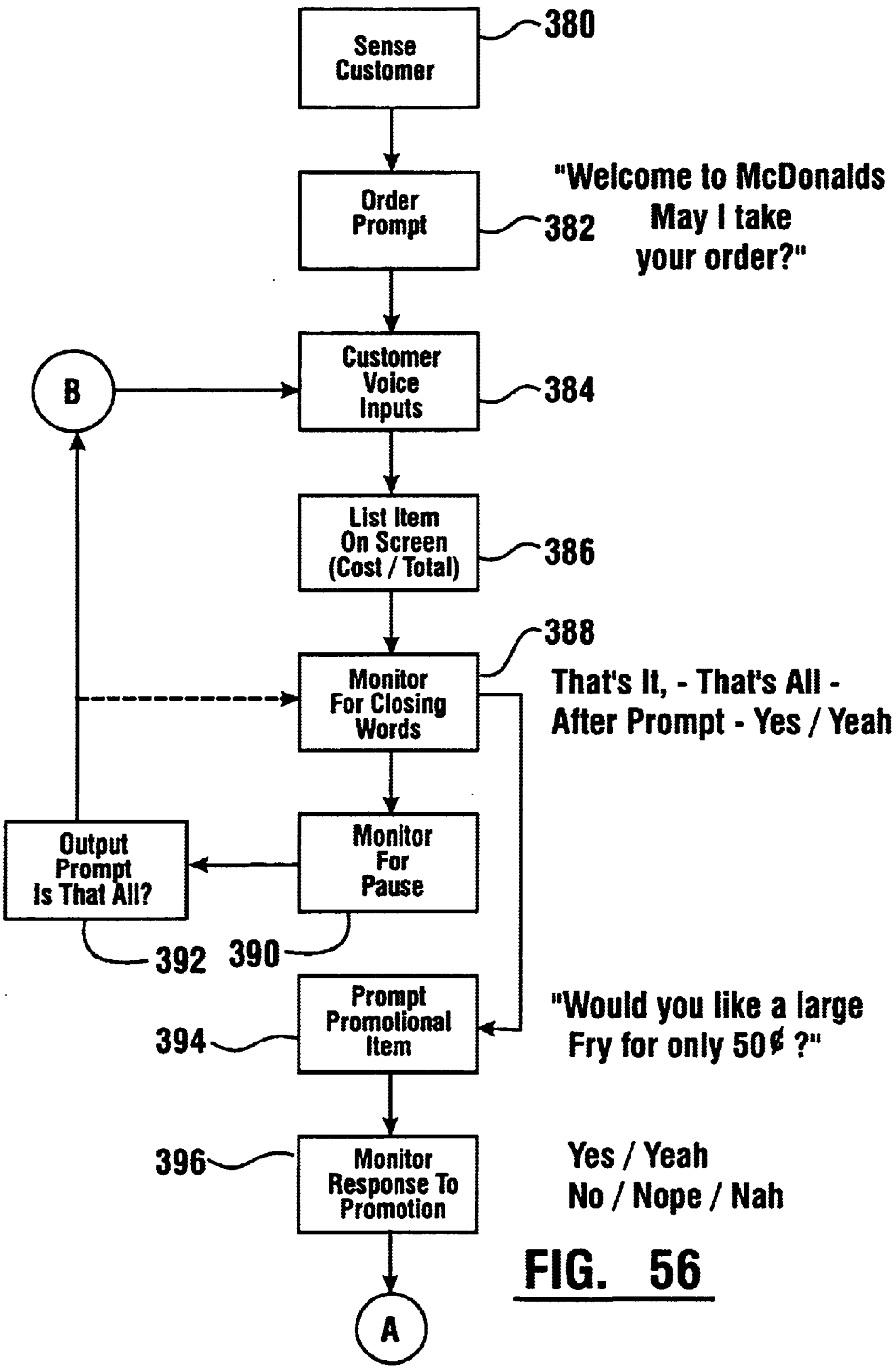
FIGS. 56–59 are flow charts of the logic flow carried out by the computer in an exemplary system shown in FIG. 52.
Figure 57:
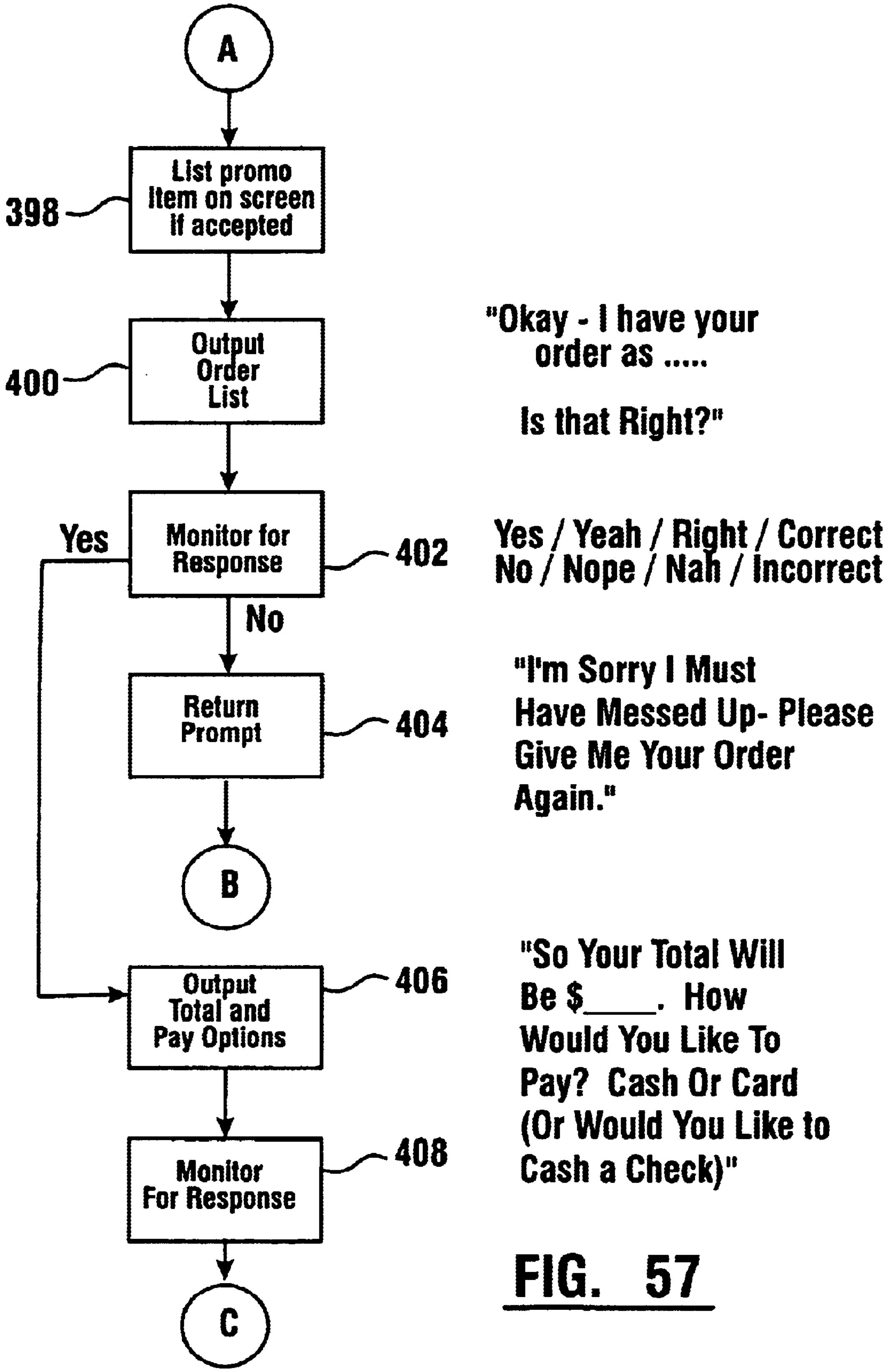
Figure 58:
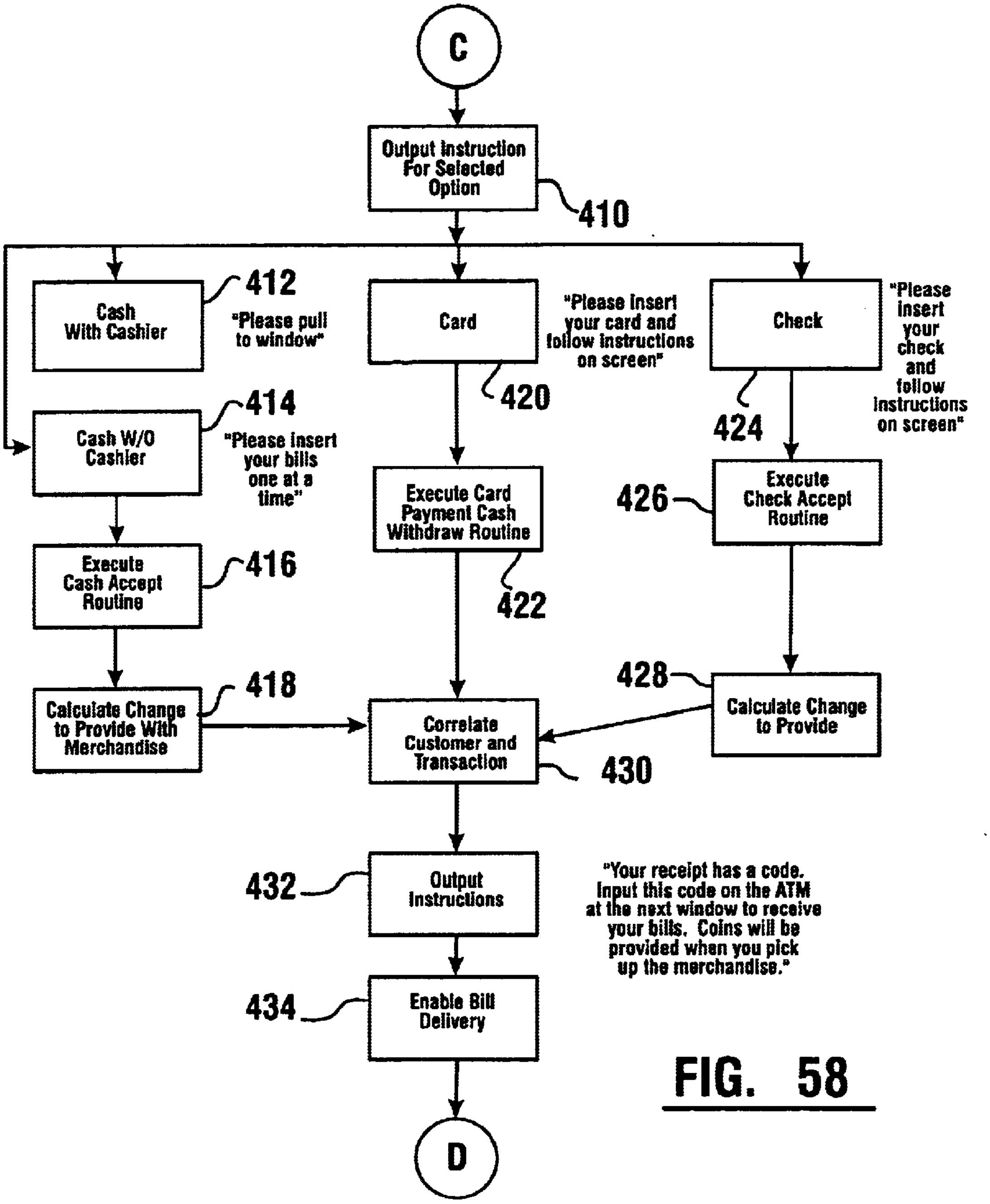
Figure 59:
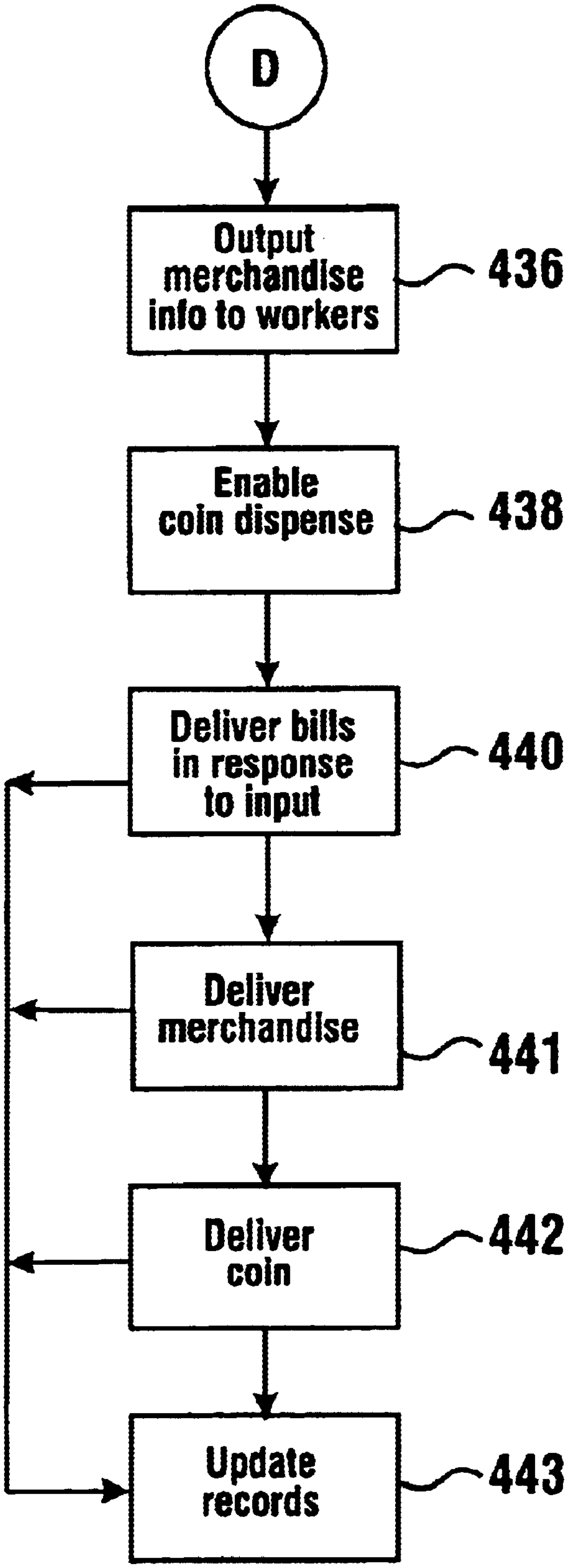

While the examples of the invention previously discussed herein have included the capability for the customer request station to communicate with a human service provider for entering the customer's order, other forms of the invention may operate using computer generated voice outputs and speech recognition software for purposes of receiving the customer's orders or instructions. In addition the computer may also operate to generate images of a simulated person or other entity providing the voice prompts. These may include for example images that look like a human being who may be taking the order from the customer. Alternatively the computer may generate cartoon characters, images of famous persons or images of other entities to make the order process more interesting for the customer. In exemplary embodiments the customer request station may present a computer generated image which projects an appropriate positive image for the merchandising facility. FIG. 55 includes an example of a customer request station indicated 378 and which is used to output an image of a simulated person. The simulated person appears to move responsive to operation of the computer in a manner coordinated with the simulated voice outputs and who appears to the user to be taking the order from the user.

FIGS. 56–59 are a schematic view of the logic flow carried out by the computer in operating the customer request station and other components of the system such as system 328. The logic flow begins with a step 380 in which a customer is sensed adjacent to the customer request station. This may be done using a sensor such as an infrared, optical, sonic, weight or inductance sensor for sensing a person or their vehicle adjacent to the customer request station. An appropriate time after sensing the customer the computer operates to output the image through the output device of the customer request station along with an audible simulated voice prompt welcoming the customer and asking to take their order. This is represented by a step 382.

In response to requesting that the customer indicate what they wish to order, audible instructions are received from the customer. The computer operating speech recognition software receives the voice inputs as represented in a step 384 and attempts to identify them as the particular items that are available to purchase. The speech recognition software may recognize instructions in multiple languages and the compute may output simulated voice prompts in a selected language responsive to the language used by the customer. The computer may also change or modify the output simulated order taker responsive to language selection or other parameters.

In exemplary embodiments the customer request station is located adjacent to a menu board which includes the items that the customer may order. The speech recognition software operates to attempt to identify those items listed on the menu board. As items which are available for purchase are identified in the customer's voice input, the computer is operative to list the item the customer has requested on the screen. Further in exemplary embodiments the computer is also operative to display a running total so that the customer may keep track of the amount spent. Windowing techniques may be utilized by the computer to list the items while maintaining an image simulating a person taking the customer's order. This activity by the computer is represented by a step 386.

In taking the customer's order the speech recognition software also operates to monitor for appropriate closing words by the customer. These closing words are what a customer would normally say to indicate that they have finished providing their order. In addition the closing words may change in response to different prompts given by the user. The monitoring for closing words is represented by a step 388. Also while the customer is inputting their order the computer operates to monitor the customer's voice inputs for an extended pause. This is represented by a step 390. If the computer senses an extended pause, the computer operates to output a voice prompt to the user asking the customer if they have finished. This is represented by a step 392. After the customer is given the prompt the computer monitors for closing words as well as additional closing words that would normally be responsive to the prompt. Generally in response to the prompt the customer will either continue providing inputs corresponding to items to be ordered or will state words that are indicative of closing the listing of items to be ordered.

In response to the customer indicating that they have completed their order, in this exemplary embodiment the computer operates to output a message to solicit the customer's interest in a promotional item. This is represented by a step 394. The computer then monitors the input from the voice of the customer to determine if the customer wishes to accept the promotional item. This is represented in a step 396. The simulated entity interacting with the customer may change for the promotional item based on the item, language, the contents of the customer's order or other parameters. If the customer accepts the promotional item the computer operates to include the promotional item in the list of items being purchased on the screen as represented in step 398.

After receiving the response concerning the promotional item the computer operates to output simulated voice outputs restating the customer's list of merchandise being ordered. The voice states the items and then prompts the customer to indicate whether the list is correct. This is represented by a step 400. After prompting for confirmation of the order the computer monitors to determine if the customer provides a voice input which confirms the order or any input which indicates that the order is incorrect. This is represented by a step 402. If the customer indicates that the order is incorrect the computer provides an output to the customer apologizing and requesting that the order be reentered as represented by a step 404.

If the customer provides an input indicating that the order has been taken correctly the computer operates to provide an audible output message to the customer which includes the total and a request for them to indicate how they wish to pay. This is represented at a step 406. The computer then monitors for response at a step 408. In response to the customer's indication of how they wish to pay the computer operates to carry out an appropriate programmed transaction sequence for the source of monetary value to be used. This is represented by a step 410.

As represented in a step 412 if the system is of the type that has a cashier the customer is provided with an instruction to move to the cashier's window if they indicate that they are paying with cash. This is represented by a step 412. If however the system enables a customer to input cash at the customer request station the computer operates to instruct the customer to input notes into a cash accepting device at the customer request station. This is represented by a step 414. The computer then operates to determine if the notes being input are acceptable and to determine the value of each. The computer is operative to return any unacceptable notes to the customer. This is represented by a step 416. Upon the customer completing the input of notes the computer is operative to calculate the amount of change the user is to receive. In addition the computer may calculate the denomination of notes and coin the user is to receive after the amount input is reduced by the value of the merchandise to be delivered and other charges. This is represented by a step 418.

If alternatively in response to step 406 the customer indicates that they are paying with a card, the computer operates to prompt the customer at a step 420 to input their card into the card reading device. The computer then operates to read the card data and execute such further steps as may be appropriate. For example in cases where the card is a debit card the customer may be prompted to input a PIN number or other identifying biometric or other input so as to verify that the user is authorized to conduct transactions using the card. This is represented by a step 422.

Alternatively if the user indicates that they wish to pay by check, the computer operates to prompt the customer to insert the check into the check reading device at the customer request station. This is represented by a step 424. The computer then operates in accordance with its programming to identify the information on the check and to verify the authority of the user to cash the check. This may be done using one or more of the techniques previously discussed. This activity by the computer is represented by a step 426. After determining that the check is to be accepted the computer then operates to reduce the amount of the check by the value of the merchandise purchased and any other charges, and to calculate the balance and nature of the change to be provided to the customer. This is represented by a step 428.

The computer after determining the amount of cash the customer is to receive, operates to correlate an identifying input that can be associated with the customer or the particular transaction. This is represented by a step 420. As previously discussed the correlating input may be a variety or combination of codes, biometric inputs, signal inputs or other inputs associated with a vehicle or other inputs. In this exemplary embodiment the computer is operative to provide the user with a code on an item dispensed from the customer request station. This item may include one or more receipts. The computer further outputs instructions to the user on the use of this code. This is represented by a step 432. The computer also operates to enable the cash dispenser device to deliver the cash to the user in response to input of this code. This is represented by a step 434.

As the customer has placed an order for merchandise the computer also operates in the exemplary embodiment to provide information to the workers who have responsibility for assembling the order. This may include for example providing information concerning the order on one or more screens which are watched by workers and which are used to instruct them on fast food items to cook or to assemble. This activity by the computer in outputting the information necessary to prepare the merchandise for the customer is represented by step 436.

In the event that the change being returned to the customer is being provided from more than one device the computer also operates to enable a coin dispenser to dispense the correct amount of coin to which the customer is entitled. This may be for example a coin dispenser near the merchandise assembly area which places the coin which is due to the customer in an envelope or other container which is included with or attached to the merchandise order. This is represented by a step 438. Of course it should be understood that in embodiments of the invention where a coin dispensing terminal is used to provide the customer with change, both notes and coin may be delivered to a customer at the cash dispensing station.

The customer moves along the path from the customer request station in the drive-through lane and eventually inputs the code to the cash dispenser at the cash dispensing station. In response the computer operates to deliver the number and type of notes that are appropriate to deliver to the customer. This is represented by a step 440. The customer may then take their notes and move forward to the merchandise delivery location. In the exemplary embodiment the customer presents their receipt and receives the merchandise as well as the coin portion of their change. As these items are delivered appropriate inputs are provided to the computer by a service provider, sensors or other devices, to indicate that these actions have been taken. The computer updates its records as represented by steps 441, 442 and 443.

As can be appreciated a system having this form of the invention reduces the amount of human effort required to operate the system. This is due to the computerized order taking and cash handling process. This enables workers to concentrate on merchandise preparation and delivery. As a result a larger number of customers may be served more quickly by fewer workers. Such systems may also serve customers who speak different languages. In addition embodiments of the invention enable persons who may not have credit or debit cards to utilize the system by cashing checks and to receive the balance of their funds in a manner that is fast and convenient. Such a system may prove advantageous particularly to persons who do not have accounts with financial institutions or whose institutions may not maintain business hours convenient for the particular person. Numerous additional advantages of the present invention will be apparent to those skilled in the art.

Thus, the new cash delivery methods and systems of the present invention achieve the above-stated objectives, eliminate difficulties encountered in the use of prior devices and systems, solve problems and attain the desirable results described herein.

In the foregoing description certain terms have been used for brevity, clarity and understanding, however no unnecessary limitations are to be implied therefrom because such terms are for descriptive purposes and are intended to be broadly construed. Moreover, the descriptions and illustrations herein are by ways of examples and the invention is not limited to the exact details shown and described.

In the following claims any feature described as a means for performing a function shall be construed as encompassing any means capable of performing the recited function and shall not be deemed limited to the structures or method steps shown therein or mere equivalents.

Having described the features, discoveries and principles of the invention, the manner in which it is constructed and operated and the advantages and useful results attained, the new and useful structures, devices, elements, arrangements, parts, combinations, systems, equipment, operations and relationships are set forth in the appended claims.

I claim:

1. Apparatus comprising:

a self-service merchandise dispensing machine selectively operative to dispense merchandise;

a user interface associated with the dispensing machine, wherein the interface includes an article reading device, wherein the article reading device is operative to read a machine readable article associated with a user and including a stored value memory, wherein the machine readable article corresponds to a source of monetary value, and wherein the interface includes at least one input device operative to receive at least one input from a user;

a cash value dispensing mechanism associated with the dispensing machine;

a controller operatively connected to the dispensing machine, the user interface and the cash value dispensing mechanism;

wherein the controller is operative to cause a merchandise dispense from the merchandise dispensing machine having an associated charge and to cause a cash value dispense of an amount from the cash value dispensing mechanism, responsive to at least one input to the at least one input device, wherein the article reading device is operative responsive to the cash value dispense to include data representative of the amount in the stored value memory, and wherein the controller is operative responsive to reading the machine readable article with the article reading device to cause generation of a charge record, wherein the charge record includes data representative of the source of monetary value, the charge, and the amount.

2. The apparatus according to claim 1 wherein the cash value dispensing mechanism is operative during the cash value dispense to dispense at least one note.

3. The apparatus according to claim 2 wherein the cash value dispensing mechanism includes a cash supply component, wherein the cash supply component holds a supply of notes, and wherein the cash supply component is removably mounted to the merchandise dispensing machine.

4. The apparatus according to claim 1 wherein the user interface further includes an output device, wherein the controller is further operative to cause the output device to output prompt messages to a user concerning operation of the input device.

5. The apparatus according to claim 1 and further comprising a cash value accepting device associated with the merchandise dispensing machine, wherein the cash value accepting device is operative to accept at least one cash value item from a user, and wherein the cash value accepting device is operatively connected to the controller, and wherein the controller is operative to apply the charge associated with the dispensed merchandise to the cash value item.

6. The apparatus according to claim 5 wherein the cash value accepting device includes a note acceptor and the cash value item includes a note.

7. The apparatus according to claim 5 wherein the cash value accepting device includes a stored value card reader and the stored value item includes a stored value card.

8. The apparatus according to claim 1 wherein the self-service merchandise dispensing machine is operative to dispense merchandise which includes motor fuel.

9. Apparatus comprising:

a self-service merchandise dispensing machine selectively operative to dispense merchandise;

a user interface associated with the dispensing machine, wherein the interface includes an article reading device, wherein the article reading device is operative to read a machine readable article associated with a user, wherein the machine readable article corresponds to a source of monetary value, and wherein the interface includes at least one input device operative to receive at least one input from a user;

a cash value dispensing mechanism associated with the dispensing machine, wherein the cash value dispensing mechanism includes a roll of notes, wherein the roll includes a movable web, wherein the notes in the roll are held in supporting connection with the web, wherein the cash value dispensing mechanism is operative to deliver a note to a user in attached relation with the web;

a controller operatively connected to the dispensing machine, the user interface and the cash value dispensing mechanism;

wherein the controller is operative to cause a merchandise dispense from the merchandise dispensing machine having an associated charge and to cause a cash value dispense of an amount from the cash value dispensing mechanism, responsive to at least one input to the at least one input device, and wherein the controller is operative responsive to reading the machine readable article with the article reading device to cause generation of a charge record, wherein the charge record includes data representative of the source of monetary value, the charge, and the amount;

wherein the cash value dispensing mechanism is selectively operative to dispense at least one note from the roll during the cash value dispense.

10. The apparatus according to claim 9 wherein the cash dispensing mechanism further comprises a note/web separating member, wherein the note/web separating member is operative to engage the note to separate the note from the web, wherein the note is dispensed from the machine without the web attached thereto.

11. The apparatus according to claim 9 wherein the web includes a releasible adhesive thereon, whereby notes are separable from the web after dispense to a user.

12. The apparatus according to claim 9 wherein the cash value dispensing mechanism includes disposed first and second engaging devices in operative engagement with the web, wherein the first and second engaging devices are in operative connection with the controller, and wherein the controller is operative to cause the web to move to produce a loop in the web between the first and second engaging devices in the dispensing machine, and wherein the controller is operative to release the first engaging device to enable delivery of a portion of the web which includes the loop from the dispensing machine while holding the web adjacent the second engaging device in the machine.

13. The apparatus according to claim 9 and further comprising a cash value accepting device in operative connection with the self-service dispensing machine, wherein the cash value accepting device is in operative connection with the controller, and wherein the cash value accepting device is operative to accept a presented note, and wherein the accepting device is operative to determine if the note is genuine, and wherein the controller is operative responsive to the accepting device determining that the presented note is genuine to include the presented note in the roll.

14. The apparatus according to claim 13 wherein the controller is operative responsive to the accepting device determining that the presented note is not genuine to discharge the accepted note from the cash accepting device.

15. The apparatus according to claim 13 wherein the accepted note is associated with a cash value, and wherein the controller is operative to apply the charge for the dispensed merchandise against the cash value.

16. Apparatus comprising:

a self-service merchandise dispensing machine selectively operative to dispense merchandise;

a user interface associated with the dispensing machine, wherein the interface includes an article reading device, wherein the article reading device is operative to read a machine readable article associated with a user, wherein the machine readable article corresponds to a source of monetary value, and wherein the interface includes at least one input device operative to receive at least one input from a user;

a cash value dispensing mechanism associated with the dispensing machine, wherein the cash value dispensing mechanism includes a roll of notes having generally parallel, opposed edges of similar dimension, and wherein the roll comprises a plurality of releasible connectors, wherein a connector is operative to connect an area of one first note to an area of at least one second note, wherein the connector is operative to releasibly connect the first and second notes with their respective edges in generally adjacent relation, and wherein the cash value dispensing mechanism is operative to deliver notes in attached relation with connectors;

a controller operatively connected to the dispensing machine, the user interface and the cash value dispensing mechanism;

wherein the controller is operative to cause a merchandise dispense from the merchandise dispensing machine having an associated charge and to cause a cash value dispense of an amount from the cash value dispensing mechanism, responsive to at least one input to the at least one input device, and wherein the controller is operative responsive to reading the machine readable article with the article reading device to cause generation of a charge record, wherein the charge record includes data representative of the source of monetary value, the charge, and the amount;

wherein the cash value dispensing mechanism is selectively operative to dispense at least one note from the roll during the cash value dispense.

17. The apparatus according to claim 16 wherein each releasible connector comprises a generally flexible member, wherein the flexible member spans the generally adjacent edges of the first and second notes.

18. The apparatus according to claim 17 wherein the flexible member includes releasible adhesive, wherein the adhesive releasibly engages the first and second notes with the flexible member.

19. A method of operating an apparatus, wherein the apparatus comprises:

a self-service merchandise dispensing machine selectively operative to dispense merchandise;

a user interface associated with the dispensing machine, wherein the interface includes an article reading device, wherein the article reading device is operative to read a machine readable article associated with a user, wherein the machine readable article corresponds to a source of monetary value, and wherein the interface includes at least one input device operative to receive at least one input from a user;

a cash value dispensing mechanism associated with the dispensing machine, wherein the cash value dispensing mechanism includes a cash supply component removably mounted to the merchandise dispensing machine, wherein the cash supply component holds a supply of notes;

a controller operatively connected to the dispensing machine, the user interface and the cash value dispensing mechanism;

wherein the controller is operative to cause a merchandise dispense from the merchandise dispensing machine having an associated charge and to cause a cash value dispense of an amount from the cash value dispensing mechanism, responsive to at least one input to the at least one input device, and wherein the controller is operative responsive to reading the machine readable article with the article reading device to cause generation of a charge record, wherein the charge record includes data representative of the source of monetary value, the charge, and the amount;

comprising:

(a) reading a machine readable article with the reading device;

(b) dispensing merchandise from the self-service dispensing machine responsive to at least one input to the at least one input device, the dispensed merchandise having an associated charge;

(c) dispensing cash value including at least one note from the cash value dispensing mechanism responsive to at least one input to the at least one input device, the cash value dispensed corresponding to an amount;

(d) charging the source of monetary value the amount and the charge;

(e) removing the cash supply component from the merchandise dispensing machine, wherein in performing the method, step (c) is not executed when the cash supply component has been removed from the merchandise dispensing machine, and in step (d) the source of monetary value is charged only the charge for dispensed merchandise.

20. The method according to claim 19 wherein step (a) includes reading a credit card associated with a user's credit card account, and step (d) includes charging the user's credit card account for the amount and the charge.

21. The method according to claim 19 wherein step (b) includes dispensing motor fuel from the self-service merchandise dispensing machine.

22. A method comprising:

(a) operating an article reading device to read a machine readable article, wherein the machine readable article corresponds to a source of monetary value and includes a stored value memory, and wherein a user interface associated with a self-service merchandise dispensing machine includes the article reading device;

(b) receiving at least one input at at least one input device of the user interface;

(c) operating a controller to cause a merchandise dispense from the dispensing machine having an associated charge, responsive to receiving at least one input at the at least one input device;

(d) operating the controller to cause a cash value dispense of an amount from a cash value dispensing mechanism associated with the dispensing machine, responsive to receiving at least one input at the at least one input device;

(e) operating the article reading device to include data representative of the amount in the stored value memory;

(f) operating the controller to cause generation of a charge record including data representative of the source of monetary value, the charge, and the amount.

23. Apparatus comprising:

a self-service merchandise dispensing machine selectively operative to dispense merchandise;

a user interface associated with the dispensing machine, wherein the interface includes an article reading device, wherein the article reading device is operative to read a machine readable article associated with a user, wherein the machine readable article corresponds to a source of monetary value, and wherein the interface includes an input device operative to receive at least one input from a user;

a cash value dispensing mechanism associated with the dispensing machine;

a controller operatively connected to the dispensing machine, the user interface and the cash value dispensing mechanism;

wherein the controller is operative to cause a merchandise dispense from the merchandise dispensing machine having an associated charge and to cause a cash value dispense of an amount from the cash value dispensing mechanism, responsive to at least one input to the input device, and wherein the controller is operative responsive to reading the machine readable article with the article reading device to cause generation of a charge record wherein the charge record, includes data representative of the source of monetary value, the charge, and the amount.

* * * * *